United States Patent [19]

Poland

[11] E Re. 30,671

[45] Reissued Jul. 7, 1981

[54] MICROPROCESSOR SYSTEM HAVING HIGH ORDER CAPABILITY

[75] Inventor: Sydney W. Poland, Arlington, Tex.

[73] Assignee: Texas Instruments Incorporated, Dallas, Tex.

[21] Appl. No.: 55,888

[22] Filed: Jul. 9, 1979

Related U.S. Patent Documents

Reissue of:

[64] Patent No.: 4,153,937
Issued: May 8, 1979
Appl. No.: 783,903
Filed: Apr. 1, 1977

U.S. Applications:

[63] Continuation-in-part of Ser. No. 714,464, Aug. 16, 1976.

[51] Int. Cl.[3] ..... G06F 3/08; G06F 15/02

[52] U.S. Cl. ..... 364/706; 364/200; 364/900

[58] Field of Search ..... 364/706, 200, 900

[56] References Cited

U.S. PATENT DOCUMENTS

| | | | |
|---|---|---|---|
| 3,593,313 | 7/1971 | Tomaszewski et al. | 364/200 |
| 3,760,171 | 9/1973 | Wang et al. | 364/706 |
| 3,859,636 | 1/1975 | Cook | 364/200 |
| 3,942,156 | 3/1976 | Mock et al. | 364/200 |
| 3,953,833 | 4/1976 | Shapiro | 364/200 |
| 3,971,925 | 7/1976 | Wenninger et al. | 364/706 |

OTHER PUBLICATIONS

"National's Scientific Calculator has Long-Term All-Semi-Conductor Memory", *Electronics*, Jun. 10, 1976, pp. 29-30.

*Primary Examiner*—Jerry Smith
*Attorney, Agent, or Firm*—Robert D. Marshall, Jr.; Leo N. Heiting; Melvin Sharp

[57] ABSTRACT

A microprocessor system with high order capabilities is provided with the two non-volatile memories which are read-only-memories (ROMs) in the disclosed embodiment. A first ROM stores the microcode for controlling the operation of the microprocessor circuits. The second ROM, which is preferably disposed in a module or cartridge, stores a plurality of program codes which are used to address the first ROM. The second ROM's module may be inserted into a receptacle for interconnecting it with the remainder of the microprocessor system. Preferably, a plurality of such second ROMs are available for selectively plugging into the microprocessor system.

Further, a particular embodiment of the microprocessor system with high order capabilities for use as an electronic calculator with high order capabilities is disclosed in great detail.

36 Claims, 20 Drawing Figures

| I12 | I11 | I10 | I9 | I8 | I7 | I6 | I5 | I4 | I3 | I2 | I0 | I1 | |
|---|---|---|---|---|---|---|---|---|---|---|---|---|---|
| 0 | 1 | 0 | 1 | 0 | 0 | 0 | 0 | 1 | 1 | 0 | 0 | 0 | LOAD LSD OF KEYBOARD REG WITH R5 (R5 KR) |
| 0 | 1 | 0 | 1 | 0 | 0 | 0 | 0 | 0 | 1 | 0 | 0 | 0 | LOAD R5 WITH LSD OF KEYBOARD REG (KR R5) |
| 0 | 1 | 0 | 1 | 0 | 0 | 0 | 0 | 0 | 1 | 1 | 0 | 0 | LOAD KEYBOARD REG WITH EXT (EXT KR) |
| 0 | 0 | 0 | 0 | 0 | 0 | 0 | 0 | 1 | 0 | 1 | 0 | 1 | PREG |
| 0 | 1 | 0 | 1 | 0 | 0 | 0 | 0 | 0 | 1 | 1 | 1 | 0 | FETCH |
| 0 | 1 | 0 | 1 | 0 | 0 | 0 | 1 | 1 | 1 | 1 | 1 | 0 | FETCH HIGH |
| 0 | 1 | 0 | 1 | 0 | 0 | 0 | 0 | 1 | 1 | 1 | 1 | 0 | LOAD PC |
| 0 | 1 | 0 | 1 | 0 | 0 | 0 | 1 | 0 | 1 | 1 | 1 | 0 | UNLOAD PC |

PRECHG
DISCHG
ADE
VDD
VGG
METAL CONTROL
640
ROM ARRAY
5K X 8
600
DIFFUSION DECODE
METAL DECODE
620
621
FETCH M1
FETCH HIGH M1
SAMPLE

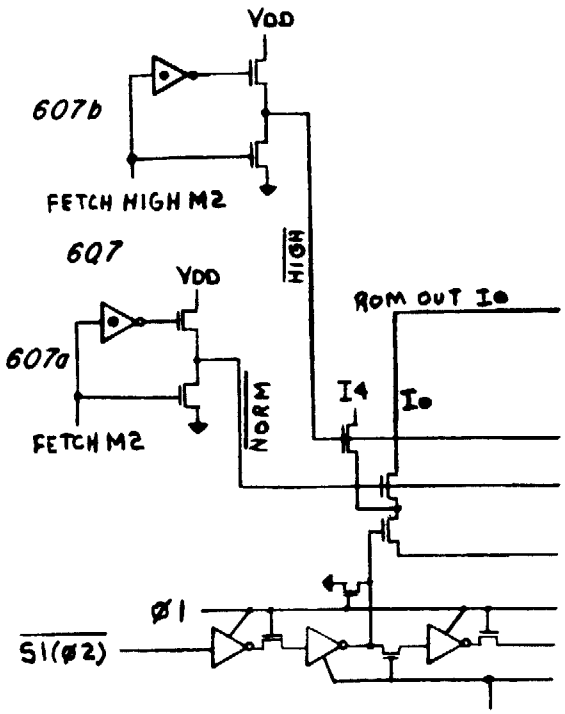
Fig. 18e
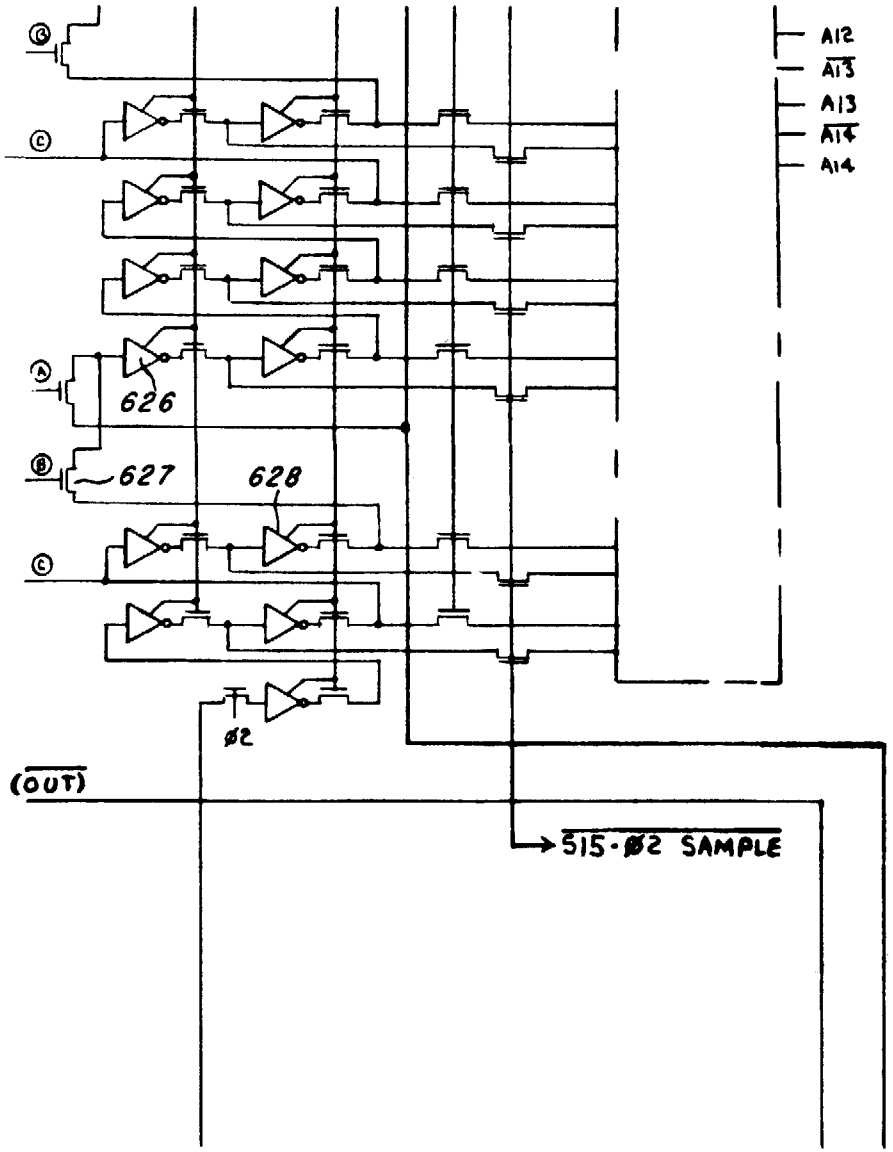

MICROPROCESSOR SYSTEM HAVING HIGH ORDER CAPABILITY

Matter enclosed in heavy brackets [ ] appears in the original patent but forms no part of this reissue specification; matter printed in italics indicates the additions made by reissue.

This application is a continuation-in-part of Ser. No. 714,464 filed Aug. 16, 1976.

BACKGROUND OF THE INVENTION

This invention relates to microprocessor systems and more specifically to electronic calculators having the capability of solving higher order or complex mathematic problems. It should become evident, moreover, that my invention has utility in other applications making use of microprocessor technology, such as video games, to increase the level of sophistication of the functions performed by the microprocessor.

Electronic calculators have evolved from comparatively simple machines which add, subtract, multiply and divide the data entered into the calculator to machines which can perform sophisticated financial and mathematical operations such as, for example, changing polar coordinates to rectangular coordinates or solving compound or annuity interest problems. The calculator systems developed to date have had a single or multiple read-only-memory (ROM's) in which groups of instruction words are stored as microcode. The different groups of instruction words stored in the ROM cause the calculator's arithmetic unit, memory and display to cooperate to perform desired mathematical operations when instruction words are read out of the ROM. The ROM is addressed or controlled by a keyboard or other input means associated with the electronic calculator or microprocessor system. Thus, the depression of a key causes a selected group of instruction words to be read out of the ROM and these instruction words are provided to circuits controlling the inputting of data, the storage of data and the manipulation of data to perform the operation or function invoked by the key depressed. Thus, the instruction words generated by the ROM cause data to be entered, stored, and manipulated using, for instance, an arithmetic unit to perform such functions as adding, subtracting, multiplying dividing or performing higher order or complex mathematical operations on the data.

Each instruction word typically has a length of eight to sixteen binary bits, although microprocessors having longer or shorter instruction words are well within the state of the art. The performance of even a relatively simple operation, such as adding two floating point numbers, requires a group of many instruction words. For instance, the addition of two floating point numbers may require as many as 75 instruction words having thirteen bits each, thus absorbing 975 bits of ROM area to be able of performing such a simple operation. Similarly, the subtraction operation has a comparable set of instruction words and so on for other operations and functions. Of course, portions of such sets may be shared for certain operations.

Modern electronic calculators now perform sophisticated arithmetic and financial computations such as, for example, squaring, taking square roots, converting from polar to rectangular coordinates, computing logorithms and trigometric relationships, compounding interest, and other such computations. These computations have typically been implemented into the electronic calculator by increasing the size of the ROM to accommodate the larger number of instruction words associated with these higher order computations. While the size of commercially available ROM's has increased during the past several years, the library of computational programs desired to be implemented in an electronic calculator has grown at even a faster rate. For example, it is desirable to have an electronic calculator capable of performing an entire library of computations related to electrical engineering, mechanical engineering, surveying, or the like. However, an electronic engineering library of computations could comprise, for instance, 45 computational programs or more, each of which require as many as 600 instruction words implemented in a read-only-memory. Thus an entire computational library would include for example, on the order of 27,000 instruction words of thirteen bits each which would require many conventional chips to implement the electrical engineering library in a conventional calculator. Of course, using a large number of chips can significantly increase the cost of an electronic calculator as well as making the packaging for hand-held use more difficult and unduly increasing power consumption.

In the prior art it is also known that an electronic calculator may be provided with the ability to perform higher order calculators by making the calculator programmable and storing the program in a Random Access Memory (RAM) or on a magnetic tape or card. But, in this case, the program is not permanently stored in the calculator, but must be read into the calculator's memories at least each separate time the calculator is energized; thus, such a program is not directly accessible from the calculator's keyboard.

It is an object, therefore, of this invention to improve electronic calculators and microprocessors.

It is another object of this invention to increase the number of computational programs stored in an electronic calculator without correspondingly increasing the size of the ROM(s) implemented in the electronic calculator.

It is a further object of this invention to make such computational programs directly accessible from the calculator's keyboard.

It is another object of this invention to store a large number of computational programs in the hand-held electronic calculator using a small number of chips.

It is yet another object of this invention to selectively equip an electronic calculator or microprocessor with different libraries of higher order function, which functions may be accessed from the calculator's keyboard and/or from a program stored in a programmable calculator.

It is still another object of this invention that the particular library with which a calculator is equipped may be changed by the end user thereof.

The aforementioned objects are satisfied as is now described. Generally, and in accordance with the preferred embodiment of the invention, an electronic calculator is equipped with first and second ROM's. The first ROM stores a plurality of groups of instruction words, each group effective for controlling an arithmetic unit to perform basic arithmetic operations such as adding, subtracting, multiplying and dividing, taking square roots, forming logarithmic and trigonometric operations and so forth in response to the operation of the first set of keys on a calculator keyboard. Each of these groups of these instruction words contains on the order of 75 to 200 instruction words. Thus, the first ROM is used as a main ROM as in a conventional calculator microprocessor. The second ROM stores a plurality of sets of program codes. Each set of program codes are capable of performing a higher order mathematical program and are read out of the second ROM in response to operation of a second set of keys on the calculator keyboard. Each program code (which comprises eight binary bits in the embodiment disclosed) is effective for addressing a group of instruction words stored in the first ROM in much the same manner as depression of a key in the first set of keys. Thus, a set of program codes may mimic the depression of a plurality of keys in the first set of keys. Therefore, each higher order mathematical program is preferably a series of the basic arithmetic operations stored in the first ROM combined with operations for entry of data and/or constants. The second ROM reads out program codes which serve to address the groups of instruction words stored in the first ROM. By using the second ROM to store such higher order calculational programs, a second set of keys can be used to input commands triggering a long chain of basic arithmetic operations, including data entry operations, without the chance of human error and at a much greater speed than a human operator. Thus, the second ROM, in the preferred embodiment, stores sets of program codes, each program code effective for addressing the first ROM in much the same manner as a single depression of a key in the first set of keys; therefore, a set of such program codes may be advantageously utilized for a large number of higher order calculational programs in an electronic calculator. Since the second ROM must only store on the order of eight bits, or so, to select or address an entire group of instruction words, it should be evident to one trained in the art by utilizing the second ROM herein disclosed that great economies can be effected in total ROM area, when compared with prior art techniques. While I have referred to first and second sets of keys on the calculator keyboard, it is well known that a single physical key may be used to perform several functions and therefore the keys referred to in the first and second sets may be physically the same keys.

In a further aspect, the second ROM is preferably provided by a chip or chips which may be temporarily plugged into the calculator or mocroprocessor system by the end user thereof. Preferably, the calculator or microprocessor system is operated with one or more such second ROM chips, which chips are selected from a group of chips for operation in the calculator or microprocessor system by the end user thereof, according to the end user's particular needs at any given time. In the embodiment disclosed, a major portion of the second ROM is provided by a plugged-in chip and minor portion is provided by a permanently wired-in chip. Thus, in the embodiment disclosed, the end user may select which higher order functions are performable according to which particular second ROM chip is plugged into the calculator while a few high order functions stored in the permanently wired chip is inherently a part of the calculator system disclosed. The second ROM is disposed in a module for ease of handling by the end user of the calculator or microprocessor.

While a calculator system is disclosed herein in detail, it should be evident to those skilled in the art that my invention may also be used in applications other than calculators where a microprocessor with high order capability may be advantageously utilized.

BRIEF DESCRIPTION OF THE DRAWINGS

The novel features believed characteristic of the invention are set forth in the appended claims. The invention itself, however, as well as further objects and advantages thereof, will be best understood by reference to the following detailed description of an illustrative embodiment, when read in conjunction with the drawings, wherein:

FIG. 2 is a simplified block diagram of a multi-chip calculator system which may be utilized in practicing the present invention;

FIGS. 3a–3b are detailed block diagrams of the arithmetic chip featured in FIG. 2;

FIG. 4 is a detailed block diagram of the SCOM chip featured in FIG. 2;

FIGS. 5a–5e depict in representative form the instruction words decoded by the arithmetic and SCOM chips;

FIG. 5f depicts the originization of the EXT signal;

FIG. 5g depicts the first ROM address as stored in the address register;

FIGS. 6a–6b are timing diagrams showing the timing of various parts of the multi-chip system;

FIG. 7 is a representation of the keyboard input matrix;

FIGS. 8a–8d are a composite schematic diagram of the arithmetic chip of FIG. 2;

FIGS. 9a–9e are a composite schematic diagram of the SCOM chip of FIG. 2;

FIGS. 10a–10r are schematics of certain circuits used in FIGS. 8a–8d and 9a–9e;

FIGS. 18a–18i form a composite schematic diagram of the second ROM chip.

LOCATION OF THE DRAWINGS

FIGS. 1, 5h, 7, and 11–19 accompany this patent. FIGS. 2, 3a–3b, 4, 5a–5g, 6a–6b, 8a–8d, 9a–9e and 10a–10r are hereby incorporated by reference from U.S. Pat. No. 3,900,722, entitled "Multi-Chip Calculator System Having Cycle and Subcycle Timing Generators", which issued on Aug. 19, 1975 to Michael J. Cochran and Charles P. Grant, Jr. and which is assigned to the assignee of this invention.

CONCEPTUAL DESCRIPTION

Figure 1:
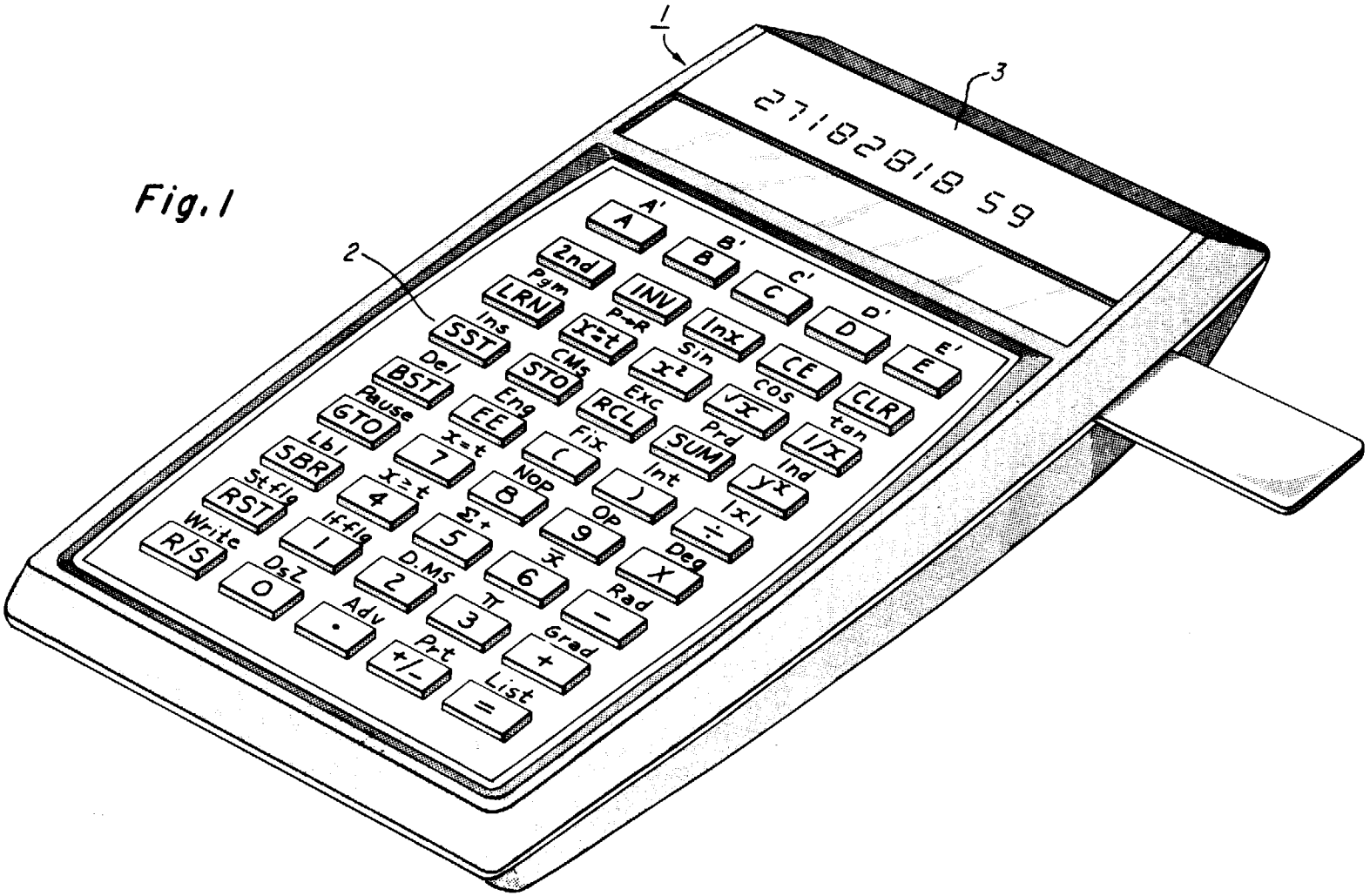
FIG. 1 is a pictorial view of an electronic portable calculator of the type which may embody the invention.
Figure 5H:
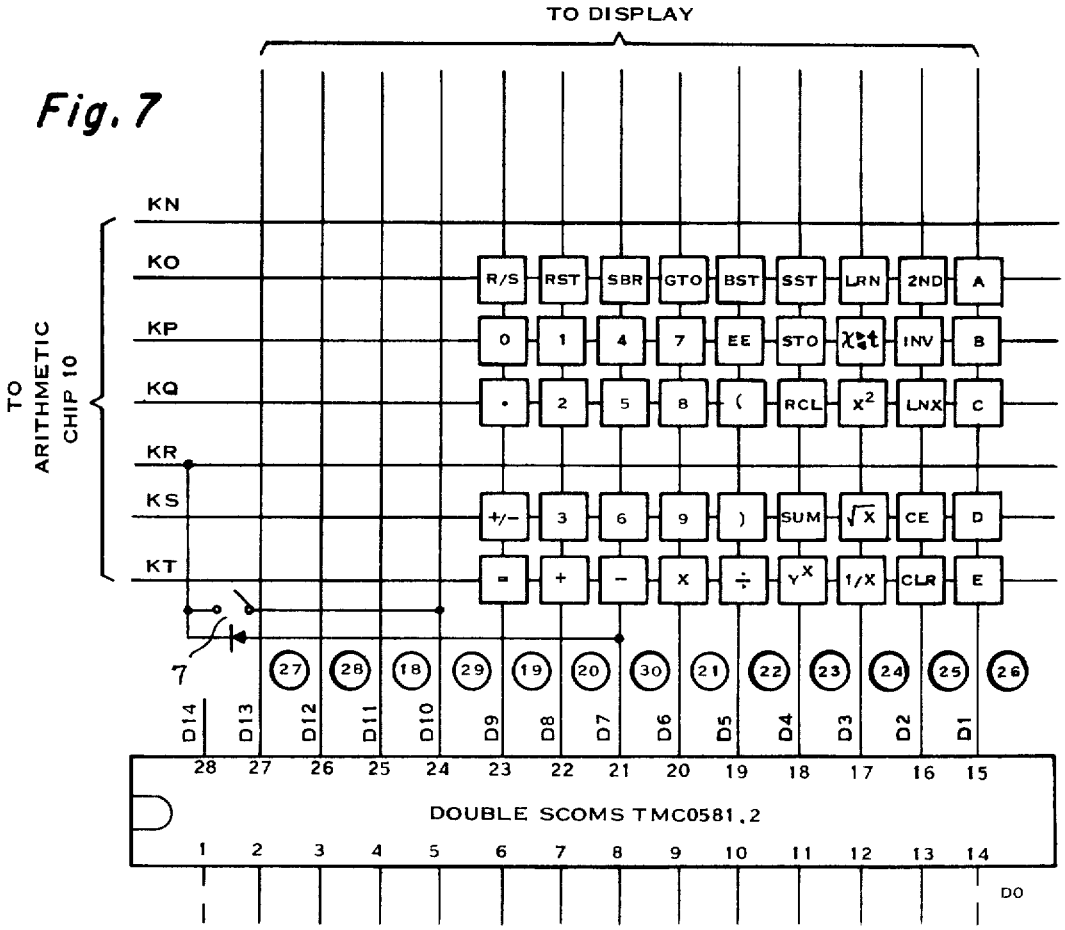
FIG. 5h depicts the instruction words decoded on the second ROM chip and selected instruction words decoded on the arithmetic chip, but which may be conveniently employed in connection with the utilization of second ROM chip.

Referring to FIG. 1, an electronic portable calculator of the type which may employ features of this invention is shown in pictorial form. The calculator 1 comprises the keyboard 2 and the display 3. The display 3, in one embodiment, consists of twelve digits or characters, each provided by an array of light emitting diodes or characters, such provided by an array of light emitting diodes, a liquid crystal display, gas discharge tube or other display means. The display is preferably implemented to having eight mantissa digits, two exponent digits, and two character places for negative signs, etc., (one for the mantissa and one for the exponent), thereby permitting outputting the data in scientific notation for instance. Of course, the type of display and the number of digits displayed is a design choice. Ordinarily, the diplay would be of the seven segment or eight segment variety, with provisions for indicating a decimal point for each digit. The display 2 includes a number of keys (0–9), a decimal point key, the conventional plus (+), minus (−), multiply (×), divide (÷), and equal (=) keys. Further the keyboard perferably includes keys for exponentation ($Y^x$ and inverse $Y^x$) and trigonometric relationships (Sine X, Cosine X, and Tangent X). The calculator is further provided with OP Code Keys for performing special functions such as slope, intercept, plotting operations, alphanumeric operations and the like. Further, the calculator may be provided with keys for storing (STO) and recalling (RCL) data from memory, for clearing the calculator (CLR) and for clearing the last entry (CE). The keys used to access higher order functions will be described subsequently.

Figure 11:
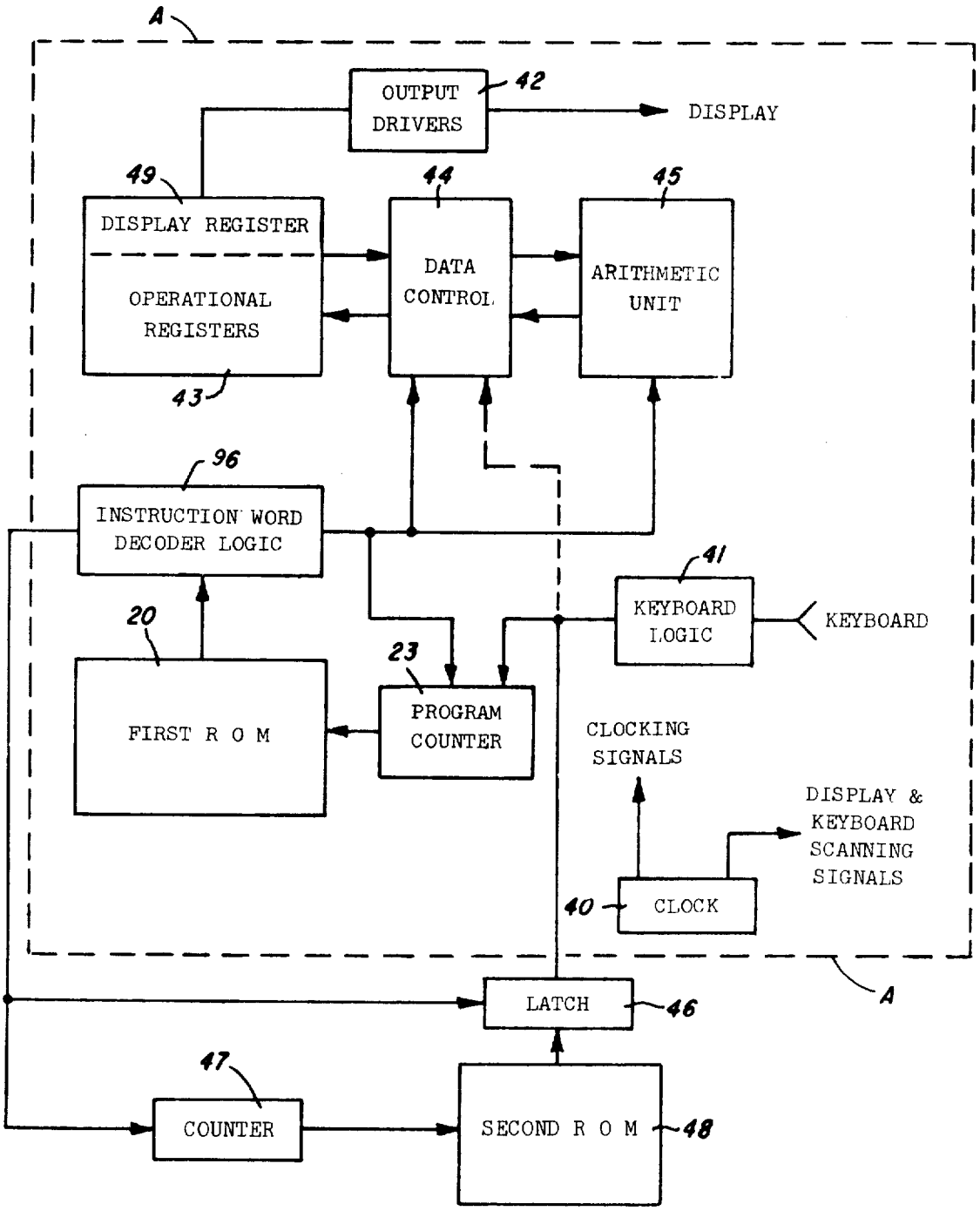
FIG. 11 is a block diagram of a modern electronic calculator equipped with one embodiment of the invention.

In FIG. 11, there is shown in block diagram form, the basic elements of a modern electronic calculator implemented on one or more semiconductor chips. It is to be understood that the block diagram of FIG. 11 is not intended to represent the block diagram of a detailed representation of electronic calculators, but is merely intended to indicate how the additional elements of an electronic calculator system having higher order capability are incorporated into a typical electronic calculator. Subsequently, it will be explained in detail how my invention may be praticed with the multi-chip calculator system depicted in FIGS. 2–19. The calculator of FIG. 11, is shown with a clock 40 which provides clocking signals for transferring data throughout the electronic calculator and provides scanning signals for scanning the display 3 and keyboard 2 or other data entry means. The inputs for the keyboard 2 are provided to keyboard logic 41 which provides an address in response to the depression of a particular key to program counter 23. It should be evident to one skilled in the art that keyboard logic 41, as well as other logic circuitry, may be implemented in the calculator as the elements described or may be implemented as a part of read only memory 20 and instruction word decoder logic 96.

The address received from keyboard logic 41 is inserted into program counter 23 and is utilized in addressing the First Read-Only-Memory (ROM) 20. First ROM 20 contains the microcode for performing basic arithmetic operations and outputs an instruction word in response to the address contained in program counter 23. Program counter typically includes an add-one circuit for incrementing the address in program counter 23. Thus, program counter 23 causes a group of instruction words to be read out of First ROM 20 in response to the incrementing of program counter 23, each instruction word being read out during an instruction cycle. The group of instruction words read out of First ROM 20 corresponds to the address received from keyboard logic 41.

The instruction words read out of First ROM 20 are decoded by instruction word decoder logic 96 to provide instruction commands to program counter 23, arithmetic unit 45 and data control 44. The instruction commands provide to program counter 23 enable branches to be executed by inserting a new address into program counter 23 in response to a branch instruction command stored in First ROM 20. Instruction commands provided to data control 44 and arithmetic unit 45 control the manipulation of numeric data in the calculator. Instruction word decoder 96 is also interconnected with a counter 47 and a latch 46 in my electronic calculator system having higher order math capability.

Data control 44 is interconnected with display register 49, operational registers 43 and with the arithmetic unit 45. Display register 49 stores the number displayed by the display 3 and has associated therewith a plurality of operational registers 43 which are used in conjunction with arithmetic unit 45 to perform arithmetic operations in response to particular instruction commands. Output drivers 42, interconnect display register 49 with a display 3 for decoding the electrical signal, stored in display register 49 and for driving display 3. Data control 44 comprises a series of selector gates for interconnecting the appropriate operational registers 43 and display register 49 with the arithmetic unit 45, with portions of instruction words, (if need be), or with logic signals from keyboard 2 (if need be).

Numeric data is inputted into display register 49 from keyboard 2 either by a data path from keyboard logic 41 via data control 44 under the control of appropriate instruction commands or by inputting selected portions of an appropriate instruction word in response to selected instruction commands. The electronic calculator system hereinbefore described, that being the portion shown within the reference a dashed line in FIG. 11, basically corresponds to the type of electronic calculators known in the prior art. Exemplary of the prior art calculators systems is the calculator system depicted in FIGS. 2–10.

Also in FIG. 11, there is shown a counter 47 and a latch 46 which is responsive to outputs from instruction word decoder logic 96. The counter 47 has an output for addressing a Second ROM 48. Second ROM 48 outputs a program code in response to the inputted address, the program codes being outputted via latch 46 to program counter 23. When keyboard logic 41 decodes keyboard outputs indicating that a higher order math calculation is to be executed, the higher order math calculation being preferably a series of basis arithmetic functions and operations of the type implemented in first ROM 20, keyboard 41 preferably input an address into program counter 23 which causes First ROM 20 to branch to a location therein for calling a program from Second ROM 48. When a program is called from Second ROM 48, instruction word decoder logic 96 first sets latch 46 to permit the program codes outputted by Second ROM 48 to be inputted into program counter 23. The program codes outputted by Second ROM 48 effectively transmit an address into program counter 23 for addressing First ROM 20. The first such code preferably causes the First ROM 20 to branch to a location for performing the first basic arithmetic operation or function required by the Second ROM 48 program. The program codes may take the same logical format, for instance, as the output from keyboard logic 41. When calling a program from Second ROM 48, instruction word decoder logic 96 also transmits an address into counter 47, the address being the first location in Second ROM 48 of the called program. It should be evident, moreover, that counter 47 could be loaded with an address directly from keyboard logic 41 in lieu of from instruction decoder logic 96, this being essentially a design choice.

After the first program code is read out of Second ROM 48 via latch 46 and loaded into program counter 23 then First ROM 20 cycles through a group of instruction words to accomplish the indicated basic arithmetic operation or function. Of course, the number of instruction cycles required to accomplish the indicated operation or function depends on, for instance, a number of instructions contained for that basic operation or function in First ROM 20. As is well known, those operations or functions which are accessible via keyboard logic 41 from keyboard 2, usually contain instruction words for causing the display to be enabled at the end of the function or operation addressed in First ROM 20. Since, however, another program code is to be read from Second ROM 48 and inserted into program 23 upon accomplishment of the indicated function or operation, counter 47 includes an add-one circuit which is responsive to, for instance, a display command or other such commands located near or at the end of a group of instruction words in First ROM 20 for accomplishing a basic arithmetic operation or a function. When the display command or other such command is decoded by instruction word decoder logic 96, the add-one circuit in counter 47 increments and causes Second ROM 48 to read out the next program code of the called program via the set latch 46 to program counter 23, which in turn causes First ROM 20 to cycle through another group of instructions to accomplish the function or operation indicated by the outputted program code. Again, towards the end of this next basic arithmetic function or operation, a display code or other such code will be decoded in instruction word decoder logic 96 causing the add-one circuit in counter 47 to increment counter 47, the cycle repeating itself.

Figure 12:
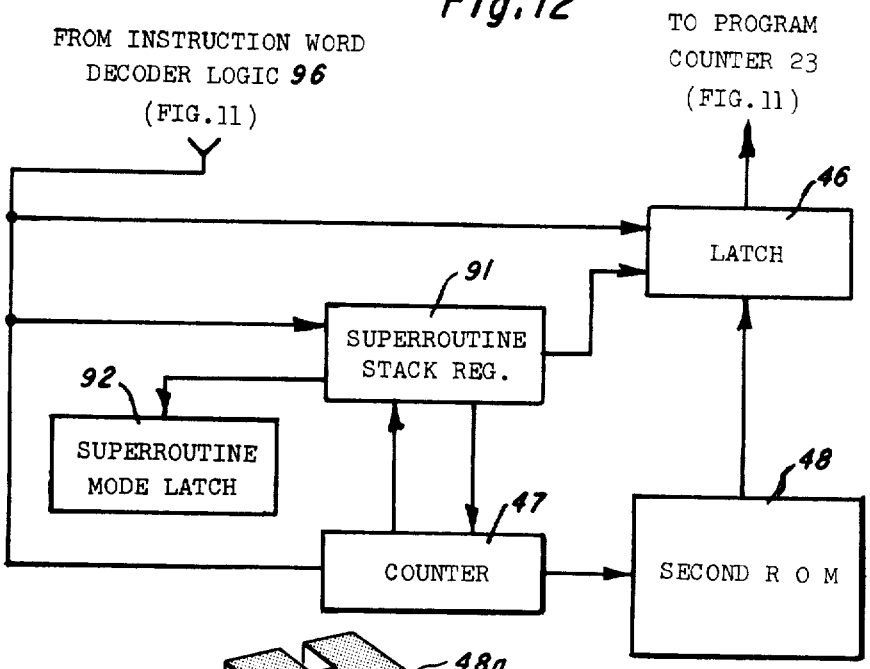
FIG. 12 is a block diagram of another embodiment of the invention which may be utilized with a modern electronic calculator of the type depicted in FIG. 11.

The advantages of Second ROM 48 and associated counter 47 and latch 45 should be evident to one trained in the art. This system permits equipping an electronic calculator with the capability of performing higher order calculation programs: for instance, changing polar coordinates to rectangular coordinates, doing financial calculations or solving complex engineering equations using significantly less total ROM area than would be required if such programs were implemented only in First ROM 20. Additionally, it should be evident that while the foregoing discussion has suggested that a program code read from Second ROM 48 mimics keyboard logic outputs from keyboard logic 41, the program codes read from Second ROM 48 could, in lieu thereof or in addition thereto, have codes which do not mimic the outputs from keyboard logic 41, but rather, for instance, would cause the program counter 23 to branch to locations in First ROM 20 which are not directly accessible from the keyboard. Thus an output from Second ROM 48 may cause program counter 23 to branch to a location in First ROM 20 which could not be accessed directly from the keyboard 2 via keyboard logic 41. One purpose for such a program code would be a program code in a called program to indicate that the end of the program had been reached. This program code, which I shall refer to as the "return" program code, preferably causes program counter 23 to branch to an address location in First ROM 20 which would contain a group of instructions for resetting latch 46 and for displaying the contents of display register 49. The display instruction preferably follows the reset latch instruction, so that when the display command causes counter 47 to increment (if so used), no branching will occur in response thereto at program counter 23. Also latch 46 inhibits outputs from Second ROM 48 from being inserted into program counter 23 whenever a display instruction or other such instruction is decoded by instruction word decoder logic 96 incrementing the add-one circuit in counter 47 when the calculator has not called a program from Second ROM 48. Referring now to FIG. 12, there is shown a partial block diagram of a second embodiment of my calculator system having higher math capability. The latch 46 and counter 47 are interconnected with program counter 23 and instruction word decoder 96 as done in the embodiment shown in FIG. 11. In fact, this embodiment is similar to the embodiment in FIG. 11, except that a superroutine stack register 91 and an associated superroutine latch 92 have been interconnected with counter 23; stack 91 is responsive to outputs from instruction word decoder logic 96. Thus, the program codes outputted from Second ROM 48 are passed to program counter 23 via latch 46; counter 47 is used to address Second ROM 18 and is responsive to instruction word decoder logic 96 for inserting an initial address therein and for incrementing that address in response to decoded display commands, for instance. The superroutine stack 91 functions to either receive an address from counter 47 or to output an address to counter 47, both functions being in response to outputs from instruction word decoder logic 96. Superroutine stack 91 is a multi-level stack and functions in normal last-in-first-out mode. Superroutine stack 91 may be advantageously utilized in calculator systems with higher math capability so that the program codes stored in Second ROM 48, in addition to prescribing addresses for performing basic arithmetic operations and functions according to microcode stored in First ROM 20, may also use First ROM 20 for addressing Second ROM 48 itself. The advantages of this superroutine stack 91 may be best seen by example. For instance, Second ROM 48 may be implemented with program codes to perform the factorial function, and during the calculation of statistical programs, such as combinations and permutations, it is often advantageious to be able to use the factorial function. If a factorial function and the statistical combination function are both implemented in Second ROM 48, then the combination function program may call the factorial function, if a superroutine stack 91 is utilized. The point of exit from the combination function program must be stored so that the program can return thereafter accomplishing the factorial function. Thus, the address in counter 47 to which the program must return in Second ROM 48 after accomplishing the factorial function is stored in superroutine stack 91 because a new set of addresses will be loaded into counter 47 when the factorial function is executed. Whenever an address has been stored in superroutine stack 91, superroutine latch 92 is set. Further, as aforementioned, the factorial program will preferably have a "return" program code loaded in Second ROM 48 at the end thereof. This return code normally causes latch 46 to be reset. However, the return code is inhibited from setting latch 46 when superroutine latch 92 has been set. Latch 46 is not reset at this time because the program codes being read from the Second ROM 48 must continue to be inserted in program counter 23 to carry out the main program, eg, the combination function program in the aforementioned example. Although the return code is not used to reset latch 16 if superroutine latch 92 is set, the return code is used to "pop" the address in the stack back into counter 47. Since stack 91 is a multi-level stack, several levels of "superroutines" may be utilized.

Preferably, the second ROM 48 is implemented by a ROM chip which is provided with a package permitting it to be plugged into the aforementioned electronic calculator. The second ROM chip is preferably packaged in a form to facilitate handling by the end user of the calculator to permit easy installation of that chip into the electronic calculator. Preferably, the electronic calculator system of this invention receives, at any given time, one second ROM chip, but the operator thereof selects which particular second ROM chip is plugged into the calculator system. The operator ROM chips each programmed to perform different types of high order functions. For instance, one or a plurality of second ROM chips may be provided for performing statistical problems while another ROM chip or chips is provided for performing surveying problems; still yet another second ROM chip or chips may be provided for performing aviation or navigational problems, for instance. Thus the end user of the calculator can configure a basic calculator to perform many different types of high order functions depending upon the particular library available in the particular second ROM chip or chips plugged into the electronic calculator of this invention.

Figure 13:
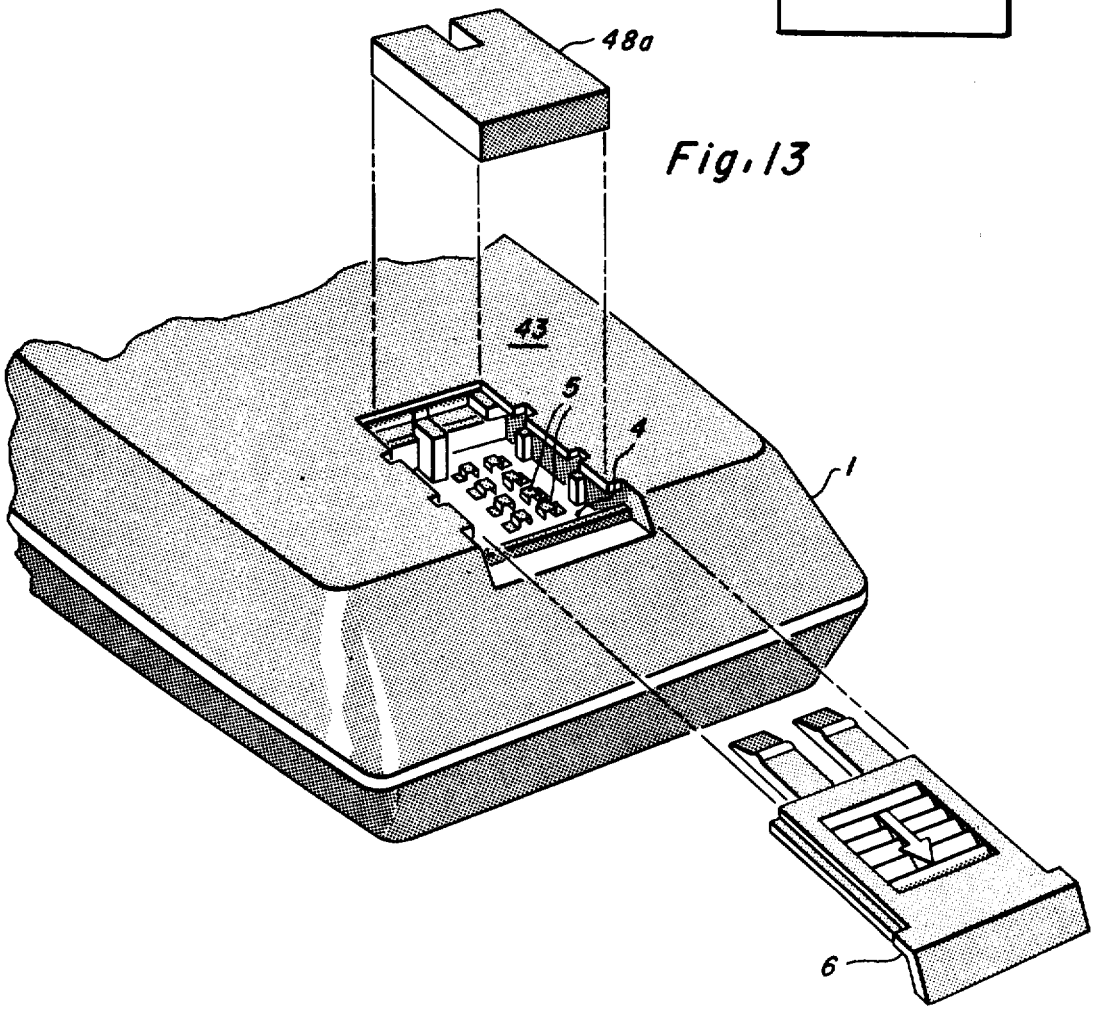
FIG. 13 is a pictorial view of an electronic calculator having an opening for removeably receiving a packaged second second ROM chip.

Referring to FIG. 13, there is shown an electronic calculator having an opening 4 for exposing contacts 5, which are connected to the electronics of the calculator. Opening 4 is preferably provided on the rear side of the calculator case 1 as shown in the FIG. 1 and forms, with contact 5, a receptacle for receiving module 48a. Opening 4 is adapted to removably receive the second ROM 48, which is not shown in FIG. 13, but which is disposed in module 48a. Second ROM chip module 48a has contacts (not shown) which mate with contacts 5 for connecting the second ROM 48 therein to the electronic calculator. Door 6 may be closed to retain module 48a in opening 4 during normal operation.

THE SPECIFIC EMBODIMENT IN A PROGRAMMABLE CALCULATOR

Having described how the second ROM is advantageously used with an electronic calculator, a particular embodiment of the second ROM in a particular calculator is now described.

Figure 14:
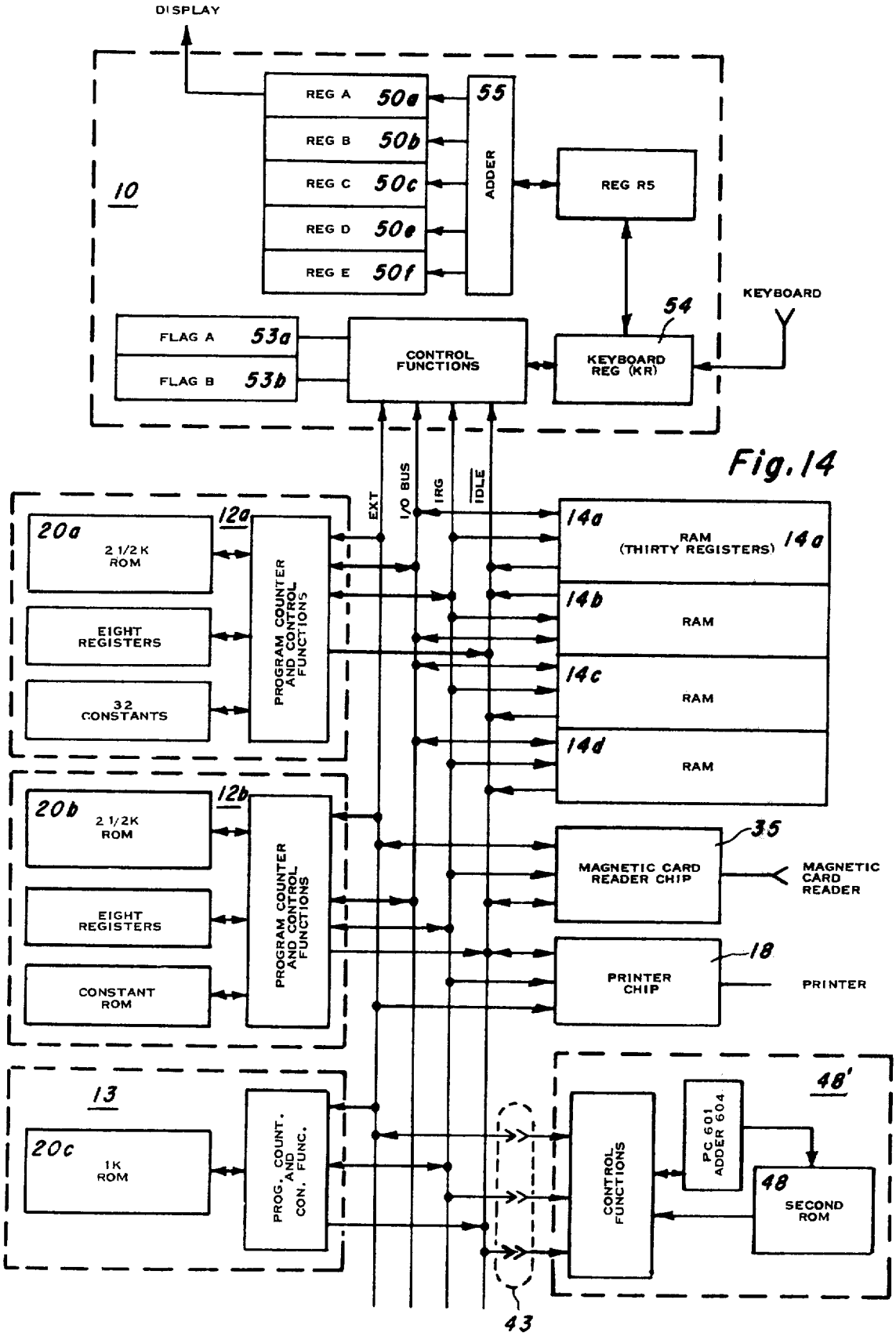
FIG. 14 is a simplified block diagram of a multi-chip calculator system utilizing the present invention.

Referring now to FIG. 14, there is shown a detailed block diagram of an specific embodiment of a programmable electronic calculator employing the second ROM 48 of this invention. In FIG. 14, there is shown a plurality of chips (48', 10, 12a, 12b, 13, 14a–d and 18). Chips 10, 12a, 12b, 13, and 18 have heretofore been described in some detail in prior U.S. Patents and Patent Applications and therefore reference will be made to U.S. Patents or U.S. Patent Applications, as the case may be, for a detailed description of these chips. The following discussion will basicly relate to how chips 10, 12a, 12b and 13 cooperate with a second ROM chip 48'; which is described hereafter in detail, to implement a calculator having high order capability.

The calculator's arithmetic chip 10 has a plurality of Registers 50a–50e for storing numeric data, an Arithmetic Unit 55 for performing arithmetic operations on the data stored in Registers 50a–e, Flag Registers 53a–b for storing a plurality of flags, a keyboard register 54 which is (1) loadable with a decoded keyboard address derived from the calculator's keyboard, (2) loadable from a subroutine register or (3) loadable from the second ROM chip 48'. Arithmetic chip 10 is described in detail in aforementioned U.S. Pat. No. 3,900,722 which issued to Michael J. Cochran and Charles P. Grant, Jr. on Aug. 19, 1975 and which is assigned to the assignee of this invention. Line 21, column 4 through line 31, column 44 of U.S. Pat. No. 3,900,722 is hereby incorporated herein by reference.

U.S. Pat. No. 3,900,722 discloses a multiple chip calculator system employing the aforementioned arithmetic chip 10 and a scanning and read-only-memory (SCOM) chip. U.S. Pat. No. 3,900,722 discloses that eight SCOM chips may be utilized in a single calculator system. Referring again to FIG. 14, chips 12a and 12b are each double SCOM chips; a double SCOM chip is the equivalent to two SCOM chips of the type disclosed in U.S. Pat. No. 3,900,722 implemented on a single chip of silicon, with the F and G registers thereof replaced by a single eight register memory of the type disclosed in U.S. Patent Application Ser. No. 745,157 which was filed Nov. 26, 1976 and which is assigned to the assignee of this invention.

External ROM chip 13 provides for increased instruction word storage capacity. The ROMs 20a and 20b on double SCOM chips 12a and 12b and the ROM 20c on chip 13 provide the first ROM 20 for storing the microcode which controls the operation of the calculator system. The microcode stored in ROM's 20a–20c is listed in Tables IIa–IIc, respectively. ROM 20c is a 1 K×13 bit ROM while ROMs 20a–20b are each 2.5 K×13 bit ROMs.

Referring briefly to Tables IIa–IIc, the first column thereof is the hexidecimal address of the microcode instruction word appearing in the third column. The second column identifies the chip in which the microcode is stored. TMC-582 and TMC-583 are the two double SCOM chips 12a and 12b; TMC-571 is the external ROM chip 13. The fourth through nineteenth columns contain instruction words whose addresses are incremented by one for each column, reading from left to right. Thus, in Table IIa, the seventeen instruction words in the first row, columns three through nineteen are located at hexidecimal addresses 0000 through 0010. The instruction words are in hexidecimal format also and correspond to the instruction words identified in FIGS. 5a–5h.

As explained in U.S. Pat. No. 3,900,722, the arithmetic chip 10 and the double SCOM chips 12a and 12b are interconnected by lines for exchanging the following control signals: external (EXT), input/output (I/O), instruction words (IRG), and $\overline{\text{IDLE}}$. External is a serial data channel which may be used, for instance, for addressing ROMs 20a–20c using an address stored in the keyboard register 54 when the PREG bit thereof is a logical one or for inputting or outputting serial data depending on the instruction word outputted on IRG (when the PREG bit is a logical zero). I/O is a four bit parallel data channel for transferring data in bit parallel, digit serial fashion under control of construction words outputted from ROMs 20a–20c. IRG is a serial channel for transmitting the instruction word from the particular ROM 20a–20c controlling the oeration of the system.

In FIG. 14, there are shown four multi-register chips 14a–14d which are connected to the I/O, IRG, and $\overline{\text{IDLE}}$ lines. These multi-register chips are essentially random access memory (RAM) chips which are utilized for storing the data used by the calculator system and programmed functions. It should be evident that the numbers of such chips as well as the size of the RAMS thereon is a design choice.

The magnetic card reader chip 35 is responsive to EXT, IRG and $\overline{\text{IDLE}}$ for inputting digital information to the calculator system from magnetic cards or outputting digital information from the calculator system to magnetic cards. Chip 35 is described in greater detail in U.S. Pat. Application 622,288 filed Oct. 10, 1975 and now U.S. Pat. No. 4,006,455. Of course, the use of a card reader is a design choice. If chip 35 is not utilized, the diode and switch 7 shown in FIG. 7 should be omitted. Switch 7 closes in response to a card being inserted into the card reading mechanism associated with chip 35.

Printer chip 18 may be used to provide the calculator of this invention with printing capability. It should be evident that the utilization of printer chip 18 is a design choice and further this chip may be either permanently installed in a printer calculator or may be installed in a print cradle, such as the PC 100a cradle manufactured by Texas Instruments Incorporated of Dallas, Texas which print cradle may be interfaced with a hand-held calculator provided with printing capability. Chip 18 is described in greater detail in U.S. Pat. Application Ser. No. 428,492 filed Dec. 26, 1973 and now U.S. Pat. No. 4,020,465.

The second ROM chip 48' is interconnected with the calculator system via external, IRG and $\overline{\text{IDLE}}$. Chip 48' includes a second ROM 48 of the type heretofore discussed plus various control circuits for interfacing it with the remainder of the calculator system disclosed. As previously mentioned, second ROM chip 48' is preferably removable from the calculator of this invention and therefore a plug assembly 43 is provided for ease of removal and insertion. Preferably, the calculator of this invention is provided with a plurality of such second ROM chips 48', at least any one of which may be connected into the calculator system at any given time. This plurality of ROM chips 48' are programmed to provide different types of problem solving capabilities. For instance, one chip 48' might be implemented with programs for solving statistical problems while another might solve financial, surveying, navigation, medical, mechanical or electrical engineering problems, or the like. Moreover, it should become evident to those skilled in the art, that a plurality of such chips 48' might be interfaced with a calculator at one time if such chips were provided with a chip selection means for identifying which second ROM chip 48' is being addressed at any given time. Such chip selection circuits, while not used in the embodiment herein disclosed, are well known in the art.

While the second ROM of this invention is described as a read-only-memory, it should be evident to those skilled in the art that second ROM might be an electrically alterable device, such as an EPROM, or the like. Similarly, a bubble memory or other such non-volatile memory means could also be utilized as a second ROM.

In Table VIII there is a listing of program codes used in a general purpose second ROM chip 48' to perform such operations as: performing a diagnostic checks, complex math operations, matrix math operations, matrix inversion, annuity and compound interest operations, permutation and combination calculations and the like. The program codes are listed in columns 3–19 of Table VII. The address of the program code in column three is given in column one and the addresses of the other program codes on the same line increment by one for each column reading from left to right.

ORGANIZATION OF PROGRAMS STORED IN THE SECOND ROM

As it has been previously discussed, the second ROM stores a plurality of program codes for performing high order functions. The organization of these program codes on chip 48' is now described in detail. In this embodiment, the program codes comprise a pair of four bit binary coded decimal (BCD) digits. Therefore, these codes may be any number between 00 and 99.

Figure 15:
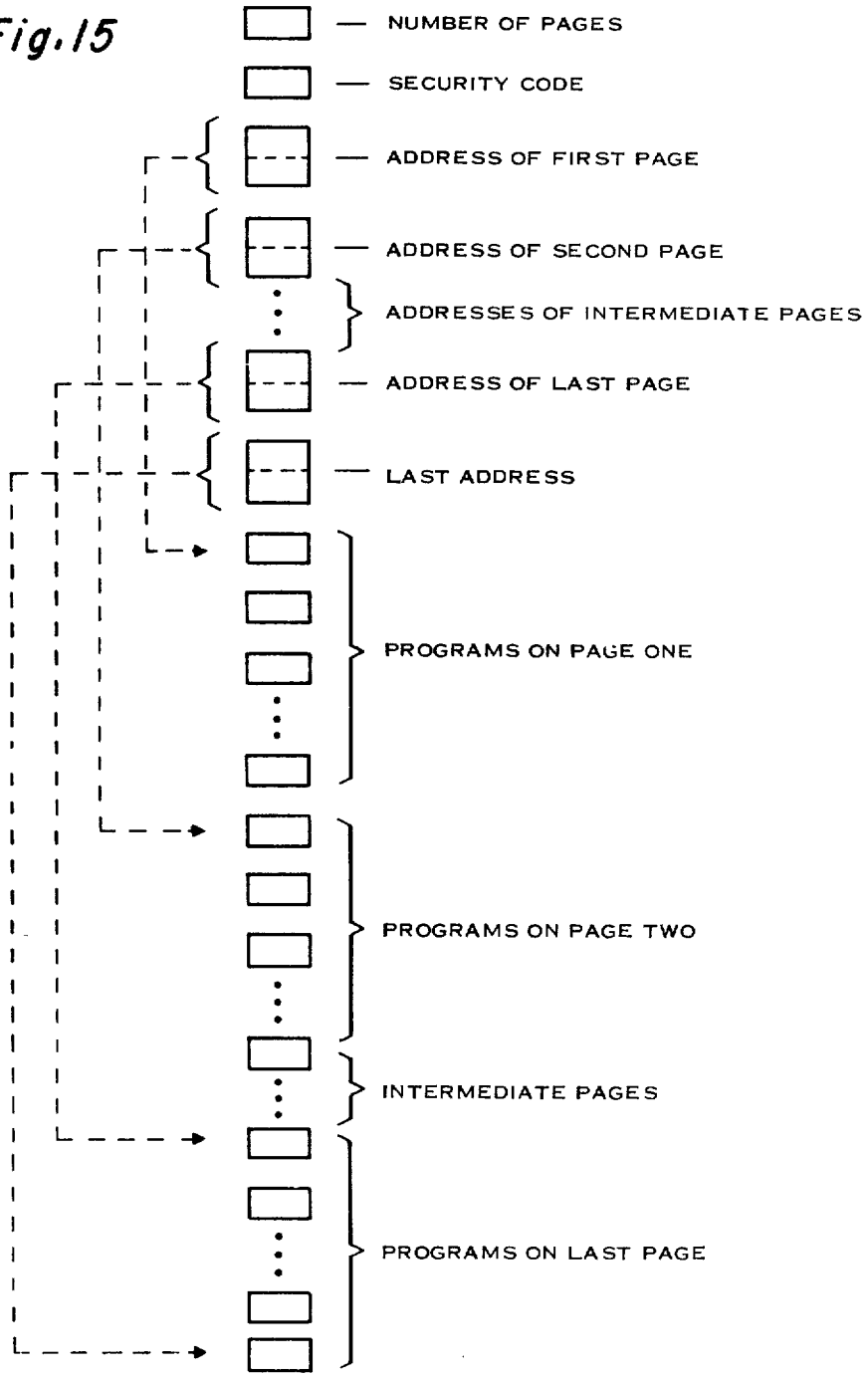
FIG. 15 is a function diagram of the logical organization of data stored in the second ROM.
Figure 16:
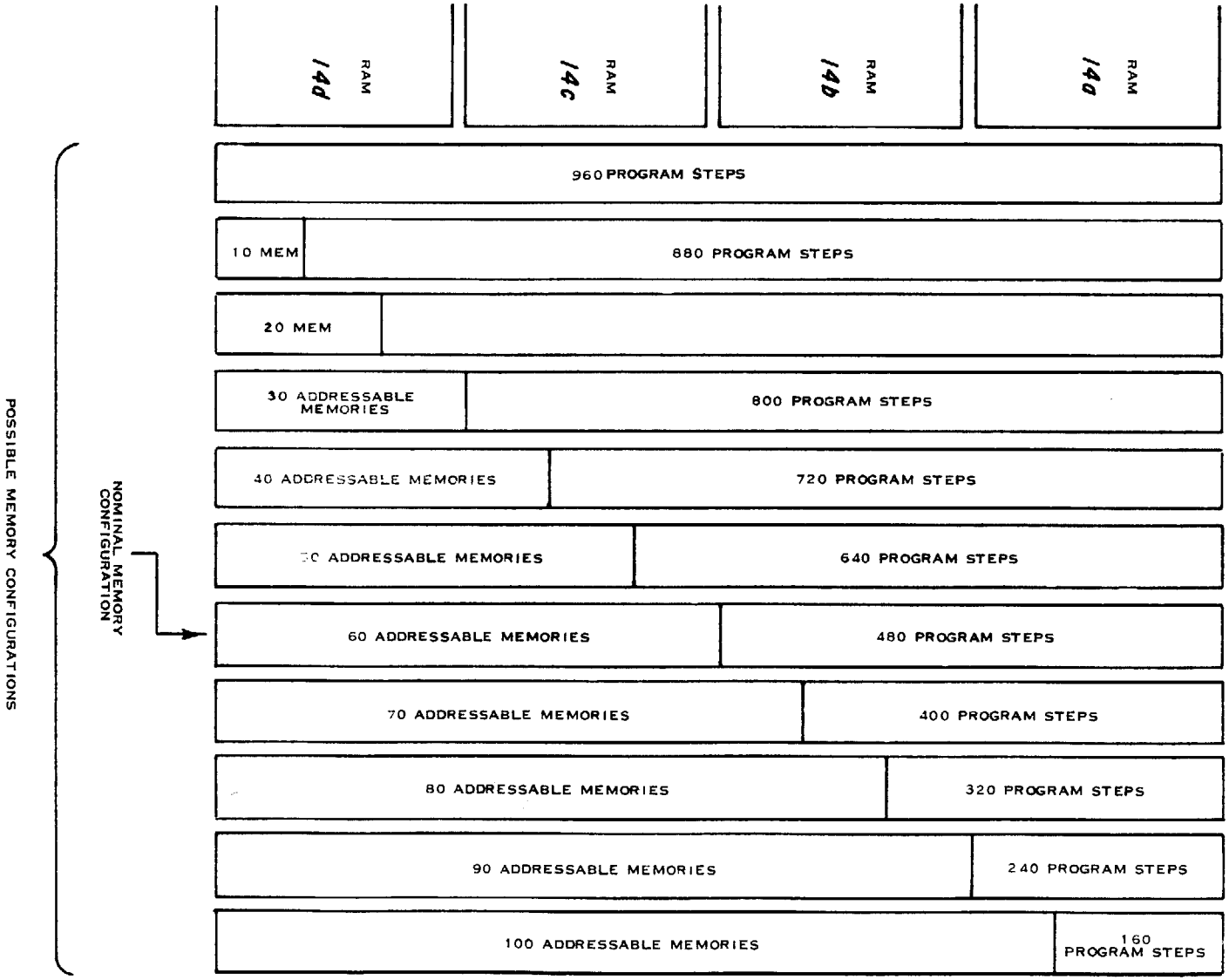
FIG. 16 depicts the variable boundary between data and program steps in the calculator's memory.

Referring now to FIG. 15, there is shown a functional diagram of how the program codes are organized on the second ROM of chip 48' and preferably a second ROM implemented in a pluggable package. In this embodiment ROM 48 stores on the order of 5,000 eight bit program codes. Referring now to FIG. 15, a rectangle thereon represents an eight bit code outputtable from ROM 48 in response to an address. Second ROM 48 stores a plurality of programs, which are for ease of addressing, arranged on "pages". Several programs are preferably allocated to each page. When a program is second ROM 48 is to be accessed from the calculator's keyboard, the operator depresses the "2ND" key and the "program" key (PGM) in this embodiment. The operator next enters a two digit number indicating the page upon which the program he or she wishes to access exists. For instance, if he or she wishes to access a program on page twelve, he or she would depress the one and two number keys. The operator knows upon which page the desired program exists because a program directory is preferably supplied along with a pluggable second ROM chip 48'. The operator then preferably enters a label to uniquely identify the particular program which is desired on the page previously entered. This is done by depressing either a particular label key A—E or A'—E' or the subroutine key (SBR) followed by a non-number key (e.g., SBR, =; or SBR, $X^2$; or the like). Depressing the subroutine key and entering a three digit address preferably causes a branch to the location equal to the sum of the inputted address plus the address of the first program code on the inputted page.

The calculator is preferably permanently programmed to first read out the program code at location 0000 which indicates the number of pages stored on that particular second ROM 48. This number is compared with the inputting page number to assure that the inputted page number exists in second ROM 48. Next the security code at location 0001 is preferably outputted for examination, the function of which will be later described. The next step is to address second ROM 48 with the entered page location, the address being derived by multiplying the inputted page number by two. For example, if page 02 is entered, then the address to be used is 0004. At address 0004 is a top half of the address (the thousands and hundreds digits) for the beginning point of the second page. At address 0005 is the bottom half of the address (the tens and units digits). The program codes at locations 0004 and 0005 define the address where the second page begins in second ROM 48. Locations 0006 and 0007 will also be read out to provide the address of the beginning point of the third page, which is indicative of the ending point of the programs stored on the second page. Thus the address of the second page derived from locations 0004 and 0005 is used as the starting point for a label search and the address of a third page is used to define the ending point of that search.

The program in second ROM 48 is caused to branch to the program code which occurs at the starting point of page two. At page two in second ROM 48, the label search is commenced by reading out program codes sequentially until either the label being searched for is detected or the beginning point of page three is encountered, indicating that the label being searched for does not exist on the page selected. The label being searched for is either a particular label program code (Table III code 10–19) or the label program code (Table III, code 76) followed by a particular non-numeral program code. When the last page is selected, then the address of the last page, as well as the last address on that page are read out to fulfill the function of reading out the addresses of pages 2 and 3 in the foregoing example. This sequence of events is also diagrammatically depicted in FIG. 15.

Referring now to Table III, there is shown a list of the program codes 00–99 preferably used in the calculator system of this invention along with the corresponding functions performed by these codes and the key sequences used to generate the codes when generated from the keyboard. As can be seen, certain program codes may not be directly generated from the calculator's keyboard. The functions performed by the program codes listed in Table III should be evident to those skilled in the art based on the description set forth in Table III. By way of further clarification, however, the inverse function key (INV) is used to perform the inverse of the function indicated for selected keys. For instance, the inverse function key when combined with the LNx key causes the calculator to take the number $e^x$ in lieu of taking the natural logorithm of the number x. The indirect addressing key (IND, which must be used in combination with the 2ND key, of course) is used with the memory operation keys and "go to" or "conditional go to" keys (GTO, $X \times T$ or $X \geqq T$) to indicate that the number following the program code does not describe either the memory used (if a memory operation) or the branching location (if a go to or conditional go to operation), but rather identifies the particular memory whose contents define either the particular memory to be used (if a memory operation) or the branch address (if a go to type instruction).

Referring again to Table III, program codes 00–09 define the ten numeral keys and the remaining program codes are defined according to the following convention. The first number thereof identifies the keyboard row in which the key is located and the second number defines the keyboard column in which the key is located, for the basic functions which may be accessed by a single key push. For functions accessed by multiple key push sequences, selected merged program codes are utilized. For instance, when the 2ND key is combined with another key to perform the operations indicated, the number 5 is added to the basic program code (without a carry) to generate the merged program code. Thus, for example, the label A is stored as a program code "11" whereas the label A', which requires the 2ND key to be actuated before the A key, is stored as program code "16". Program codes which otherwise would define those keys performing the numeral functions (eg, 0–9), are reserved for selected merged program codes or for program code not directly generated at the keyboard. For example, program codes 62, 63, 64, 72, 73, 74, 83 and 84 are used for merged program codes wherein the IND key is used. Program codes 82 and 92, which are not defined according to the foregoing convention, define a heirarchy address function and the "return" function. The "return" function has already been mentioned and the heirarchy address function is used to address the eight registers on one of the double SCOM chips, which are set aside for heirarchy control purposes. This calculator system utilizes the algebraic operating system disclosed in U.S. Patent Application Ser. No. 708,958 filed July 26, 1976, for heirarchy control purposes. The heirarchy address code (82) is followed by another program code to define the heirarchy register and operation involved or to define a conditional return, whose function will be mentioned later. The meaning of the program code following the heirarchy address code is set forth in Table IV.

The use of such codes which are not directly accessible from the keyboard permit the accomplishment to special functions or entry in to date areas which are normally isolated from the operator.

The operation code (OP) is used with a following program code for calling the special functions identified in Table V. These routines are implemented in this calculator either in microcode alone or by using second ROM addressing techniques. The second ROM are for such operation code functions is located in the constant ROM areas of double SCOM chips 12a and 12b. Approximately half of the constant ROM in double SCOM chip 12a is used for storing constants in the manner contemplated by U.S. Pat. No. 3,900,722 while the other half of that constant ROM and all of the constant ROM in double SCOM 12b is used for storing program codes, as defined in Table III, in the manner generally set forth in U.S. Patent Application Ser. No. 714,464, filed Aug. 16, 1976. The contents of the constant ROMs are listed in Table VI hereof. Eight two digit program codes are stored in each constant storage area in the constant ROMs. The codes are stored from right to left; thus the first program code in constant area sixteen is an 82. The addresses of these program codes for discussion purposes will be: Constant number hyphen one of eight locations. Thus, the address of the first program code on constant area sixteen (82) is 16-0, while the third program doce in constant area eighteen (43) is 18-2. Locations 16-0 through 24-2 contain a slope-intercept routine. The other routines in the constant ROM area are defined in Table VIa. As can be seen, the functions stored in the constant ROM areas are accessed either by OP codes or by normal keyboard entries; for example, the polar to rectangular conversion function is stored in the constant ROM areas and is accessed by depressing the P→R key on the keyboard.

The program codes in Table VI make use of the conditional return program code (82 followed by 20). The conditional return evokes a return function only when all the program codes for the accessed function have been read out. For instance, if the variance is being calculated, the conditional return stored at locations 26-2 and 26-3 is ignored so that after having found the mean according to the program codes at locations 24-3 through 29-2 is performed. The hierarchy address function (program codes 82,-) used with several routines to address the hierarchy registers in order to maximize the addressable storage area available in RAM chips 14a–14d.

STORING A KEYED-IN PROGRAM

When the operator desires to utilize his or her own program in lieu of a program stored in the first or second ROM's, he or she may do so by an appropriate key sequence for storing keyboard enterable program codes of Table III in RAMs 14a–14d. RAMs 14a–14d may also be used for storage of numeric data, i.e., the results of the calculations performed by this electronic calculator. Normally, RAMs 14a–14d provide a storage for storing 480 program codes while RAMs 14c and 14d provide 60 addressable memory locations for storing numeric data. By depressing 2ND, OP, 1, 6, the operator may determine which data configuration RAMs 14a–14d are in; in this case, the number 479.59 would be outputted. The number to the left of the decimal point is the maximum address in RAMs 14a–14d for program steps, while the number to the right is the maximum address in RAMs 14a–14d of memory registers.

By inputting a number between one and ten, 2ND, OP, 1, 7; the inputted number is used as the number of decodes of memory registers set aside in RAMs 14a–14d and the resulting configuration is displayed in the aforementioned manner. For example, inputting 7, 2ND, OP, 1, 7 results in RAMs 14a–14d being repartitioned with seventy memory registers and 400 program step locations; also 399.69 would appear in the display.

RAMs 14a–14d can store up to 120 sixteen digit words and can be partitioned to store as many as 960 program codes with no addressable memory registers to as few as 160 program codes with 100 addressable memories in this embodiment. As can be seen from FIG. 16, the addressable memory locations may be traded at the rate of 10 for 80 program step locations when repartitioning takes place. Of course, the precise number of memories as well as the range of possible data configurations is a design choice.

Figure 19:
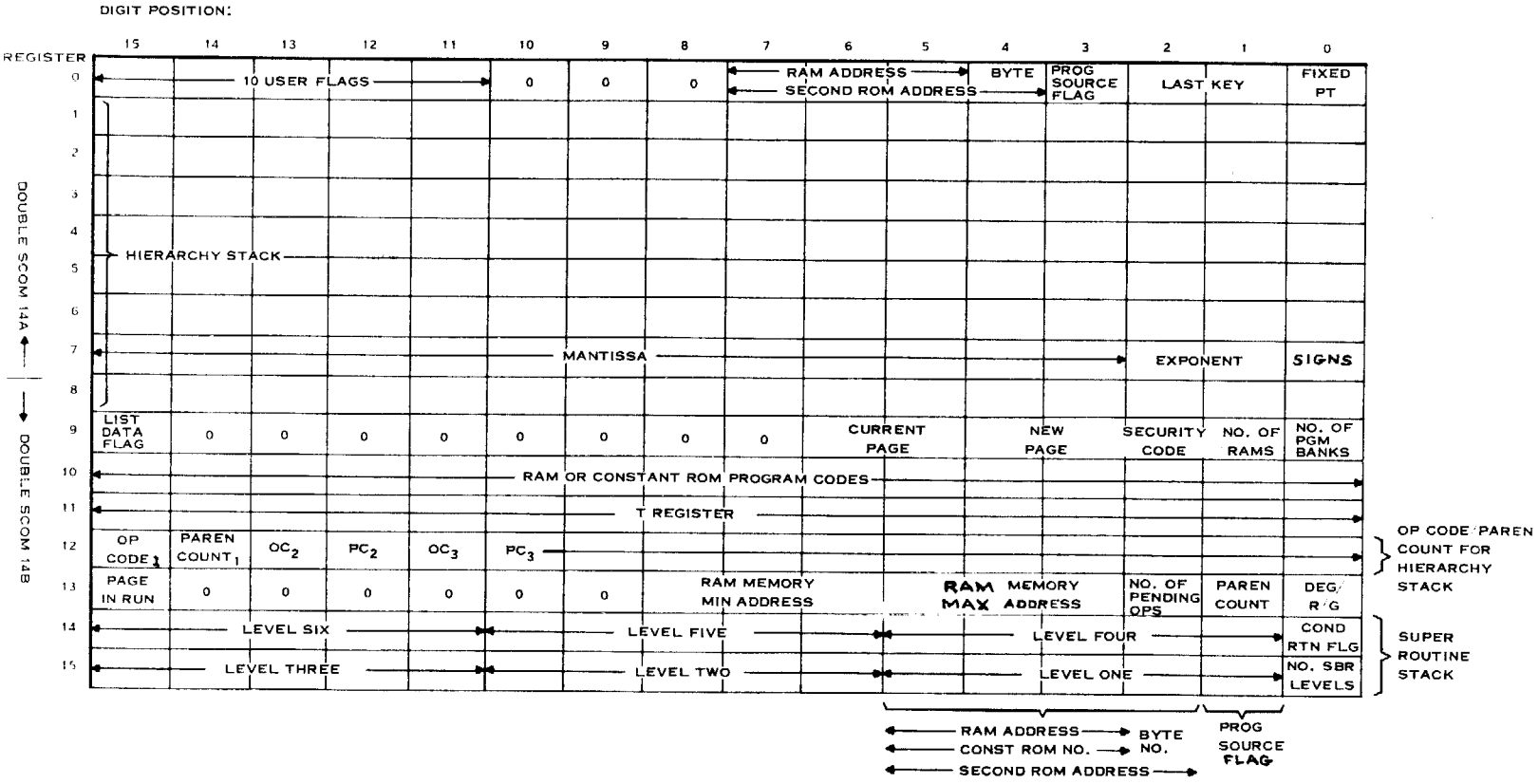
FIG. 19 is a representation of data stored in the memory registers on the double SCOM chips.

The partitioning data is stored in digits 3–8 of register 13 on double SCOM chip 14b (see FIG. 19). Digits 8-6 holds the actual address in RAMs 14a–14d defining the location of memory 00 while digits 5—5 hold the largest number assigned to a memory. Thus, in the normal 479.59 configuration, 060 is stored in digits 8-6 while 059 is stored in digits 5-3. Attempting to branch to a program location equal to or greater than the contents of digits 8-6 causes an error condition, as does addressing a memory greater than the number in digits 5-3 of register 13.

Referring again briefly to FIG. 14, the down load operational code may be utilized to permit a page in second ROM 48 to be loaded into the program code storage area of RAMs 14a–14d. The security code in the second ROM 48 to be down loaded must be a 00 to permit the down loading to occur. A 01 security code inhibits the down loading operation, thereby helping to maintain the secrecy of the programs stored in second ROM 48 should that be desired. If the security code bit is set, then the programs in the second ROM may be utilized to perform the function indicated but the series of program codes may not be read out of the calculator to the operator. After a program is down loaded into RAMs 14a–14d, the operator has free access for examining the program and altering it as he or she sees fit.

ALPHANUMERIC PRINTING OPERATIONS

Operational (OP) codes 00–07 are used for alphanumeric printing operations when the calculator of this invention includes a printer. For example, a thermal printer in combination with printing chip 18, such as that provided by the PC-100a disk unit manufactured by Texas Instruments Incorporated of Dallas, Tex. may be used. The twenty character position PC-100a printer may be utilized for printing a line of alphanumeric characters chosen by the operator by loading five two-digit character codes from the display register into four printing buffers. These two-digit alphanumeric character codes are listed in Table VII. The display register is first loaded with five two-digit codes from the keyboard, which are transferred to one of the buffers by OP01–OP04 codes; of course, each buffer stores one fourth of a line of characters.

The contents of the buffers are printed by a 2ND, OP, 0, 5 key sequence or by encountering 69, 05 program codes from either the RAMs 14a–14d or second ROM 48.

OP code 06 causes the printing of the contents of one buffer and the numeric contents of the display register. OP code 07 prints an asterisk in the column corresponding to the interger portion of the number then in the display register, provided that number is in the range of 0–19. Thus, OP code 07 is preferably used for plotting a series of answers obtained by the calculator. Of course, the range 0 to 19 is a design choice and, of course, to make better use of this plotting capability, the answers to be plotted are preferably first normalized to occur within the range 0 to 19.

DESCRIPTION OF THE SECOND ROM CHIP AND THE INTERFACE BETWEEN THE SECOND ROM CHIP AND THE OTHER CALCULATOR CHIPS

Figure 17:
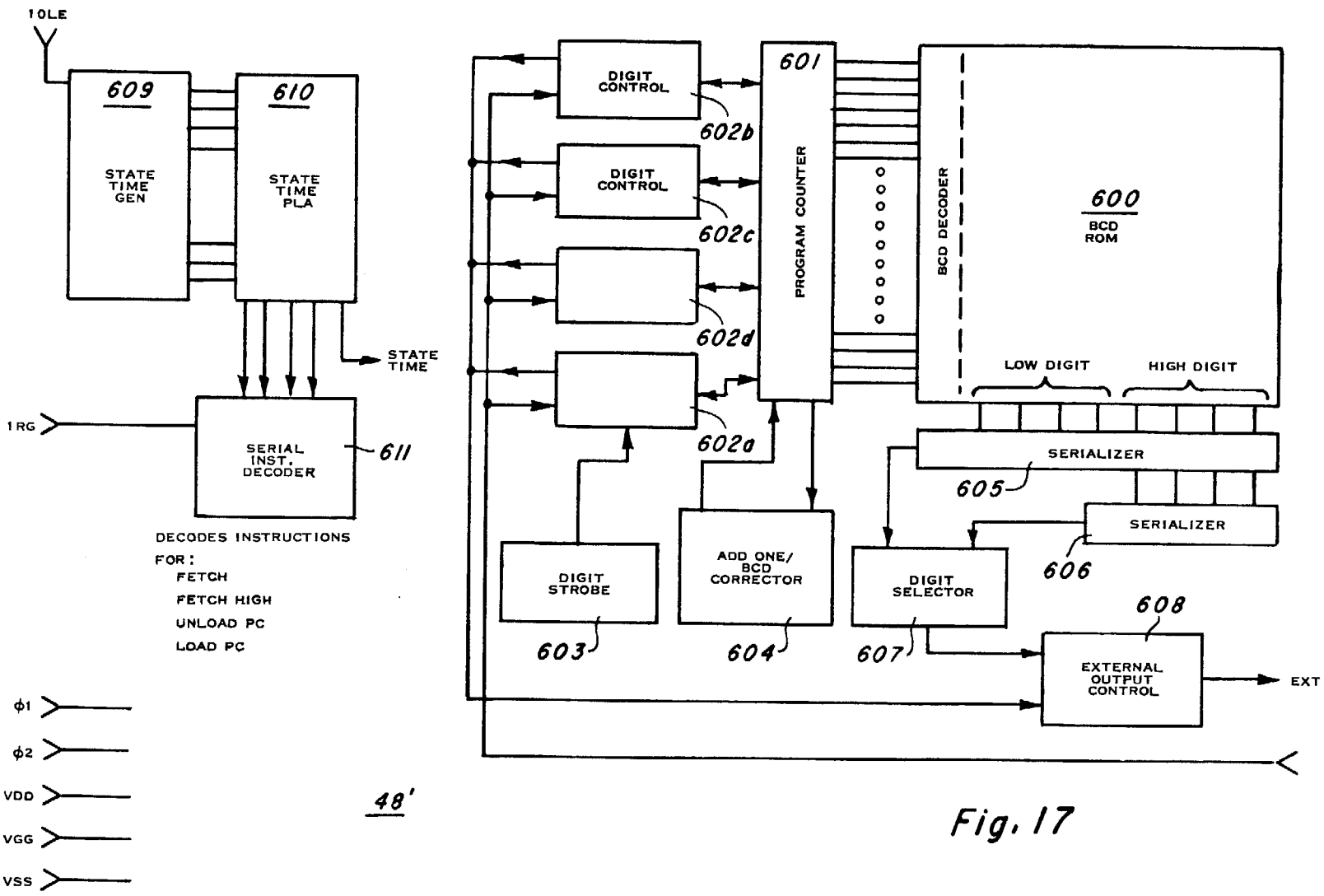
FIG. 17 is a block diagram of the second ROM chip.
Figure 18A:
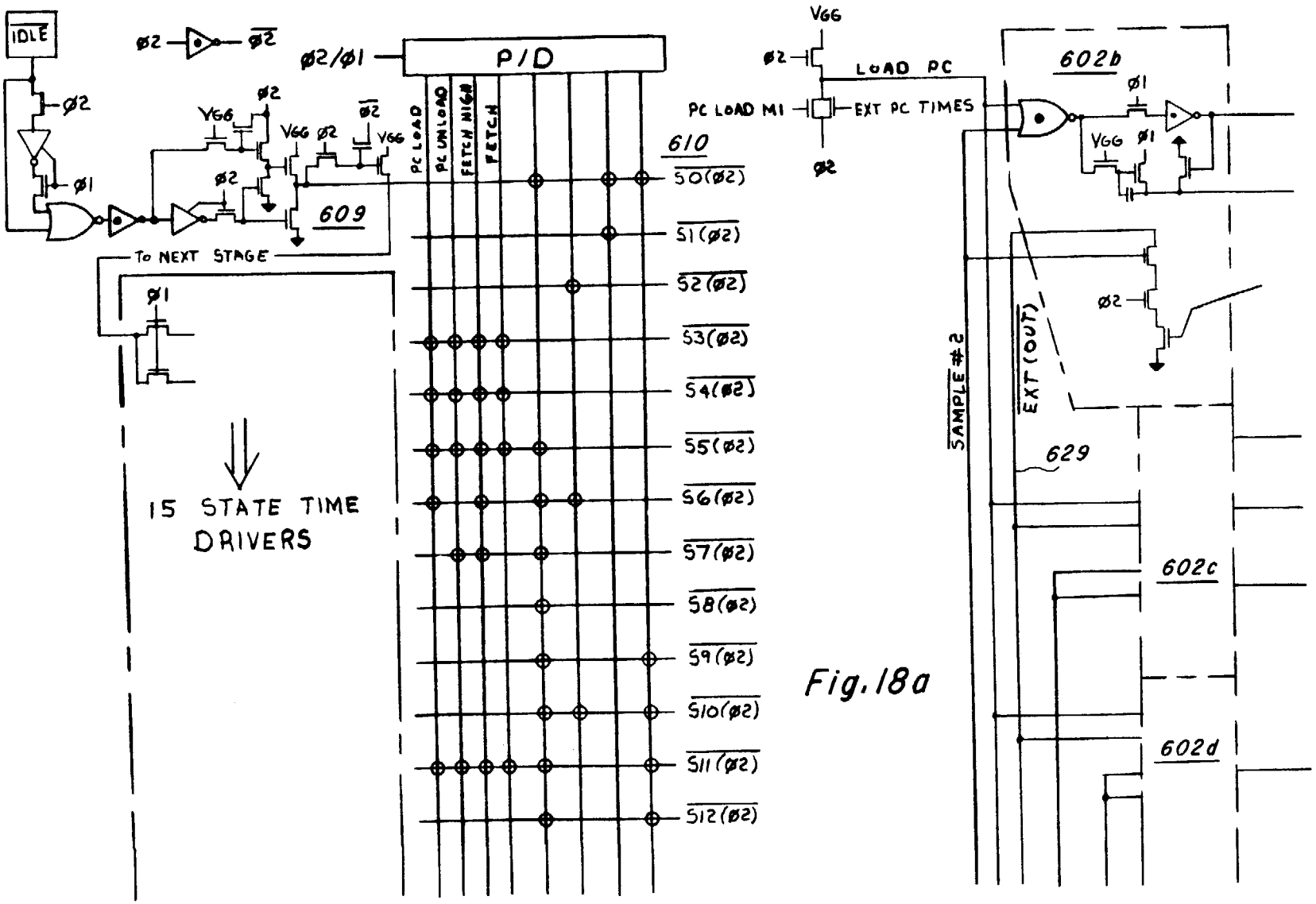
Figure 18B:
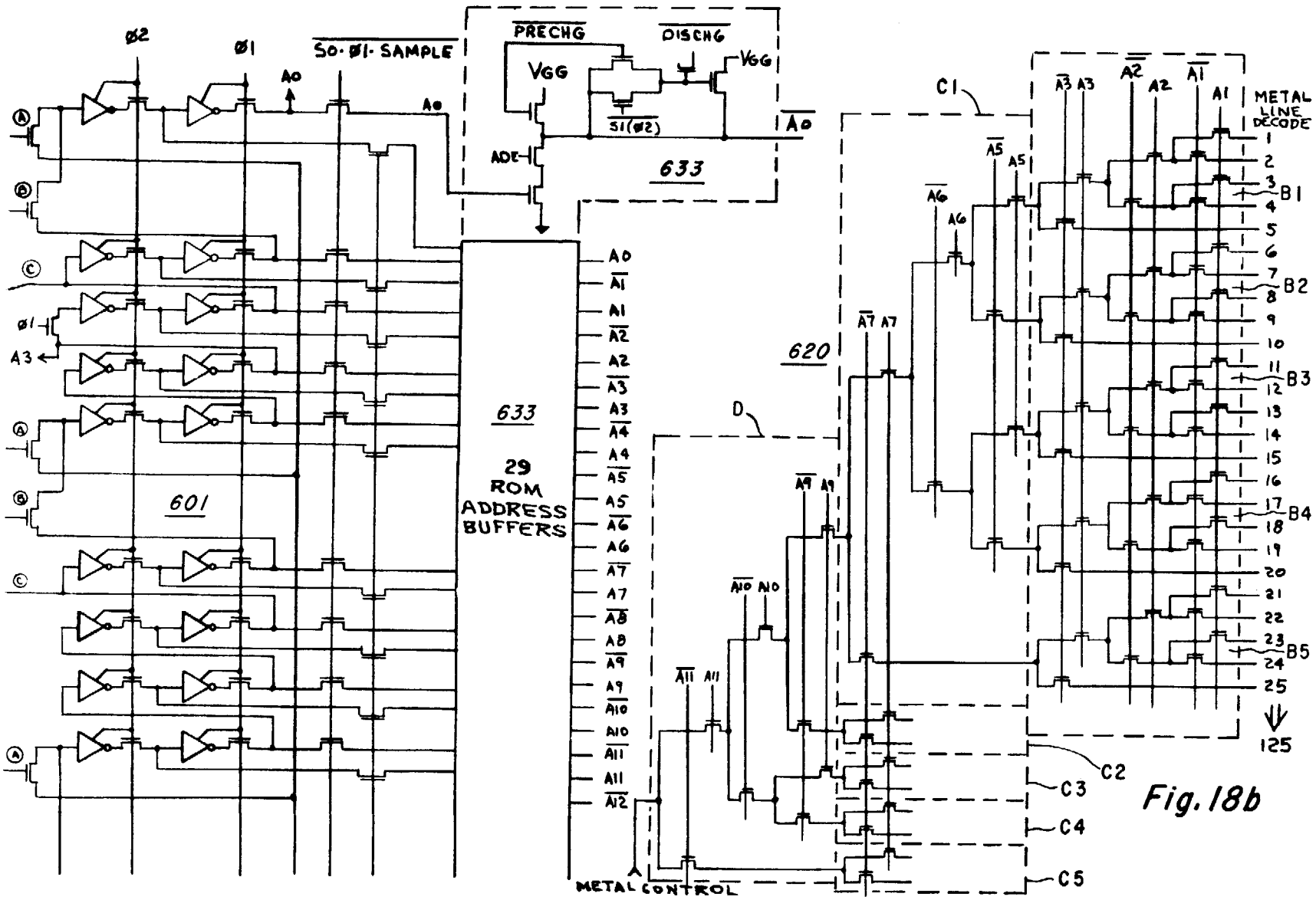
Figure 18C:
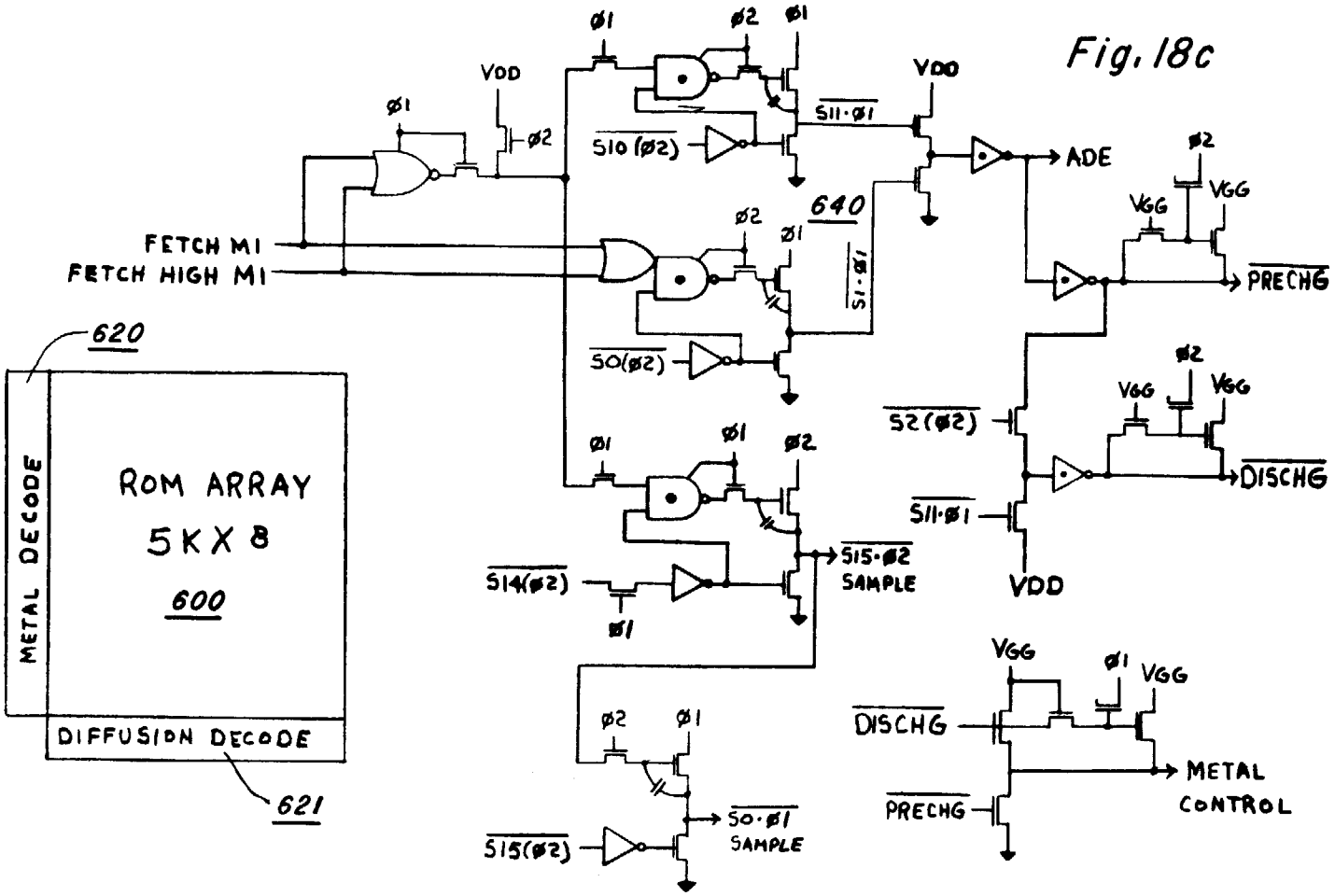
Figure 18D:
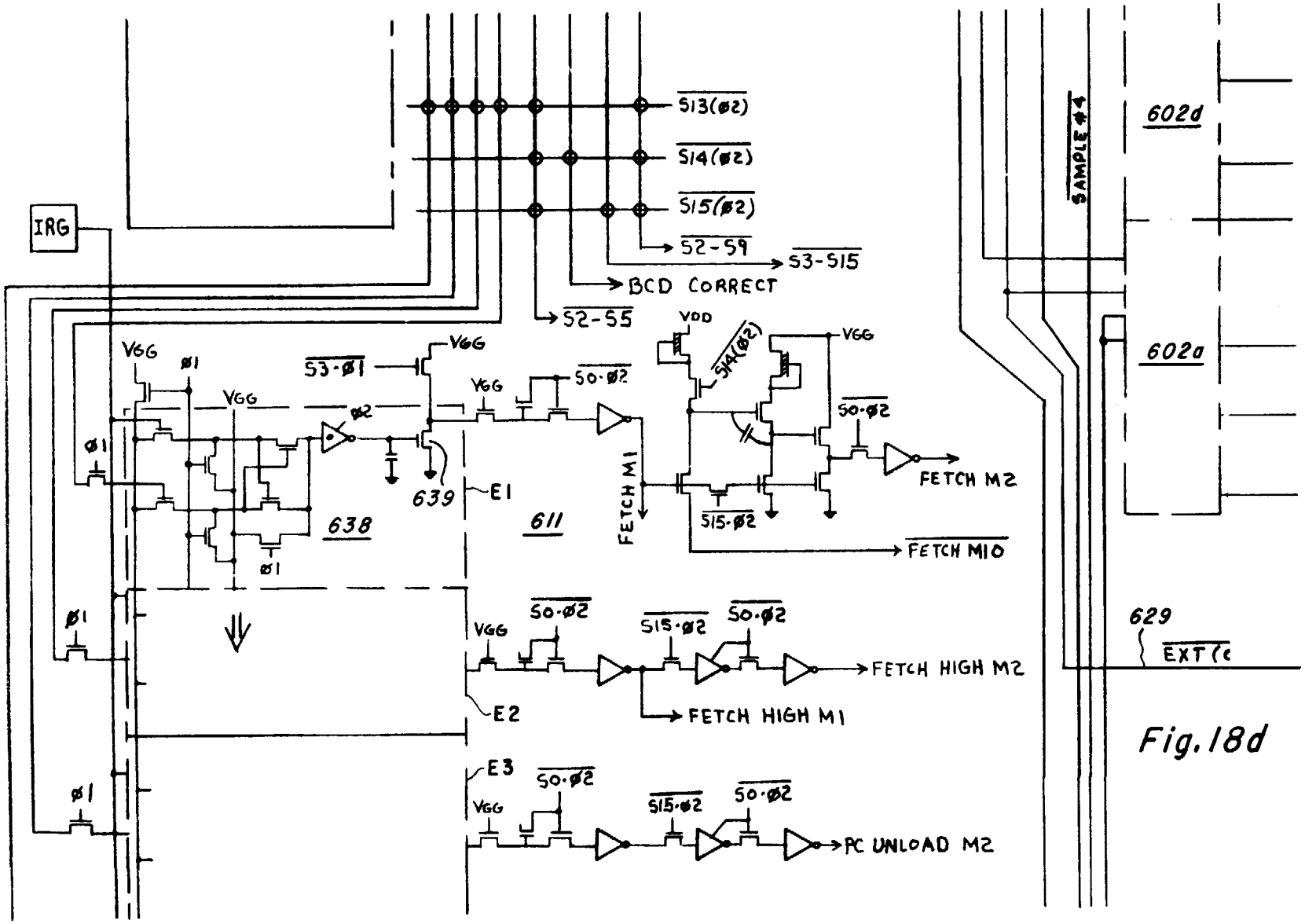
Figure 18F:
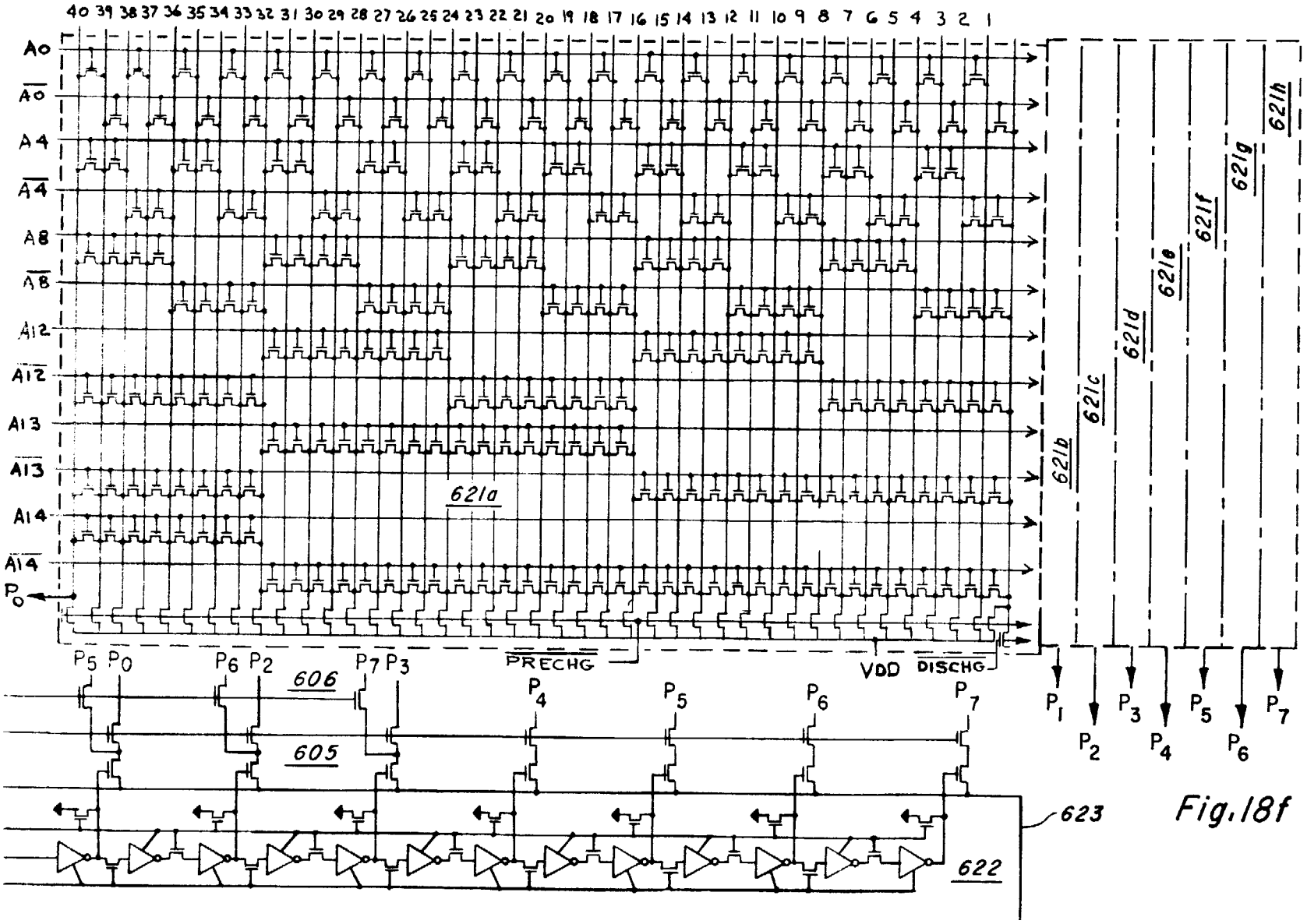
Figure 18G:
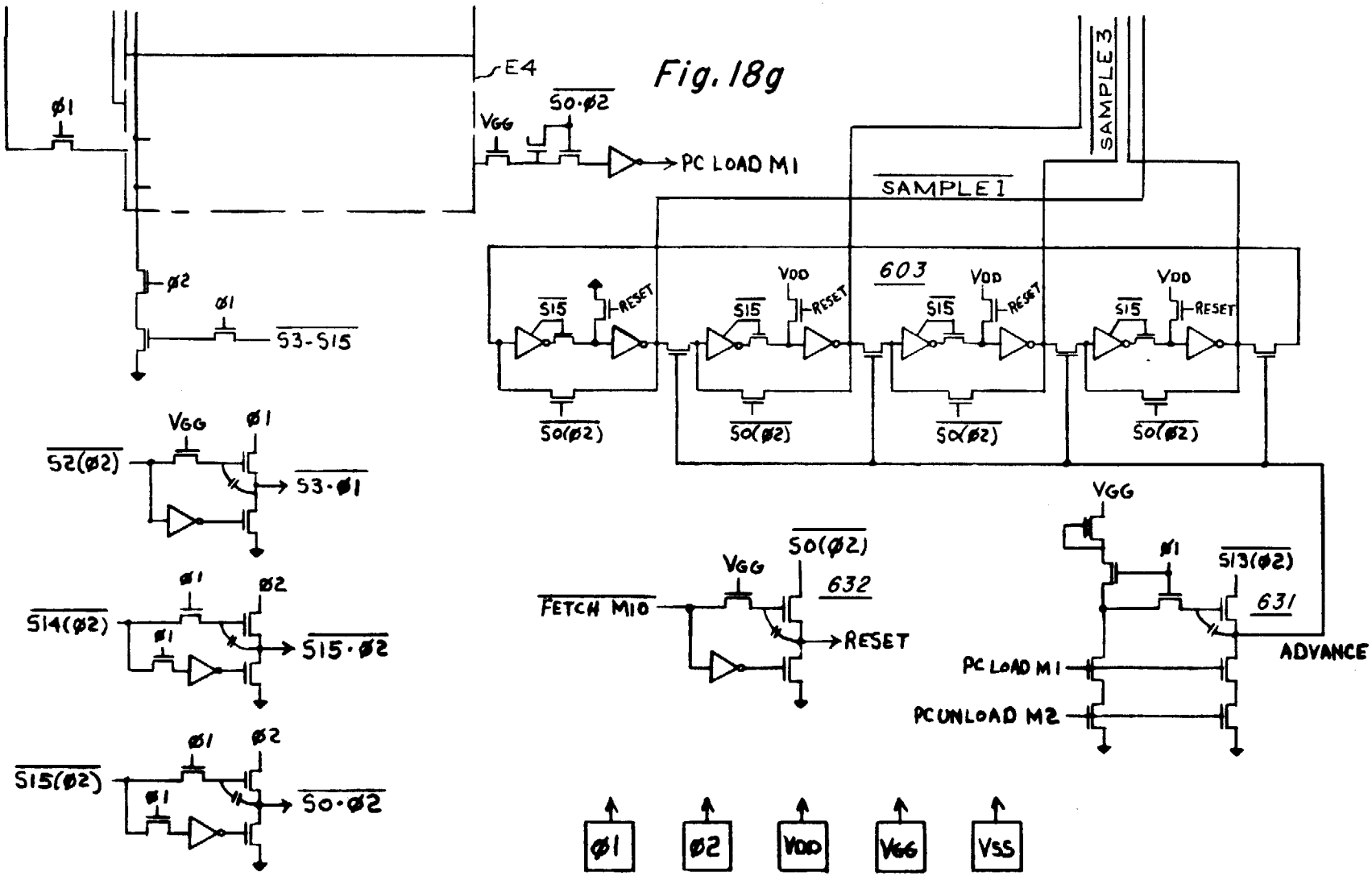
Figure 18H:
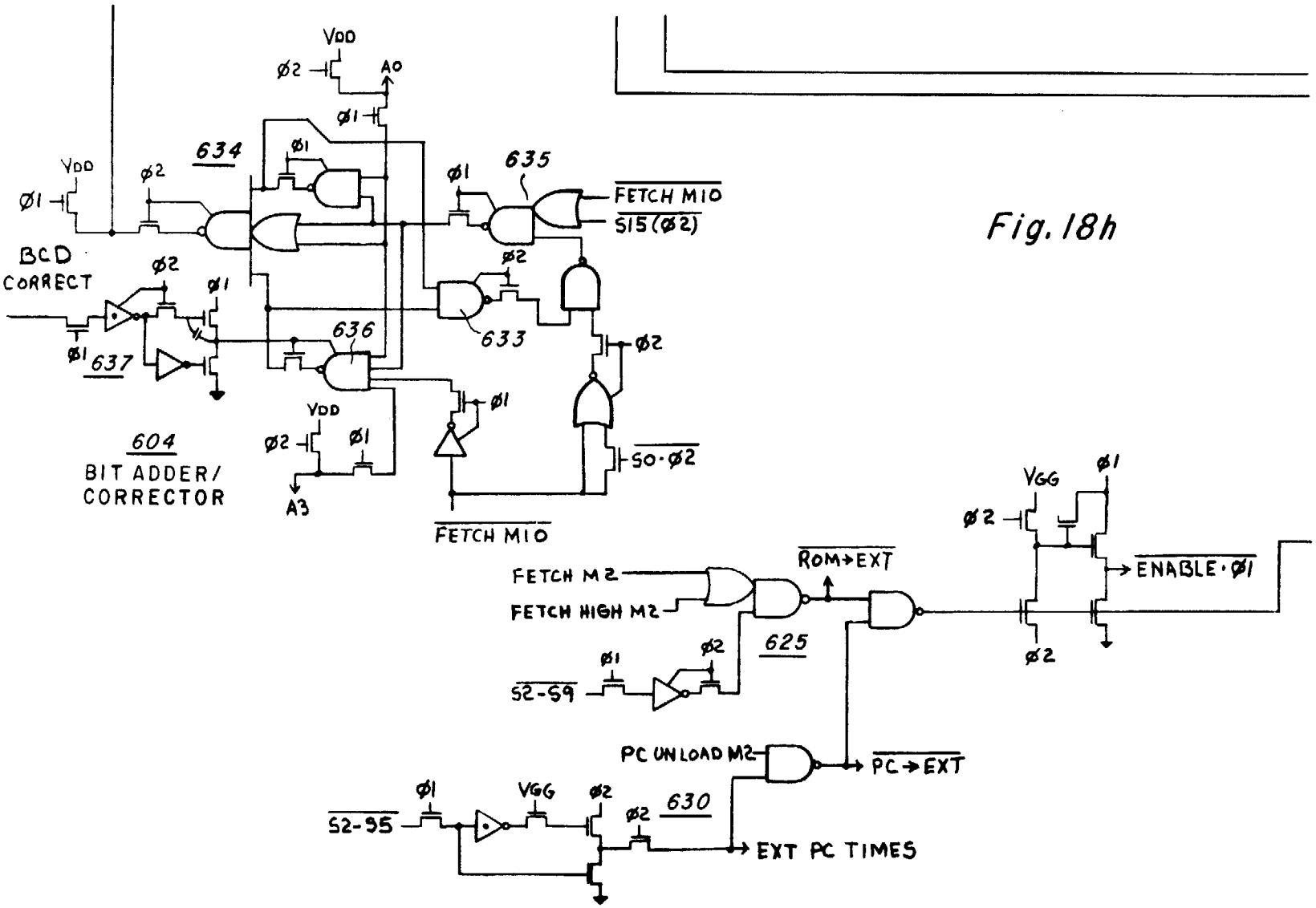
Figure 18I:
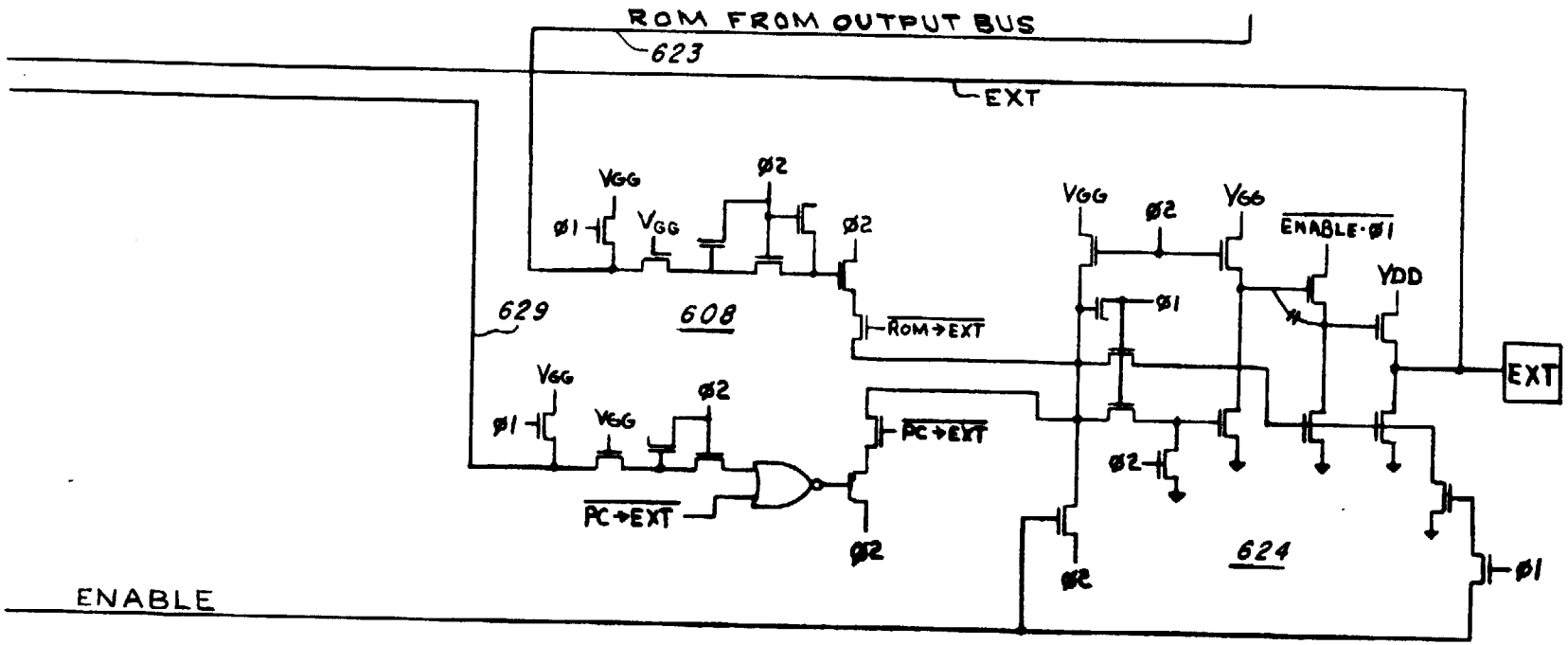

Referring now to FIG. 17, there is shown a block diagram of second ROM chip 48'. The second ROM 48 implemented thereon, is provided by binary coded decimal (BCD) ROM 600. The output of BCD ROM 600, which outputs the program codes listed in TABLE III, for instance, is connected to serializers 605 and 606. Serializer 605 converts both the high digit and low digit of the program code to serial format and supplies it to a digit selector. The serializer 606 converts only the high digit of the program code to serial and also supplies it to digit selector 607. Digit selector 607 provides the output of serializer 605 to external output control 608 in response to a decoded FETCH instruction or supplies the output of serializer 606 to external output control 608 in response to a decoded FETCH HIGH instruction.

BCD ROM 600 is addressed by an address in program counter 601. The address in program counter 601 preferably is a BCD four digit numeral. The address in program counter 601 is incremented each time a FETCH (but not a FETCH HIGH) instruction is decoded and is maintained in BCD format by an one bit/BCD corrector 604. Program counter 601 may be loaded one digit at a time with a digit appearing on External (EXT) via digit controls 602a–602d. Digit strobe 603 controls which one of the digit control 602a–602d is enabled; digit strobe 603 sequentially enables digit controls 602a–602d in response to a decoded UNLOAD PC (unload program counter) or a LOAD PC (load program counter) instruction. Digit strobe 603 is reset by a decoded FETCH instruction. The digit control 602a–602d enabled by digit strobe 603 inputs a single digit (four bits) of the four digit number from the EXT bus in response to a decoded LOAD PC instruction, the number being obtained from the bits occurring during state times S3–S6 on the EXT bus. Also, the enabled digit control 602a–602d outputs a digit from program counter 601 to the EXT bus in response to a decoded UNLOAD PC instruction.

State time generator 609 outputs an indication to state time PLA 610 of which one of the 16 possible state times of an instruction cycle the calculator is in. State time generator 609 is responsive to IDLE for maintaining the state times generated thereby in phase with state times generator on the arithmetic chip 10 or double SCOM chips 12a and 12b, for instance. State time PLA 610 outputs selected timing signals to the various logic circuits and also to serial instruction decode 611. Serial instruction decode 611 is also responsive to the serial instruction words appearing on IRG. Serial instruction decode 611 decodes the aforementioned FETCH, FETCH HIGH, UNLOAD PC and LOAD PC instructions.

External output control 608 outputs the serialized low and high program code digits or the serialized high digit alone from digit selector 607 in response to the FETCH and FETCH HIGH instruction, respectively, and outputs the digit from the enabled digit control 602a–602d in response to an UNLOAD PC instruction, the output from external output control being provided to the EXTERNAL bus.

Considering FIGS. 3a and 3b with FIG. 17, the following discussion examines the flow of data between second ROM chips 48′, arithmetic chip 10 and the main ROMs 20a–20c. When a program is to be called from second ROM chip 48′ according to the aforementioned 2ND, PGM, page number and label key sequence, the location 0000 is first loaded into the program 601. This may be done for instance by (1) zeroing a selected register 50a–50e, which loads the zero in register R5 65. As disclosed in the incorporated by reference U.S. Pat. No. 3,900,722, register R5 65 is automatically loaded with the least significant digit after some arithmetic operation involving the arithmetic unit and Register R5 65 may be loaded with the least significant digit in keyboard board register 54 in response to a KRR5 instruction. Also the least significant digit of keyboard register 54 may be loaded with the contents of register R5 65 in response to a R5KR instruction. Now, the zero digit in register R5 65 is loaded into the least significant digit position of keyboard register 54. After having reset digit strobe with a FETCH instruction, the zero is loaded into each of the four digits of program counter 601 by four sequential LOAD PC instructions, thereby transferring the zero in the LSD of the keyboard register into all digit positions of program counter 601. Then a FETCH HIGH instruction is issued followed by a load keyboard with EXTERNAL (EXTKR) instruction for loading high digit of the program code outputted from ROM 600 into the keyboard register. The contents of keyboard register 54 is then loaded into register R5 65 and thence into a register 50a–50e using an R5→Adder instruction (FIG. 5b). This high digit may then be shifted in its register to the next more significant digit position by register shift instructions (FIG. 5b). A FETCH instruction then follows, which is followed by a EXTKR, KRR5 and R5→Adder instructions to load the low digit into the register in which the high digit had been previously loaded, thereby providing the high and low digits in one of the operational registers 50a–50e. This number may then be subtracted with the inputted page number to determine whether the inputted page number is available in ROM 600.

As can be seen, having an R5 register of a single digit length complicates the transferring of the low and high order digits of the program code into an operational register 50a–50e. It should be evident that an eight bit register R5 65 would simplify this process; the method herein described is used because register R5 in the pre-existing arithmetic chip 10 only has four bit positions. Modification to the above described instruction sequence for a calculator system having an eight bit R5 register 54 should be evident to those skilled in the art.

It should be also evident to those skilled in the art that this addressing sequence could be simplified if the I/O bus were used in lieu of EXT. Then, however, additional connections would be necessary to interface the second ROM chip 48′ with the rest of the calculator system, thereby complicating the plug assembly for interfacing chip 48′ with the remainder of the calculator system.

Assuming that the inputted page number is available in ROM 600, the inputted page number is multiplied by two and the resulting address is loaded one digit at a time into program counter 601 via register R5 65, keyboard register 54 and the EXT bus. As has been previously discussed, the two program codes at that location and the following location in ROM 600 are read out thereof one digit at a time using a sequence of FETCH HIGH, EXTKR, KRR5, KR→Adder, SHIFT, FETCH, EXTKR, KRR5, R5→Adder, SHIFT instructions and so forth in the manner previously set forth for four digits. At this time, the four digit address of the first program code for the inputted page number has been loaded into a selected register 50a–50e. This process is then repeated for the next two program codes, which are loaded into another register, this address defining the first program code on the page immediately following the inputted page number. The difference of these two numbers is taken and stored and the address of the program code on the inputted page is then loaded one digit at a time into program counter 601 by generally reversing the above sequence and substituting the FETCH and FETCH HIGH instructions with LOAD PC instructions, thereby loading program counter 601 with the address of the first program code on the inputted page number. The program codes are then read out sequencially and compared with the inputted label, the calculator testing for a match thereof. For each FETCH operation accomplished during this label search, the aforementioned difference is decremented by one. If the decrementing difference becomes equal to zero before a match is found, the calculator generates an error condition inasmuch as the label being searched for does not exist on the particular page inputted by the operator. Once the inputted label is detected, the outputted program codes are loaded into program counter 54 which in turn is used to address main ROMs 20a–20c when a PREG instruction is generated telling main ROMs 20a–20c to branch on the address being outputted on EXT. The microcode at that address is then read out in the usual manner to accomplish the function indicated by the outputted program code, that sequence of events taking between fifty and several thousand instruction cycles, for instance. At the end of this sequence of instructions, a flag is tested to determine whether another program code is to be read from second ROM 48, or whether a program code is to be read from the program code storage area in RAMs 14a–14c, whether a program code is to be read from the aforementioned constant ROM area in double SCOM chips 12a or 12b or whether the calculator is simply to await another keyboard input by the operator. This flag is a memory on one of the double SCOM chips; the control of which the above-mentioned elements control calculator operation will be subsequently discussed. Assuming control is to be directed back to second ROM 48, FETCH and PREG instructions will again be issued to cause the calculator to branch to the location defined by the subsequent program code in second ROM 48. This process will be repeated until a RETURN program code is loaded into keyboard register 54, and main ROM 20a–20c branches to the location defined thereby; there instructions transfer control back to normal keyboard inputs and the display is activated with the contents of register A, unless of course, the above-mentioned 2ND, PRGM, page number, label key sequence occurred as a separate chain in a user inputted program in RAMs 14a–14d, in which case, control would be then returned to the program thereat.

It has previously been indicated that after the page number has been inputted, a label search is commenced on that page by inputting an appropriate label, i.e. either the labels A-E or A'-E' or the subroutine key (SBR) combined with a non-numeric key (indicating that such key is being used as a label) or a three digit number (which is treated as a relative address, as aformentioned). It should be appreciated that data may be entered into the memories, including the display register, after the page number is inputted and before the label or relative address is inputted. In fact, many of the programs in the embodiment of second ROM 48 programmed according to Table VIII assume that the number in the display at the time the label is inputted is to be used during the execution of the program identified by the label.

Referring now briefly to FIG. 19, there is set out the utilization of the sixteen registers on the two double SCOM chips 12a and 12b. Each register can store up to sixteen digits, each of which has four bits, of course.

Registers 1–8 and 12, as well as digits 1 and 2 in register 13 are reserved for heirarchy control, although registers 1–8 may be addressed from the second ROM using the aforementioned heirarchy address program code.

Register 0 is reserved for: (1) ten user flags, (2) the RAM/Constant ROM Program Counter and Program Source Flag, (3) last key entry and (4) a fixed point display indicator. The Program Source Flag in digit 3 and the digit 15 flag in Register B 53b (FIG. 3a) define where calculator control is to be passed after the present set of instruction words from first ROM 20 are executed. If flag B 15 is set, then the calculator is under control of a program either in (1) RAM's 14a–d, (2) second ROM 48 or (3) the second ROM portion of the constant ROMs on double SCOM chips 12a or 12b. If flag B 15 is reset, the calculator is under normal keyboard control. The program Source Flag is a 0 if control is to be returned to RAM 14d–d area; a 1 through 7 of control is to be passed to second ROM chip 48'; or an 8 or 9 if control is to be passed to the constant ROM area.

Registers 14 and 15 are utilized to permit superroutining of the programs in RAMs 14a–d or in second ROM chip 48'. Thus after control passes to the element specified by the current program control flag, the stack implemented by registers 14 and 15 is popped and the location and new program control flag previously in level one thereof is inserted into digits 7–3 of register 0. Of course, when the number of superroutine levels in the stack is one or greater, as indicated by the number in digit 0 of register 15. The stack is pushed (i.e., another level of superroutining is added) when (1) a function stored in the constant ROM area (e.g. P→R) is encountered; (2) a label is encountered (e.g. A-E or A'E'); (3) a subroutine program code or key depression followed by either a three digit address or a non-numeral label address (which initiates either a branch or a label search in the element presently controlling operation and if the second ROM chip 48' is the controlling element, the label search is limited to the present page); or (4) program codes or key depressions for 2ND, PGM, and then A-E' or SBR and label (e.g. SBR $X^2$ or SBR =) or SBR and a three digit relative address (initiating either a label search on the indicated page or a branch to a specific program code on that page whose address is determined by adding the relative address to the address of the first program code on that page). As can be seen, six levels of such routines may be employed in this embodiment, with digit 0 of Register 15 indicating the number of levels actually being utilized at any given time.

Register 13 stores the addresses of the useable data storage area in RAMs 14a–d, which may be varied or reconfigured by the operator inputting appropriate OP codes, as previously mentioned. Digit 0 of register 13 contains a flag indicating whether angular results are to be provided in degrees, radians or grads.

Register 11 is used as the T register, for the comparisons made in the "conditional go to" program codes, while register 10 stores eight program codes during operations under RAM 14a–d or constant ROM control, at which time the eight programs stored in a constant area or register in RAM being accessed are temporarily stored in register 10 to simplify the extraction of the program code to be used to address first ROM 20.

Register 9 contains the old and new page numbers which allows the user to change pages easily. Register 9 also contains information about the program size, size of the RAM and also the program's security flag, which may be stored in second ROM 48, if desired, as forementioned.

Referring now to composite FIGS. 18a–18i, there is shown a detailed logic diagram of second ROM chip 48'. BCD ROM 600 is implemented as a conventional virtual ground type ROM of the type disclosed in U.S. Pat. No. 3,934,233, entitled "Read-Only-Memory For Electronic Calculator", which issued Jan. 20, 1976 and is assigned to the assignee of this invention. Decoders 620 and 621 used in addressing ROM 600 are important features of this invention which permit ROM 600 to be addressed using BCD data without wasted space within ROM 600. The decoders heretofore known in the prior art, such as those exemplified by U.S. Pat. No. 3,934,233, decode either binary, octal, or hexadecimal data, as the case may be. These decoders may be used with a ROM to decode BCD data, of course; however, in that case, large portions of the ROM would go unused inasmuch as hexadecimal numbers 11 through 16 would be decodable, but have no need to be decoded. Using the addressing scheme herein disclosed, permits the addressing of ROM 600 with BCD data without the wasted space within the ROM which would otherwise result with conventional decoders.

ROM 600 is implemented as a 5000×8 bit array for storing 5000 eight bit program codes, the addresses thereof being the BCD encoded numerals 0000–4999. These four numerals are stored in program counter 601. Decoders 620 and 621 are able to decode these 5000 addresses without decoding the non-BCD codes often seen in the binary data contained in a register such as program counter 601. As will be seen, the ROM metal line decoder 620 uniquely decodes the one of 125 metal lines while the ROM difusion line decoder 621 decodes one out of forty difusion lines for each bit in a program code. Inasmuch as 125×40 equals 5000, 5000 program codes in ROM 600 will be uniquely identified by metal decoder 620 and difusion decoder 621.

Metal decoder 620 comprises a plurality of one of five decoders. These one of five decoders are provided in a three level cascaded arrangement inashuch as 5×5×5 equals 125. Referring to dashed lines B1–B5, it can be seen that the dashed line B1 encompasses a one of five decoder, as do references dashed lines B2–B5. The inputs of one of five decoders B1–B5 are connected to the outputs of one of five decoder C1, all of which are used to perform a one out of twenty-five decode. One of five decoders C2–C5 are identical to one of five decoders B1–B5. The five outputs from one of five decoders C2–C5 are each coupled to one of five decoders like B1–B5 (not shown) for providing the decoding of metal lines 26–125. The inputs of one of five decoders C1–C5 are connected to the output of a third level one of five decoder identified by a reference line D. The B level decoders (e.g. B1–B5) are responsive to the A1–A3 bits outputted from program counter 601, while the C level decoders are responsive to the A7–A5 bits and the D level decoder is responsive to the A9–A11 bits from program counter 601. The remaining bits, (e.g. A0, A4, A8, A12, A13, and A14) are decoded by diffusion decoder 621, for providing a one out of forty decode. Diffusion decoder 621 is divided into eight sections 621a–621h for addressing the eight bits of the addressed program code. As can be seen decoder section 621a has one output line ($P_o$) one ground line and 39 intermediate diffusions, inasmuch as ROM 600 is of the virtual ground type. Decoder sections 621b-621h are identical to section 621a, but output the $P_1$-$P_7$ bits of the program code.

It should be evident that decoder 621 performs a one out of two decode for address lines A0, A4 and A8 and performs a one out of five decode for address lines A12–A14. It should be evident to one skilled in the art, moreover, that other configurations of decoders 620 and 621 could be utilized. For instance, metal decoder 620 could be arranged to perform a one out of 250 decode by doubling the size of that decoder and adding a one out of two decoder of line $A_0$, for instance, in front of the D level decoders, while diffusion decoder 621 would perform a one of twenty decode by deleting the $A_0$ address line 0 and collapsing the size thereof by deleting the odd numbered diffusion lines.

It should further be evident to those skilled in the art that similar BCD only addressing schemes may be used with other sizes of ROMs. For instance, a 7000 word ROM may be BCD addressed with an one out of 250 metal decoder (2×5×5×5) and an one out of twenty-eight difusion decoder (2×2×7). As can be seen; the numbers in the parenthesis are the prime number factors of 7000.

Diffusion decoders sections 621a–621h output the $P_0$–$P_7$ bits of the program, respectively. The $P_0$–$P_7$ bits are outputted serially on external during state times $S_3$–$S_{10}$ in response to a decoded FETCH instruction while bits $P_4$–$P_7$ are to be outputted serially on external during $S_3$–$S_6$ in response to decoder FETCH HIGH instruction, as aforementioned. The $P_0$–$P_7$ bits from decoder 621 are connected to bus 623 when strobed by shift register 622 beginning at S2ϕ2 for the $P_0$ bit and when enabled by logic 607a in response to a decoded FETCH instruction. Bits $P_4$–$P_7$ are conducted to bus 623 starting at state time S2ϕ2 when strobed by shift register 622 provided logic 607b receives a FETCH HIGH command. Bus 623 is coupled to the EXT line via external output buffer 624 when enabled by external output control 608. Control 608, in combination with logic 625, couples bus 623 to buffer 624 in response to either a FETCH or FETCH HIGH command. The data on bus 623 is one-half bit early due to a one-half bit delay in buffer 624.

Program counter 601 is provided by a 15½ bit shift register, comprising thirty-one inverters. The other half bit a delay occurs in the one bit adder/BCD corrector 604, thereby providing sixteen bits of storage for storing four BCD numerals. The least significant digit in program counter 601 is loadable from a four bit serial numeral appearing on EXT during state times $S_3$–$S_6$ via digit control 602a in response to a LOAD PC command. As can be seen from FIG. 18, digit control 602a inserts a new digit in the least significant digit position in program counter 601 by coupling the data on EXT to inverter 626 and open-circuiting transfer gate 627 connecting inverter 628 to inverter 626. Inverters 626 and 628 are two of the thirty-one inverters in program counter 601. Digit control 602a also outputs to bus 629 serial data stored in program counter 601 when enabled by digit strobe 603, the digit appearing on line 629 being one-half bit early compared to the time at which it will be outputted on EXT in response to a decoded UNLOAD PC instruction.

Digit controls 602b–602d are identical to digit control 602a, except that they are connected to program counter 601 at appropriate places in the shift register therein to interface with the next to the least significant digit through most significant digit positions during the $S_3$–$S_6$ state time period. Bus 629 is connected to external output control 608 which functions in combination with logic 630 for conducting the BCD digit outputted from the enabled digit control 602a–602d through to EXT during $S_3$–$S_6$ in response to a decoded UNLOAD PC instruction. Bus 629 is one-half bit early compared to the data on EXT, because of the one-half bit delay associated with output buffer 624.

Digit strobe 603 is comprised of a four bit ring shift register counter for sequentially enabling one of the digit controls 602a–602d. Shift register 603 advances in response to a LOAD PC or UNLOAD PC command by logic 631; shift register 603 for enabling the LSD digit decoder 602a in response to a decoded FETCH instruction by a logic 632.

The four digit BCD number stored in program counter 601 shifts through program counter 601 and from the output thereof back to the input thereof via the one bit adder/BCD corrector 604 each instruction cycle. The contents of shift register 601 is coupled to thirty ROM address buffers 633 during $S_{15}.\phi 2$ through $S_0.\phi 1$. The output of the thirty address buffers 633 provide the $A_0$–$A_{14}$ and $\overline{A_0}$–$\overline{A_{14}}$ outputs to the metal decoder 620 and difusion decoder 621. Only fifteen stages of the shift register in program counter 601 are outputted to ROM 600 via buffers 633 and decoders 620 and 621, inasmuch as the most significant bit of the most significant digit in program counter 601 need not be decoded when the largest address is 4999. It should be evident to one trained in the art, however, to utilize the outputs of all stages and to increase the size of the aforementioned decoder 620 or 621 to accomodate extra address lines for using larger addresses than 4999.

One bit adder/BCD corrector 604 is a single bit, serial adder that adds one to the stream of for BCD digits circulating through it from program counter 601 in response to a decoded FETCH instruction. During NON-FETCH (including FETCH HIGH) instructions, the four BCD digits circulate through one bit adder/BCD corrector 604 without the add one operation being performed. The one bit adder/BCD corrector 604 does a "look ahead" at the serial stream of data exiting from program counter 601 in order to determine if BCD correction is necessary when an add one operation is to be accomplished. When corrector 604 receives the least significant bit of a digit, it is also provided with the most significant bit of that digit for the "look ahead" operation. Corrector 604 is also provided with a clock signal, BCD CORRECT, for indicating to corrector 604 when the least significant bit of a digit is being received thereby. If during this time period the least significant digit is being inputted and a FETCH instruction has been decoded, one will be simply added to the least significant digit unless the first and last bits of that digit are both a logical one, (i.e., a decimal nine has been outputted), then in lieu of adding one, which would form the illegal BCD code 1010, a 0000 is outputted from corrector 604 in the corresponding four state times and an add one operation is accomplished on the next more significant digit via carry circuit 633 in corrector 604. Should that digit contain a nine, the above operation repeats and, if not, a one is added to that digit.

In one bit adder/BCD corrector 604, adder gates 634 perform the add operation when a one is outputted from add one insertion gate 635 unless inhibited by gate 636. Gate 635 is responsive to a decoded FETCH instruction and state time S15$\phi$2 for inserting a logical one into adder 634 in the least significant bit of the least significant digit or for inserting a one in the least significant bit when enabled by carry circuit 633. Gate 636 is responsive to a decoded FETCH instruction, the $A_0$ and $A_3$ bits from program counter 601 and the output of gate 635 for generating four logical zeros when a BCD nine is to be incremented during a FETCH instruction. Gate 636 is enabled by timing signal BCD correct at $S_4\phi 1$, $S_8\phi 1$, $S_{12}\phi 1$ and $S_0\phi 1$, the BCD correct signal being delayed 1½ state times by a logic 637. Thus once gate 636 outputs a logical zero disabling the output from adder 634, that condition remains for four state times until the BCD correct signal is again generated from PLA 610. Carry circuit 633 is responsive to adder 634 for generating carries within a digit and to gate 636 for generating carries between digits.

The state time generator 609 comprises sixteen state time drivers, the first of which is responsive to a timing signal on $\overline{\text{IDLE}}$ for sequencing the state times generated thereby with the state times generated on the other chips in the calculator system. The outputs from the sixteen state time drivers are supplied to a PLA 610 for providing various timing signals used, for instance, for outputting the program code during S3–S10, receiving and outputting single digit addresses during S3–S6 and the like. PLA 610 also outputs in serial fashion four serial trains of digits mimicking the LOAD PC, UNLOAD PC, FETCH HIGH and FETCH instructions which are outputted from main ROM 20a–20c or IRG. Of course, IRG also transmits many instructions which are not decoded on chip 48'.

These four serial bit trains are supplied to four serial instruction decoder circuits E1–E4 in decoder 611, along with the instruction words appearing on IRG. Each decoder in serial instruction decoder 611 performs an exclusive OR function on the data from IRG and one of the bit trains from PLA 610. If the exclusive OR function is satisfied for all bit positions of the instruction word (indicating that there was a match between the instruction word outputted and the bit train from PLA 610), then either a LOAD PC, UNLOAD PC, FETCH HIGH or FETCH instruction has been decoded, depending, of course, on which bit train is provided to the particular decoder for which the exclusive OR function was satisfied. Cross-coupled gates 638 perform exclusive OR function and discharge NODE 639 when a mismatch occurs anytime during the exclusive OR operation. The decoder circuitry encompassed by reference lines E2–E4.

It should be remembered that in the calculator system disclosed, an instruction is normally decoded during one instruction cycle and performed during the following instruction cycle. Inasmuch as the UNLOAD PC, FETCH HIGH AND FETCH operations output data on EXT and considering that the keyboard register 54 in arithmetic chip 10 must be sensitized to input this data by a EXTKR instruction, the data to appear on EXT from chip 48' must appear one instruction cycle later than the normal instruction cycle for executing decoded instructions. That is, the FETCH, FETCH HIGH and UNLOAD PC instructions result in data being outputted on external during the second instruction cycle following decoding. ROM 600 is a relatively large ROM, so for FETCH, or FETCH HIGH instructions the precharge cycle begins during the beginning of the instruction cycle immediately following the decoding of the instruction (by the FETCH M1 and FETCH HIGH M1 signals) whereas the conditional discharge occurs about one instruction cycle later. Thus ROM percharge circuitry 640 is responsive to FETCH M1 and FETCH HIGH M1 whereas the logic 625, 607a, 607b, add one/BCD corrector 604, logic 632 and the like are sensitized to delayed FETCH instructions FETCH M2 or FETCH $\overline{\text{M10}}$.

I have described my invention in connection with certain specific embodiments thereof. It is to be understood that modification may now suggest itself to those skilled in the art and that this invention is not limited to the specific embodiment disclosed, except as set forth in the appended claims.

TABLE IIa

| HEX ADDRESS | CHIP | INSTRUCTION WORDS+ | | | | | | | | | | | | | | | | | | | | | | | |
|---|---|---|---|---|---|---|---|---|---|---|---|---|---|---|---|---|---|---|---|---|---|---|---|---|---|
| 0000 | TMC582 | 0401 | 0404 | 0089 | 030C | 010B | 040B | 1002 | 0121 | 040F | 0101 | 032C | 1809 | 0402 | 0107 | 1FCF | 0477 | 0085 | | | | | | | |
| 0011 | TMC582 | 1460 | 1CAC | 1FDC | 1F18 | 1FFC | 1D2C | 1F44 | 1CF2 | 1FE2 | 0487 | 1420 | 0AC7 | 1A1A | 0407 | 1A1A | 0477 | 1H0E | | | | | | | |
| 0022 | TMC582 | 1C8H | 1C46 | 1B16 | 1DDA | 147E | 1482 | 1486 | 148A | 0457 | 0095 | 1424 | 0447 | 1BC0 | 0A0C | 0AC7 | 1B4E | 1B82 | | | | | | | |
| 0033 | TMC582 | 1B27 | 1B31 | 1BF0 | 1A5C | 1A40 | 1A4H | 1DHF | 0CD2 | 0213 | 0007 | 008A | 1F30 | 1A3A | 0081 | 1AE0 | 1EEE | 1A14 | | | | | | | |
| 0044 | TMC582 | 1A4H | 1A36 | 1A34 | 1A3F | 1A02 | 00F0 | 1H82 | 0025 | 002H | 005A | 1520 | 1DEA | 0407 | 197C | 1F94 | 1A00 | 1900 | | | | | | | |
| 0055 | TMC582 | 0011 | 19CA | 0011 | 1A90 | 0497 | 1A5F | 0111 | 0A0F | 0121 | 0105 | 194C | 0427 | 1A43 | 1C0E | 1F14 | 1C1F | 1C14 | | | | | | | |
| 0066 | TMC582 | 1C40 | 1F1A | 190C | 1FFC | 0487 | 1A97 | 0904 | 1994 | 0407 | 1940 | 0AE7 | 141C | 1BF4 | 1F0F | 1C20 | 1C0E | 1A00 | | | | | | | |
| 0077 | TMC582 | 140E | 19F0 | 0437 | 1CA6 | 0487 | 1430 | 0022 | 0024 | 146C | 0AE7 | 141C | 1A32 | 1A5C | 1A95 | 1A37 | 1AC6 | 1FD0 | | | | | | | |
| 0088 | TMC582 | 19D4 | 1FFC | 0407 | 1A47 | 0CD2 | 0213 | 0007 | 008A | 1F7A | 1674 | 1FFF | 1A34 | 1AED | 1A2B | 1AEE | 19D6 | 1F70 | | | | | | | |
| 0099 | TMC582 | 0041 | 1B36 | 0487 | 0080 | 14E4 | 0447 | 14F0 | 0427 | 193F | 1DF4 | 1FC7 | 1E94 | 1A37 | 1C12 | 1FF0 | 1FF6 | 0410 | | | | | | | |
| 0044 | TMC582 | 08FA | 1B14 | 0049 | 0051 | 0477 | 1E7A | 00C1 | 0040 | 0407 | 1286 | 0437 | 1FHC | 1FCC | 1A74 | 1FFA | 1FC0 | 1FC4 | | | | | | | |
| 0099 | TMC582 | 1FF4 | 1A4H | 1FFA | 1FHC | 1FF0 | 1A40 | 1F40 | 1F4H | 1934 | 1D2A | 1934 | 1FAC | 1A99 | 1E0A | 192C | 1E44 | 1990 | | | | | | | |
| 00CC | TMC582 | 193H | 1F9E | 1446 | 1FC4 | 1F9A | 1A49 | 1E9H | 18FA | 1F90 | 1432 | 1F4A | 1EA4 | 1FFA | 18FA | 1941 | 1FFE | 1FA0 | | | | | | | |
| 00DD | TMC582 | 1F0F | 0051 | 18F4 | 1F7A | 1FDA | 1HF6 | 1A4F | 1FFC | 1FAF | 1FCC | 190C | 1FD4 | 1F6A | 18FD | 1F62 | 1FC0 | 1FAA | | | | | | | |
| 00EE | TMC582 | 1F5C | 1FAF | 1E59 | 1A4A | 1F70 | 1F52 | 19F4 | 18C0 | 1FA4 | 10F6 | 1436 | 1F40 | 1F44 | 1F42 | 1F00 | 1947 | 1FCE | | | | | | | |
| 00FF | TMC582 | 1AE7 | 1FCA | 1F34 | 1F90 | 1FFA | 1A42 | 1CDA | 1D0A | 1424 | 1F0E | 1A14 | 1F44 | 190C | 1E20 | 1B00 | 1F02 | 14F4 | | | | | | | |
| 0110 | TMC582 | 0487 | 0058 | 120A | 00A0 | 0052 | 16FC | 005A | 0A06 | 0054 | 0009 | 0097 | 02F3 | 0289 | 1F44 | 0202 | 0ED3 | | | | | | | | |
| 0121 | TMC582 | 005A | 0300 | 0009 | 1007 | 02D2 | 045H | 0089 | 1C3A | 004A | 13A8 | 00F1 | 1B64 | 0407 | 02F3 | 0105 | 0111 | 041F | | | | | | | |
| 0132 | TMC582 | 0100 | 0044 | 0720 | 0663 | 0619 | 1149 | 0099 | 1987 | 0467 | 1804 | 0447 | 0080 | 1B04 | 0011 | 0091 | 0045 | 0065 | | | | | | | |
| 0143 | TMC582 | 041F | 0015 | 0100 | 0003 | 0300 | 0101 | 041F | 0403 | 0040 | 0458 | 0709 | 1094 | 0099 | 0708 | 0121 | 041F | 0100 | | | | | | | |
| 0154 | TMC582 | 0108 | 02F3 | 0108 | 0121 | 040F | 0101 | 0153 | 0958 | 187F | 0427 | 18AC | 0018 | 0107 | 0102 | 1A72 | 0400 | 0408 | | | | | | | |
| 0165 | TMC582 | 0408 | 0408 | 0408 | 0404 | 0404 | 0408 | 0408 | 0008 | 0008 | 1H5A | 0308 | 0095 | 140C | 0040 | 0AC7 | 1412 | 005A | | | | | | | |
| 0176 | TMC582 | 0052 | 0080 | 1210 | 0437 | 01F3 | 0153 | 0437 | 1006 | 0447 | 0095 | 0085 | 1F7E | 02DP | 0AE7 | 02F4 | 0131 | 041F | | | | | | | |
| 0187 | TMC582 | 0003 | 0131 | 040F | 0111 | 0477 | 01F3 | 0080 | 1502 | 0467 | 0HF3 | 0153 | 10H2 | 0447 | 09F3 | 0060 | 1E72 | 0300 | | | | | | | |
| 0198 | TMC582 | 0101 | 041F | 0403 | 0458 | 0709 | 105A | 0004 | 0121 | 041F | 0100 | 015P | 0289 | 0153 | 1048 | 0C48 | 0950 | 0080 | | | | | | | |
| 0149 | TMC582 | 1046 | 0458 | 0708 | 0140 | 0902 | 0107 | 0121 | 041F | 0100 | 018A | 0148 | 0121 | 040F | 0101 | 0158 | 0011 | 02F0 | | | | | | | |
| 0184 | TMC582 | 02F3 | 0400 | 040C | 0095 | 0045 | 0280 | 041H | 0158 | 0111 | 041F | 0103 | 000F | 0010 | 0120 | 1412 | 0000 | 0040 | | | | | | | |
| 01C8 | TMC582 | 1458 | 0458 | 0148 | 0487 | 02F3 | 0289 | 1DFE | 0064 | 0300 | 0406 | 02F4 | 0101 | 040F | 0121 | 0004 | 0121 | 041F | | | | | | | |
| 01DC | TMC582 | 0100 | 0140 | 0011 | 02F0 | 0140 | 0411 | 02F0 | 0121 | 040F | 0101 | 0323 | 0111 | 041F | 0100 | 0700 | 0600 | 0480 | | | | | | | |
| 01ED | TMC582 | 1B34 | 010E | 0080 | 1522 | 0008 | 0008 | 1582 | 0107 | 0407 | 18AC | 015A | 0304 | 1004 | 0140 | 0443 | 0407 | 02F3 | | | | | | | |
| 01FF | TMC582 | 0111 | 041F | 0100 | 0410 | 0919 | 1008 | 0408 | 0709 | 1007 | 0111 | 040F | 0101 | 1DAF | 0427 | 0080 | 1B04 | 0457 | | | | | | | |
| 020F | TMC582 | 0085 | 0065 | 0005 | 1908 | 0009 | 100C | 180C | 0020 | 1B09 | 0009 | 1008 | 0091 | 07D8 | 0107 | 0201 | 0007 | 0400 | | | | | | | |
| 0220 | TMC582 | 1B28 | 0090 | 0092 | 1B04 | 0085 | 0107 | 0001 | 0427 | 090P | 0008 | 1B04 | 0437 | 00C9 | 01F0 | 0AF0 | 0180 | 0107 | | | | | | | |
| 0231 | TMC582 | 0072 | 004A | 17A8 | 008F | 0051 | 0058 | 1B04 | 0054 | 0026 | 003A | 0120 | 0009 | 1104 | 0709 | 1B04 | 0032 | 0304 | | | | | | | |
| 0242 | TMC582 | 0009 | 1B1A | 0304 | 1B04 | 0300 | 0E09 | 1B14 | 0940 | 0009 | 100H | 0F09 | 18E4 | 0940 | 0030 | 1010 | 1B0A | 0030 | | | | | | | |
| 0253 | TMC582 | 1B04 | 070P | 1B2F | 0A0A | 0033 | 0700 | 1B47 | 00F0 | 1000 | 0090 | 0030 | 1B0A | 0F00 | 070A | 10C2 | 0F08 | 10HF | | | | | | | |
| 0240 | TMC582 | 0041 | 1B41 | 0091 | 0043 | 0C95 | 006E | 004A | 1750 | 0049 | 005A | 10F0 | 1A49 | 0A47 | 19F5 | 0081 | 0417 | 004A | | | | | | | |
| 0275 | TMC582 | 1B64 | 0085 | 00F5 | 0005 | 1A01 | 0AF7 | 1C41 | 0447 | 0049 | 0051 | 1B0D | U3D3 | 0447 | 06F3 | 1411 | 00A2 | 1C14 | | | | | | | |
| 0286 | TMC582 | 0AF7 | 005A | 1017 | 0051 | 1B00 | 0033 | 1B40 | 0417 | 1BFA | 0004 | 0049 | 041F | 01D4 | 090E | 0089 | 0A0F | 0131 | | | | | | | |
| 0297 | TMC582 | 0AF7 | 02F3 | 0111 | 040F | 0407 | 02F3 | 0111 | 041F | 01D4 | 090F | 0111 | 040F | 0131 | 00A8 | 0004 | 10E3 | 00A0 | | | | | | | |
| 02A8 | TMC582 | 1B00 | 04A8 | 00A2 | 1B43 | 0407 | 0095 | 1030 | 02DF | 1HE8 | 00A0 | 0079 | 0091 | 1BFF | 00F4 | 0074 | 1905 | 0030 | | | | | | | |
| 02B9 | TMC582 | 133A | 0640 | 12BC | 0000 | 1950 | 110A | 01D4 | 0022 | 0032 | 005A | 0000 | 100A | 0104 | 002E | 003F | 0004 | 00F2 | | | | | | | |
| 02CA | TMC582 | 040C | 0085 | 0400 | 0050 | 0040 | 10F4 | 005A | 0015 | 0400 | 0427 | 18B0 | 0120 | 0416 | 02F0 | 0103 | 0091 | 1B80 | | | | | | | |
| 02DB | TMC582 | 0408 | 0458 | 0408 | 0004 | 17H0 | 00F8 | 0070 | 0030 | 0042 | 01D8 | 0006 | 0014 | 1008 | 0709 | 0437 | 1014 | 0FD4 | | | | | | | |
| 02EC | TMC582 | 0030 | 0477 | 1B04 | 0407 | 0AF3 | 041B | 1002 | 0457 | 02F3 | 0283 | 0020 | 0437 | 1B04 | 0447 | 09F3 | 0206 | 0427 | | | | | | | |
| 02FD | TMC582 | 02F0 | 0C76 | 0953 | 0300 | 0009 | 1B06 | 0289 | 10D0 | 0230 | 004B | 0044 | 1008 | 0082 | 0989 | 15FF | 0953 | 0076 | | | | | | | |
| 030E | TMC582 | 1B09 | 0100 | 0100 | 0100 | 0100 | 0100 | 0100 | 0100 | 0100 | 0049 | 00F2 | 0085 | 00CB | 1758 | 00AB | 1582 | | | | | | | | |
| 031F | TMC582 | 005B | 1B08 | 01DB | 0402 | 0054 | 0485 | 103C | 0408 | 0FF3 | 0053 | 00F0 | 109F | 095B | 095B | 0058 | 0447 | 02F3 | | | | | | | |
| 0330 | TMC582 | 0030 | 1006 | 0709 | 1004 | 095B | 095B | 0487 | 02F3 | 0989 | 1B10 | 0289 | 1B10 | 008B | 1B04 | 0300 | 0900 | 0909 | | | | | | | |
| 0341 | TMC582 | 0053 | 0080 | 00CB | 1532 | 1BC7 | 0011 | 00F3 | 0092 | 00C0 | 00B0 | 0093 | 1B08 | 0011 | 00B0 | 1B0B | 0F03 | 0024 | | | | | | | |
| 0352 | TMC582 | 0034 | 0090 | 100B | 00D2 | 0024 | 0038 | 0010 | 1B00 | 0023 | 0012 | 003C | 190B | 0A8C | 1015 | 0030 | 1B0B | 0CD2 | | | | | | | |
| 0363 | TMC582 | 0024 | 0034 | 072C | 1006 | 095B | 1B07 | 01DC | 002C | 11BC | 0989 | 1017 | 09B8 | 1954 | 0022 | 00B0 | 1F50 | 0021 | | | | | | | |
| 0374 | TMC582 | 1F0F | 01DB | 04BH | 0487 | 02F3 | 09F0 | 0300 | 04FB | 0101 | 0101 | 02DF | 04FB | 0101 | 0CD3 | 0427 | 02F0 | 0CFA | | | | | | | |
| 0385 | TMC582 | 04FA | 0101 | 0447 | 01F0 | 0306 | 09F0 | 09A0 | 0140 | 0140 | 0140 | 0140 | 0C19 | 0923 | 0130 | 1B0A | 01A6 | 0990 | | | | | | | |
| 0396 | TMC582 | 0111 | 040F | 0131 | 0407 | 02F0 | 00DC | 0101 | 040F | 0121 | 0040 | 1B00 | 0448 | 04D7 | 01F0 | 0101 | 041F | 01D3 | | | | | | | |
| 03A7 | TMC582 | 04DH | 0101 | 040F | 0111 | 01DC | 0074 | 0004 | 0004 | 0080 | 0404 | 0074 | 00D4 | 0004 | 0080 | 040C | 0400 | 040C | | | | | | | |
| 03B8 | TMC582 | 0069 | 0058 | 0094 | 1189 | 0059 | 0064 | 1989 | 00F1 | 00C3 | 00C0 | 0092 | 0011 | 0133 | 000F | 1B0B | 0CD2 | 0024 | | | | | | | |
| 03C9 | TMC582 | 0034 | 0090 | 13E4 | 0010 | 1B82 | 0011 | 0009 | 1B74 | 0989 | 0026 | 10B4 | 0099 | 0022 | 0CD0 | 1902 | 00AB | 00AA | | | | | | | |
| 03DA | TMC582 | 0042 | 0094 | 0004 | 0002 | 0042 | 162B | 0089 | 016A | 0007 | 0042 | 00D0 | 00DB | 005A | 1345 | 1470 | 00A0 | 1740 | | | | | | | |
| 03EB | TMC582 | 0447 | 0095 | 1B0D | 0073 | 1B0B | 0447 | 1B0H | 1F06 | 000A | 000B | 1B17 | 0001 | 1B1B | 03AB | 1608 | 0009 | 0A97 | | | | | | | |
| 03FC | TMC582 | 02F3 | 0111 | 041F | 0103 | | | | | | | | | | | | | | | | | | | | |
| 0400 | TMC582 | 0210 | 1B39 | 0A59 | 0A19 | 103F | 00DB | 1F5D | 00AE | 0042 | 1FB0 | 1FC0 | 0A57 | 1B41 | 0035 | 0114 | 0903 | 002C | | | | | | | |
| 0411 | TMC582 | 0022 | 1000 | 0021 | 003C | 1B1E | 0A80 | 1B20 | 0041 | 00CB | 13BD | 040D | 0404 | 040D | 0030 | 1D03 | 0042 | 1BAF | | | | | | | |
| 0422 | TMC582 | 0033 | 0HD2 | 0A49 | 1007 | 0A4B | 09DB | 0ADC | 0D29 | 1016 | 0010 | 1B3A | 0ADB | 1B04 | 0D00 | 0C9C | 1B05 | 0C90 | | | | | | | |
| 0433 | TMC582 | 1F12 | 0F09 | 0012 | 1B3H | 0C59 | 0900 | 0009 | 1B15 | 0300 | 1B19 | 096C | 0029 | 1B0D | 0CD2 | 0F04 | 1B0B | 0953 | | | | | | | |
| 0444 | TMC582 | 0300 | 1B04 | 0904 | 052C | 1017 | 0980 | 1B07 | 09BA | 095B | 0E00 | 0308 | 1B11 | 0085 | 0051 | 01DB | 0A47 | 041A | | | | | | | |
| 0455 | TMC582 | 0022 | 0CF0 | 0054 | 1F7H | 0A80 | 0A0B | 13CC | 0A01 | 00B1 | 0A0C | 0A87 | 00BE | 1F4A | 00A0 | 10CB | 0A07 | 02F3 | | | | | | | |
| 0466 | TMC582 | 0087 | 0AF3 | 0153 | 0427 | 09F3 | 0153 | 01D7 | 0150 | 01D7 | 0AD7 | 1909 | 00A0 | 1004 | 0427 | 01F3 | 0427 | 0AF3 | | | | | | | |
| 0477 | TMC582 | 0153 | 05D3 | 1B1D | 01D7 | 02DF | 0500 | 1006 | 02F0 | 030A | 01D7 | 02DB | 041F | 0CD4 | 0A0F | 0133 | 1B12 | 0410 | | | | | | | |
| 0488 | TMC582 | 08FB | 179C | 1BC1 | 00F4 | 00F2 | 005B | 1A97 | 0051 | 1C81 | 0081 | 0417 | 0095 | 1009 | 0437 | 02F3 | 0417 | 1B62 | | | | | | | |
| 0499 | TMC582 | 1F4A | 0051 | 00B0 | 0133 | 000F | 110B | 14BH | 1FFF | 00D4 | 1B00 | 030A | 0AD7 | 02F3 | 0111 | 041F | 0CDA | 1C11 | | | | | | | |
| 04AA | TMC582 | 1F4A | 1F0H | 0040 | 1023 | 0448 | 0042 | 1020 | 0092 | 1F4A | 1FD4 | 0447 | 1C7F | 0051 | 0404 | 02F0 | 0103 | 0107 | | | | | | | |
| 04BB | TMC582 | 032C | 0121 | 041F | 0100 | 0007 | 0000 | 0050 | 1B07 | 0121 | 040F | 0111 | 1D15 | 020B | 0457 | 04F3 | 1BC5 | 0041 | | | | | | | |
| 04CC | TMC582 | 0107 | 0417 | 1D05 | 0046 | 0090 | 00D4 | 1B87 | 0051 | 1H44 | 0406 | 02F0 | 0107 | 0100 | 00DF | 01D7 | 0201 | 0007 | | | | | | | |
| 04DD | TMC582 | 0007 | 0054 | 1CF4 | 0FD3 | 1C7C | 18F1 | 1040 | 1FF0 | 1FF0 | 040C | 00C5 | 0419 | 1B0A | 0900 | 0C00 | 0B9A | 0A0H | | | | | | | |
| 04EE | TMC582 | 1005 | 0213 | 0810 | 0409 | 04D4 | 04D5 | 1B05 | 0401 | 0419 | 1B06 | 0C08 | 09BB | 0050 | 15BE | 00FB | 17AA | 1D28 | | | | | | | |
| 04FF | TMC582 | 1FC4 | 19C9 | 1FB4 | 1B79 | 1E3A | 14BB | 1FF0 | 1990 | 19D7 | 0051 | 1CD8 | 19DD | 1CC4 | 1C22 | 1D40 | 1BF2 | 1F41 | | | | | | | |
| 0510 | TMC582 | 19F0 | 1E1A | 19F0 | 0051 | 1F2C | 19F3 | 0051 | 19DA | 19F0 | 19DA | 1B09 | 19FF | 1C1C | 1F0B | 1B05 | 1FE2 | 19D0 | | | | | | | |
| 0521 | TMC582 | 1AF0 | 1F72 | 1A0F | 1956 | 1D0A | 1949 | 1949 | 1AFF | 1F0A | 1DCA | 1983 | 1983 | 1A03 | 1F9A | 1B0A | 1AC1 | 1D0A | | | | | | | |
| 0532 | TMC582 | 0051 | 1AF1 | 1A31 | 1D43 | 1FCA | 1911 | 1FFA | 1FF2 | 1A3D | 1AF1 | 1B0F | 1A43 | 1FEC | 0A27 | 0045 | 1F63 | 1927 | | | | | | | |
| 0543 | TMC582 | 1F94 | 1953 | 1FFA | 0020 | 1F01 | 0FDC | 17D5 | 0303 | 1F91 | 0040 | 00AA | 100C | 041F | 0003 | 0AF3 | 0419 | 1A9C | | | | | | | |
| 0554 | TMC582 | 0044 | 0040 | 0447 | 02F0 | 0103 | 0487 | 02F3 | 00F2 | 0058 | 005B | 041F | 02D6 | 0050 | 1004 | 020F | 00FB | 007A | | | | | | | |
| 0565 | TMC582 | 1H3F | 0110 | 0078 | 1B2B | 0437 | 0EFA | 0AB8 | 1B03 | 0A06 | 1002 | 0709 | 0AD2 | 1016 | 0030 | 1B0C | 0A88 | 0AD2 | | | | | | | |
| 0576 | TMC582 | 0A80 | 0A4H | 1B04 | 0A48 | 0154 | 02AH | 0230 | 1B24 | 0280 | 102A | 0008 | 0304 | 1B09 | 0030 | 1B0A | 0000 | 0300 | | | | | | | |
| 0587 | TMC582 | 0709 | 1F0B | 0032 | 0232 | 101H | 0058 | 1B0A | 0509 | 1F9A | 0809 | 1792 | 0058 | 1B0C | 0938 | 0308 | 0230 | 1006 | | | | | | | |
| 0598 | TMC582 | 0500 | 1B0A | 0308 | 1B0F | 0040 | 0088 | 1B0A | 0050 | 1D9F | 041F | 090A | 0005 | 0F2C | 0F2C | 0005 | 1B06 | 0040 | | | | | | | |
| 05A9 | TMC582 | 0400 | 0BF8 | 1B0B | 0000 | 00CB | 1E2F | 0A0A | 0000 | 0202 | 1B00 | 0001 | 0007 | 0012 | 0042 | 040D | 1E10 | 0B00 | | | | | | | |
| 05BA | TMC582 | 0040 | 0040 | 0400 | 0050 | 1E05 | 0A85 | 13AF | 0A45 | 170C | 0A95 | 1EA0 | 0A75 | 1B0B | 0A85 | 0A55 | 1B3H | 0A75 | | | | | | | |
| 05CB | TMC582 | 1B2B | 0A55 | 0A05 | 1B2A | 132F | 0051 | 02D7 | 04D7 | 02F0 | 0101 | 0414 | 02D0 | 0309 | 170B | 0009 | 1710 | 02D7 | | | | | | | |
| 05DC | TMC582 | 1B07 | 041F | 00F3 | 0AF3 | 0A19 | 11HF | 1E01 | 0A45 | 0A55 | 0A05 | 170C | 00B2 | 0002 | 1E41 | 1B45 | 0A55 | 1EC0 | | | | | | | |
| 05ED | TMC582 | 0A45 | 1E92 | 00B0 | 00D2 | 00B2 | 1E98 | 0A27 | 02F4 | 02DF | 17EA | 177C | 1E97 | 1E81 | 0100 | 0100 | 0100 | 0100 | | | | | | | |
| 05FE | TMC582 | 0100 | 0100 | 0100 | 0100 | 0100 | 0C40 | 1E78 | 0011 | 1E0B | 1E41 | 13F1 | 1EC5 | 0A19 | 1B1A | 0058 | 0058 | 0058 | | | | | | | |

TABLE IIa

| HEX ADDRESS | CHIP | INSTRUCTION WORDS+ | | | | | | | | | | | | | | | | | | | |
|---|---|---|---|---|---|---|---|---|---|---|---|---|---|---|---|---|---|---|---|---|---|
| 0600 | TMC582 | 0C53 | 0C53 | 071B | 0C53 | 0610 | 1B06 | 0900 | 0C80 | 0309 | 1B04 | 005A | 004A | 1008 | 0209 | 0050 | 0052 | 1267 | | | |
| 0620 | TMC582 | 00EA | 1257 | 0008 | 133C | 00D6 | 0006 | 0213 | 0698 | 0608 | 1005 | 0610 | 0600 | 06F0 | 0620 | 180C | 0605 | 0655 | | | |
| 0631 | TMC582 | 0665 | 0675 | 1019 | 06F0 | 0620 | 180C | 0605 | 0655 | 0665 | 0675 | 1029 | 00C6 | 0660 | 0680 | 0608 | 180E | 009A | | | |
| 0642 | TMC582 | 1B28 | 0601 | 0CD5 | 0F28 | 0921 | 061A | 0CD5 | 0605 | 101A | 0CD5 | 0F28 | 0F28 | 0F28 | 0CD5 | 0608 | 0608 | 1008 | | | |
| 0653 | TMC582 | 0213 | 0610 | 0609 | 06F0 | 0620 | 1839 | 06F0 | 0620 | 183E | 0605 | 0655 | 0665 | 0675 | 1B49 | 0601 | 0619 | 1B04 | | | |
| 0664 | TMC582 | 0C08 | 0908 | 0675 | 1B1A | 0665 | 1B12 | 0065 | 0060 | 0CB5 | 0001 | 0695 | 0005 | 1800 | 0065 | 0665 | 180C | 0090 | | | |
| 0675 | TMC582 | 0685 | 0680 | 1008 | 0085 | 0090 | 181E | 0092 | 0685 | 0085 | 180C | 0080 | 0695 | 0009 | 100C | 0095 | 0665 | 0065 | | | |
| 0686 | TMC582 | 1B06 | 0060 | 0095 | 0068 | 1B28 | 0610 | 06F8 | 1B28 | 0697 | 02F6 | 0131 | 061F | 06D6 | 067E | 061F | 0906 | 02F6 | | | |
| 0697 | TMC582 | 0230 | 0630 | 1012 | 0600 | 06F8 | 1708 | 0905 | 0E2C | 0E2C | 0905 | 1F8E | 0066 | 0069 | 0050 | 0052 | 1717 | 00CA | | | |
| 06A8 | TMC582 | 1066 | 0600 | 062C | 0085 | 0600 | 0675 | 0665 | 0655 | 1B0D | 0015 | 040C | 0F01 | 1EF6 | 00C0 | 0051 | 10C3 | 17F3 | | | |
| 06B9 | TMC582 | 061F | 0903 | 05F3 | 0619 | 1F8H | 0050 | 17B6 | 00AA | 0044 | 0042 | 130A | 0082 | 1802 | 0608 | 09F6 | 0002 | 0107 | | | |
| 06CA | TMC582 | 0070 | 1B04 | 0309 | 1B06 | 0687 | 0CF0 | 0900 | 0090 | 0104 | 0308 | 0100 | 11AF | 0107 | 00AA | 1173 | 1B45 | | | | |
| 06DB | TMC582 | 0407 | 02F3 | 0111 | 061F | 0104 | 0105 | 0F2C | 0105 | 1249 | 0685 | 0665 | 0695 | 0655 | 100E | 0675 | 1F0F | 0665 | | | |
| 06EC | TMC582 | 1006 | 0685 | 1098 | 0111 | 040F | 0131 | 18F6 | 0058 | 1000 | 0100 | 0406 | 02F8 | 0022 | 0095 | 00E5 | 0005 | 0400 | | | |
| 06FD | TMC582 | 0032 | 1B68 | 0010 | 1B06 | 0930 | 18E7 | 0009 | 165F | 0080 | 0100 | 0CC3 | 0920 | 0030 | 15C8 | 00DC | 01AC | 0729 | | | |
| 070E | TMC582 | 1040 | 0C49 | 1550 | 0C88 | 0720 | 1809 | 155A | 0104 | 00BA | 0009 | 177D | 0030 | 1FCA | 0108 | 1F85 | 0600 | 00AC | | | |
| 071F | TMC582 | 0104 | 0606 | 02F6 | 0110 | 0120 | 0919 | 0939 | 1C80 | 0009 | 13C5 | 0036 | 0009 | 0009 | 15C0 | 0028 | 1B08 | 0090 | | | |
| 0730 | TMC582 | 0108 | 0022 | 0203 | 0108 | 06DC | 0080 | 0604 | 0C00 | 0008 | 1004 | 0C20 | 0E04 | 0008 | 1012 | 0C23 | 0608 | 02F6 | | | |
| 0741 | TMC582 | 032C | 0038 | 1140 | 0CC4 | 1980 | 0CC0 | 1813 | 0608 | 0475 | 1819 | 0008 | 1F10 | 0C23 | 0C18 | 0C58 | 1984 | 0C83 | | | |
| 0752 | TMC582 | 060C | 0140 | 0210 | 0140 | 0108 | 01C0 | 0030 | 1742 | 0CBB | 1F62 | 1D62 | 1D62 | 1F63 | 0665 | 180C | 0655 | 1B08 | | | |
| 0763 | TMC582 | 0008 | 0008 | 1969 | 0207 | 0309 | 0207 | 1B30 | 0000 | 0070 | 0002 | 00E4 | 1614 | 19C0 | 0051 | 0EB0 | 0034 | 0026 | | | |
| 0774 | TMC582 | 0013 | 0123 | 1F55 | 0685 | 0685 | 0675 | 0655 | 0685 | 1020 | 0695 | 1831 | 0207 | 0309 | 0207 | 1143 | 061F | 010A | | | |
| 0785 | TMC582 | 017F | 017F | 00E9 | 0608 | 02F6 | 0174 | 0607 | 061A | 0605 | 1908 | 0695 | 1022 | 0075 | 0665 | 1800 | 0065 | 0695 | | | |
| 0796 | TMC582 | 1B00 | 0055 | 0685 | 1800 | 0005 | 0608 | 02F6 | 0259 | 1006 | 0178 | 0C7A | 00E8 | 1006 | 0068 | 1474 | 0176 | 0080 | | | |
| 07A7 | TMC582 | 180E | 061F | 0206 | 0608 | 0131 | 0107 | 00C4 | 0068 | 1802 | 0040 | 1754 | 06C8 | 010E | 0107 | 0070 | 1608 | 0400 | | | |
| 07B8 | TMC582 | 0800 | 0015 | 0400 | 17C7 | 14C4 | 0130 | 0007 | 0400 | 1897 | 0619 | 1504 | 0C48 | 0908 | 061F | 0906 | 06F6 | 0639 | | | |
| 07C9 | TMC582 | 11C6 | 00D4 | 0080 | 00C8 | 0000 | 11C6 | 0470 | 08FD | 181A | 0697 | 02F6 | 0131 | 061F | 0606 | 067E | 0639 | 1008 | | | |
| 07DA | TMC582 | 0053 | 0050 | 15ED | 0640 | 08FD | 101A | 0008 | 1940 | 0107 | 061F | 0900 | 0180 | 0E08 | 0E09 | 0107 | 1190 | 0008 | | | |
| 07EB | TMC582 | 1008 | 0640 | 08FD | 1009 | 0697 | 02F6 | 0131 | 061F | 0103 | 0C5E | 0C7E | 000A | 000A | 1F76 | 0939 | 1748 | 000A | | | |
| 07FC | TMC582 | 1906 | 000A | 0008 | 0072 | | | | | | | | | | | | | | | | |
| 0800 | TMC582 | 0082 | 17F5 | 1FE3 | 0697 | 02F6 | 0107 | 0231 | 09F0 | 0107 | 0082 | 1C97 | 1E7D | 1085 | 0126 | 0606 | 02F6 | 0020 | | | |
| 0811 | TMC582 | 0034 | 0000 | 1FF5 | 1FF8 | 032C | 19AE | 0C91 | 1FC0 | 1143 | 0082 | 0001 | 1FF9 | 0051 | 0020 | 1800 | 0090 | 010B | | | |
| 0822 | TMC582 | 0E09 | 170B | 0ED0 | 072C | 150C | 072C | 1500 | 0700 | 1BC8 | 043F | 040C | 0408 | 06F6 | 060F | 0608 | 06F6 | 02F6 | | | |
| 0833 | TMC582 | 0102 | 0490 | 08FD | 1667 | 0008 | 0008 | 180C | 00C8 | 1262 | 0000 | 0002 | 1689 | 040C | 0239 | 0231 | 061A | 0176 | | | |
| 0844 | TMC582 | 1F84 | 0239 | 1F17 | 0685 | 1800 | 0085 | 0655 | 1800 | 0095 | 0665 | 0675 | 1B00 | 0095 | 0231 | 061A | | | | | |
| 0855 | TMC582 | 1B99 | 1D78 | 1742 | 080C | 0667 | 1CC5 | 1F92 | 00AA | 177A | 0000 | 0107 | 061F | 0906 | 0002 | 1B0F | 0CF6 | 0105 | | | |
| 0866 | TMC582 | 072H | 0619 | 1F02 | 0CD3 | 0953 | 0953 | 0953 | 0989 | 1D3A | 0887 | 09F3 | 0988 | 0020 | 1905 | 0983 | 0D2C | 1002 | | | |
| 0877 | TMC582 | 0960 | 0990 | 0407 | 02F3 | 0111 | 061F | 0103 | 0008 | 061F | 0100 | 1806 | 0509 | 180C | 0958 | 095P | 0958 | 0908 | | | |
| 0888 | TMC582 | 1004 | 0108 | 0958 | 0958 | 0958 | 0958 | 095P | 0953 | 0953 | 0953 | 0953 | 0953 | 0993 | 0008 | 1B00 | 0608 | 0C53 | | | |
| 0899 | TMC582 | 0910 | 060F | 0101 | 0105 | 0089 | 0107 | 10CF | 1F8E | 0F21 | 1B08 | 0099 | 0030 | 000E | 0802 | 0026 | 0006 | 0009 | | | |
| 08AA | TMC582 | 0400 | 0059 | 1B08 | 0031 | 00E8 | 0014 | 1B86 | 0102 | 061F | 0100 | 0908 | 061A | 06F6 | 0605 | 111B | 008B | 158A | | | |
| 08BB | TMC582 | 0867 | 09F6 | 0580 | 0500 | 159F | 0040 | 0000 | 0000 | 1D9A | 1A2H | 1F6C | 0958 | 0708 | 1805 | 0608 | 0607 | 061A | | | |
| 08CC | TMC582 | 0C06 | 0608 | 02F6 | 0080 | 171C | 0CFC | 1F1A | 0CE8 | 1A20 | 0665 | 0604 | 1796 | 0080 | 181B | 0C33 | 1F78 | 1F0F | | | |
| 08DD | TMC582 | 1F0F | 0040 | 1B00 | 0608 | 0657 | 061A | 1F87 | 0107 | 0908 | 02F6 | 0687 | 0906 | 0909 | 1FF8 | 0008 | 0009 | 0501 | | | |
| 08EE | TMC582 | 1F9C | 1790 | 0100 | 0100 | 0100 | 0100 | 0100 | 0100 | 0100 | 0100 | 0100 | 0100 | 0080 | 1B08 | 0051 | 0030 | 0009 | | | |
| 08FF | TMC582 | 1F1C | 0877 | 06F3 | 0689 | 1FFC | 0090 | 11F1 | 060B | 1F0B | 1A31 | 0051 | 080C | 0108 | 0100 | 0032 | 0022 | 1B37 | | | |
| 0910 | TMC582 | 0106 | 0606 | 02F6 | 0009 | 0012 | 0030 | 11E7 | 0940 | 072C | 1B05 | 1B3F | 0697 | 02F6 | 0131 | 061F | 0103 | 0C5E | | | |
| 0921 | TMC582 | 0C7E | 0008 | 00C8 | 1D20 | 02D8 | 0930 | 1A06 | 0303 | 1A02 | 1FE4 | 1FE0 | 0080 | 0052 | 1FE8 | 0108 | 061F | 0103 | | | |
| 0932 | TMC582 | 017F | 1FE0 | 0107 | 0103 | 180F | 0107 | 0667 | 09F0 | 0107 | 00F5 | 00C5 | 0065 | 0657 | 061A | 0400 | 0053 | 0050 | | | |
| 0943 | TMC582 | 1FC8 | 0040 | 1F70 | 16A8 | 0030 | 1100 | 0709 | 1B04 | 0E08 | 0009 | 0E00 | 11C6 | 0099 | 0051 | 147F | 070A | 0030 | | | |
| 0954 | TMC582 | 1B06 | 0908 | 1F9F | 030B | 0309 | 1F45 | 0036 | 1FEB | 0050 | 1B08 | 0011 | 0477 | 061A | 1B40 | 0050 | 1008 | 0011 | | | |
| 0965 | TMC582 | 0457 | 061A | 0108 | 01C0 | 0031 | 0700 | 1BHB | 0107 | 0176 | 04D7 | 02F6 | 0131 | 061F | 0103 | 0102 | 0E08 | 1572 | | | |
| 0976 | TMC582 | 0131 | 060F | 0101 | 0909 | 017E | 00C4 | 0700 | 0648 | 1002 | 0709 | 1600 | 0000 | 0477 | 06F0 | 03D0 | 06H8 | 02B8 | | | |
| 0987 | TMC582 | 1008 | 0709 | 0309 | 15EC | 0008 | 0697 | 1815 | 0107 | 1441 | 0685 | 1457 | 0695 | 1F93 | 0675 | 0685 | 1641 | 0665 | | | |
| 0998 | TMC582 | 1DFF | 0655 | 0695 | 0068 | 1080 | 1003 | 00C8 | 1751 | 0600 | 060C | 0005 | 0065 | 0095 | 00C8 | 13D8 | 0670 | 0685 | | | |
| 0949 | TMC582 | 1006 | 0685 | 140F | 0695 | 1366 | 0675 | 1004 | 0665 | 1780 | 0655 | 1605 | 0082 | 01DF | 1C5D | 1904 | 032C | 1070 | | | |
| 09B4 | TMC582 | 0C60 | 0E09 | 1773 | 0C58 | 0D29 | 1561 | 0020 | 0032 | 1F61 | 0033 | 0023 | 1F87 | 0685 | 15F4 | 0675 | 17CD | 0665 | | | |
| 09CB | TMC582 | 1504 | 0655 | 151A | 0082 | 1E3D | 0665 | 0695 | 0675 | 103F | 0665 | 1483 | 0685 | 1636 | 0655 | 100B | 0685 | 1DFF | | | |
| 09DC | TMC582 | 0180 | 1FED | 1055 | 0C08 | 032C | 1B05 | 00B0 | 1221 | 0CH0 | 1833 | 0C08 | 0C7E | 0F00 | 0C58 | 1630 | 175E | 1F67 | | | |
| 09ED | TMC582 | 0C08 | 072C | 1B05 | 060C | 0CD2 | 0E09 | 1B06 | 0C53 | 0C80 | 0020 | 1B06 | 0C08 | 0031 | 0720 | 17B7 | 0006 | 0620 | | | |
| 09FE | TMC582 | 0C15 | 1D9F | | | | | | | | | | | | | | | | | | |

TABLE IIb

| HEX ADDRESS | CHIP | INSTRUCTION WORDS+ | | | | | | | | | | | | | | | | | | | |
|---|---|---|---|---|---|---|---|---|---|---|---|---|---|---|---|---|---|---|---|---|---|
| | | | | 1BE7 | 1EE0 | 1BE8 | 1BE0 | 1BEF | 1C01 | 1B9E | 1C05 | 1B00 | 1B06 | 0305 | 1EAC | 0099 | 0051 | 1B95 | | | |
| 0A0F | TMC583 | 170F | 1FE6 | 1C08 | 1F7C | 1B04 | 1DC2 | 1B17 | 00E9 | 1C29 | 0081 | 1FDE | 0C08 | 0C08 | 0509 | 0180 | 1B06 | 0A27 | | | |
| 0A20 | TMC583 | 02E0 | 0008 | 0004 | 0C08 | 0106 | 0018 | 11E6 | 0090 | 0092 | 1722 | 0070 | 1762 | 0107 | 0051 | 1092 | 00C0 | 00E1 | | | |
| 0A31 | TMC583 | 0106 | 0012 | 0406 | 02F6 | 1C81 | 0ED6 | 1085 | 0107 | 0667 | 09F0 | 0940 | 0008 | 0667 | 02F3 | 0082 | 0407 | 0160 | | | |
| 0A42 | TMC583 | 0101 | 061F | 0600 | 0C40 | 0H00 | 1D30 | 0110 | 0107 | 0102 | 061F | 0104 | 0C7A | 0940 | 0201 | 09E6 | 0906 | 0A0F | | | |
| 0A53 | TMC583 | 0131 | 0908 | 060F | 0639 | 1640 | 0309 | 00C8 | 1004 | 00C8 | 0009 | 0009 | 1810 | 0667 | 09F6 | 0589 | 0500 | 1006 | | | |
| 0A64 | TMC583 | 0000 | 0000 | 0180 | 1002 | 0040 | 0041 | 1791 | 0001 | 1DC0 | 0052 | 0107 | 0091 | 1657 | 0685 | 1F07 | 0685 | 17C8 | | | |
| 0A75 | TMC583 | 1F99 | 0082 | 0685 | 0655 | 1189 | 1F93 | 0070 | 1354 | 0685 | 0675 | 101A | 0685 | 1530 | 0695 | 1D0F | 0685 | 1536 | | | |
| 0A86 | TMC583 | 0655 | 1B06 | 0685 | 1781 | 00AA | 11AF | 0040 | 0082 | 1B04 | 0668 | 0001 | 0107 | 0608 | 0CE0 | 0607 | 061A | 0685 | | | |
| 0A97 | TMC583 | 1B08 | 0695 | 101A | 0075 | 0665 | 1B00 | 0085 | 0695 | 1B00 | 0055 | 0685 | 1B08 | 0085 | 0604 | 02F6 | 0100 | 10E7 | | | |
| 0AA8 | TMC583 | 0030 | 1B06 | 0700 | 0908 | 0022 | 0108 | 0202 | 0108 | 0200 | 0C00 | 0C00 | 06DC | 1B28 | 0C5H | 0C48 | 181C | 0C9C | | | |
| 0AB9 | TMC583 | 0C9C | 0CB3 | 0C99 | 1B09 | 01D2 | 0CBA | 01D2 | 0C94 | 1B02 | 0F29 | 1B1D | 0C60 | 0C08 | 0E09 | 1B1D | 0C10 | 0E09 | | | |
| 0AC8 | TMC583 | 1B06 | 0C00 | 1B07 | 0140 | 0210 | 0140 | 0620 | 1D3F | 1C87 | 0CB3 | 0F2C | 1B05 | 0C60 | 0C08 | 0E09 | 1B08 | 0100 | | | |
| 0AD9 | TMC583 | 0210 | 0180 | 0910 | 1D99 | 0400 | 1B41 | 153F | 0CBA | 1285 | 0E2C | 1B07 | 0C40 | 0C7E | 0E29 | 1B09 | 0E09 | 1B06 | | | |
| 0AEC | TMC583 | 0C00 | 0308 | 0608 | 0E09 | 0C10 | 1B1D | 0903 | 09D8 | 0E29 | 1F2F | 0C60 | 0700 | 1B09 | 0032 | 0900 | 0700 | 181B | | | |
| 0AFD | TMC583 | 0E03 | 0CD2 | 1EC7 | 0107 | 0001 | 0627 | 01F0 | 06F0 | 0180 | 0107 | 0072 | 00C9 | 1D03 | 0099 | 0008 | 1CF1 | 0685 | | | |
| 0B0F | TMC583 | 12F0 | 180C | 1C94 | 1F92 | 1B47 | 1HF1 | 1DF8 | 1F52 | 0082 | 1F1A | 1772 | 0153 | 0153 | 0153 | 0153 | 01A3 | 1034 | | | |
| 0B1F | TMC583 | 0100 | 1ED6 | 1D93 | 1F0A | 040C | 1F02 | 1F00 | 1FFF | 1FFC | 1FFA | 1FFB | 072C | 0021 | 0CD2 | 072C | 1D10 | 0CA0 | | | |
| 0B30 | TMC583 | 1A07 | 0C08 | 0C58 | 0E00 | 0304 | 1B11 | 0E09 | 1B06 | 0C00 | 0300 | 06DH | 1F51 | 00C9 | 00D1 | 0107 | 0685 | 0677 | | | |
| 0B41 | TMC583 | 1014 | 0685 | 0655 | 0607 | 1B04 | 0685 | 1B0F | 0607 | 1B0A | 0685 | 0687 | 1008 | 0627 | 02F0 | 0685 | 1B08 | 0300 | | | |
| 0B52 | TMC583 | 06E7 | 00CB | 02F6 | 0131 | 061F | 0CD0 | 0131 | 060F | 0101 | 1B2B | 1F43 | 1F57 | 17BF | 1789 | 0685 | 12F6 | 0675 | | | |
| 0B63 | TMC583 | 11DB | 0665 | 12E4 | 0685 | 1567 | 0083 | 1B49 | 0901 | 0960 | 0100 | 0140 | 0407 | 02F6 | 0131 | 061F | 0906 | 0974 | | | |
| 0B74 | TMC583 | 027F | 027F | 027F | 027F | 027F | 00HE | 1F24 | 0675 | 1B00 | 0903 | 0108 | 0108 | 0509 | 010E | 1A82 | 0C00 | 0627 | | | |

TABLE IIb

| HEX ADDRESS | CHIP | INSTRUCTION WORDS→ | | | | | | | | | | | | | | | | | |
|---|---|---|---|---|---|---|---|---|---|---|---|---|---|---|---|---|---|---|---|
| 0085 | TMS583 | 0AFA | 09FA | 0988 | 0C08 | 0508 | 05BE | 0A76 | 0C76 | 1A9C | 0980 | 0A08 | 09F6 | 0980 | 0A0E | 0101 | 0908 | 0008 | |
| 0094 | TMS583 | 0084 | 1006 | 0475 | 0108 | 0108 | 0108 | 1A65 | 0500 | 0A08 | 0500 | 1805 | 040C | 0418 | 0A65 | 1808 | 0045 | 0455 | |
| 0A47 | TMS583 | 1804 | 0095 | 0445 | 1808 | 0085 | 0A80 | 0418 | 01DE | 01D5 | 01F0 | 01D5 | 1A60 | 0009 | 09DE | 0C76 | 0C76 | 0973 | |
| 0AAA | TMS583 | 0954 | 01D2 | 0980 | 01D2 | 0131 | 040F | 0111 | 0008 | 0004 | 1791 | 0930 | 1537 | 0009 | 01D8 | 06F7 | 02F6 | 0131 | |
| 0AC9 | TMS583 | 040F | 0111 | 1F00 | 01D7 | 01D8 | 01D7 | 1D0F | 1F79 | 1FB6 | 02F3 | 0219 | 0A03 | 0497 | 01F0 | 174C | 0407 | 02F6 | |
| 0AD4 | TMS583 | 0131 | 041F | 09D6 | 017F | 017F | 017F | 017F | 0990 | 1D10 | 0903 | 0140 | 0148 | 0509 | 01DE | 1A84 | 0140 | 0427 | |
| 0AEB | TMS583 | 09F6 | 0AFA | 0988 | 0108 | 0508 | 05BE | 0A76 | 0C76 | 1A40 | 0140 | 0506 | 0AF8 | 0181 | 0111 | 1EAF | 1A40 | 1FB2 | |
| 0AFC | TMS583 | 1FAA | 0100 | 0100 | 0100 | | | | | | | | | | | | | | |
| 0C00 | TMS583 | 0100 | 0100 | 0100 | 0100 | 0100 | 0100 | 0100 | 0239 | 1F85 | 0095 | 1F71 | 041F | 01D6 | 017E | 00FA | 1F41 | 0447 | |
| 0C11 | TMS583 | 02F0 | 0101 | 040F | 0131 | 004A | 142E | 01D2 | 1FC3 | 0002 | 1FF7 | 0148 | 01D2 | 0180 | 01D2 | 0148 | 0954 | 0AF6 | |
| 0C22 | TMS583 | 0908 | 0140 | 0939 | 1A3 | 0508 | 10AF | 1A1C | 004A | 1FAA | 00C9 | 0400 | 1AA2 | 01D2 | 017F | 0309 | 1A36 | 0070 | |
| 0C33 | TMS583 | 1032 | 0000 | 1012 | 0400 | 0445 | 1809 | 0475 | 1AAE | 0485 | 0400 | 141F | 01D5 | 0447 | 0AF3 | 0A21 | 0CF8 | 0498 | |
| 0C44 | TMS583 | 0417 | 01D5 | 0239 | 1073 | 0000 | 1A04 | 0439 | 157A | 041F | 01D3 | 0231 | 0AF3 | 040F | 0111 | 017F | 0AFE | 0AF9 | |
| 0C55 | TMS583 | 1D8F | 0080 | 1364 | 1801 | 0405 | 1D40 | 0001 | 1CFF | 0C4A | 032C | 1A05 | 0CD2 | 0CB9 | 171A | 0CAA | 0400 | 02F8 | |
| 0C66 | TMS583 | 1D00 | 01D7 | 00A6 | 010A | 0908 | 0140 | 0409 | 1A04 | 0300 | 0800 | 0D00 | 0000 | 041F | 0906 | 097E | 0008 | 1805 | |
| 0C77 | TMS583 | 0931 | 041A | 0309 | 1A08 | 0455 | 1004 | 0001 | 01D7 | 1D27 | 165C | 0990 | 1A08 | 00C0 | 1EA9 | 01DE | 00C0 | 1A49 | |
| 0C88 | TMS583 | 010A | 1A9D | 0C4A | 072C | 1A05 | 0040 | 1F9A | 010C | 0030 | 0E03 | 1F97 | 0E09 | 1F95 | 0CD2 | 1F95 | 0F24 | 0CAA | |
| 0C99 | TMS583 | 1A05 | 0C80 | 1AC3 | 0C40 | 0C58 | 0C19 | 100F | 0C4C | 0143 | 0080 | 1A04 | 0406 | 0030 | 0007 | 0CC4 | 1008 | 0C98 | |
| 0CAA | TMS583 | 00C0 | 1A23 | 0020 | 1A27 | 0072 | 0CE8 | 0C9A | 14FF | 0080 | 1A9A | 0C2A | 01DC | 1A30 | 0400 | 0A0C | 0418 | 0107 | |
| 0CBB | TMS583 | 1D02 | 0008 | 0009 | 0231 | 09F0 | 01D7 | 1A00 | 0041 | 1P11 | 0475 | 1006 | 0465 | 1AC3 | 0455 | 1783 | 1E20 | 1A7F | |
| 0CCC | TMS583 | 1AFC | 0455 | 1F35 | 0445 | 101A | 1C4F | 0495 | 141A | 0485 | 1A03 | 0475 | 124E | 0465 | 1F4A | 0455 | 0465 | 0002 | |
| 0CDD | TMS583 | 1A01 | 0455 | 1040 | 1F59 | 041F | 0900 | 0500 | 01D7 | 1F20 | 0004 | 1F31 | 0465 | 0455 | 16A0 | 0400 | 0A0C | 00F5 | |
| 0CEE | TMS583 | 0005 | 00C5 | 0A00 | 1F24 | 0405 | 167F | 1A31 | 0003 | 19AA | 0239 | 01D5 | 01D8 | 10F8 | 052C | 0467 | 09F3 | 15EC | |
| 0CFF | TMS583 | 0900 | 0C08 | 032C | 052C | 100A | 0C80 | 0E24 | 1A09 | 0C4C | 0C8A | 032C | 1B11 | 00C0 | 1A08 | 0F36 | 0C90 | 0F04 | |
| 0D10 | TMS583 | 1A47 | 00F1 | 0031 | 0CD5 | 1E41 | 00C8 | 00C4 | 1AF0 | 01D7 | 01DE | 18C8 | 0495 | 1D25 | 0445 | 1D20 | 0445 | 0455 | |
| 0D21 | TMS583 | 10AF | 1531 | 1E94 | 1CF2 | 1D02 | 1A2F | 1F70 | 0497 | 02F3 | 0111 | 041F | 0603 | 0A5A | 0419 | 1216 | 0049 | 0001 | |
| 0D32 | TMS583 | 1A74 | 01D7 | 0900 | 0407 | 02F4 | 0131 | 041F | 0900 | 010A | 010A | 010A | 090A | 010A | 010A | 010A | 099A | 0131 | |
| 0D43 | TMS583 | 041F | 09A6 | 097E | 097F | 097E | 097F | 0949 | 1E41 | 0700 | 144C | 0092 | 18CF | 1F81 | 0AF7 | 02F8 | 0121 | 041F | |
| 0D54 | TMS583 | 01DA | 0457 | 02F0 | 0299 | 1042 | 0308 | 030A | 0C76 | 0980 | 030A | 1A07 | 0C4A | 032C | 1A05 | 030A | 0196 | 0121 | |
| 0D65 | TMS583 | 0416 | 0900 | 0121 | 040F | 0131 | 032C | 0121 | 0418 | 01D4 | 0407 | 02F0 | 0C4A | 0C4A | 0C76 | 030A | 1A09 | 0C84 | |
| 0D76 | TMS583 | 0121 | 040F | 0131 | 0400 | 01D2 | 1A61 | 0A0A | 0108 | 017F | 01D7 | 0070 | 1C22 | 0176 | 0107 | 0A30 | 0107 | 0000 | |
| 0D87 | TMS583 | 1C12 | 0AF7 | 02F4 | 0131 | 041F | 0206 | 09F0 | 00DE | 0939 | 1F5C | 0477 | 0CF6 | 0909 | 100C | 02F4 | 0239 | 1F52 | |
| 0D98 | TMS583 | 0A67 | 0CF4 | 041F | 01D0 | 0908 | 0508 | 1A08 | 0AC7 | 09F3 | 0988 | 0900 | 040F | 0101 | 0002 | 1A08 | 0008 | 1A08 | |
| 0DA9 | TMS583 | 0427 | 0AF0 | 0400 | 0437 | 09F0 | 017E | 042F | 040C | 0408 | 09F6 | 0008 | 1A0D | 0176 | 0176 | 0176 | 0930 | 1FA7 | |
| 0DBA | TMS583 | 01D5 | 0309 | 01DF | 1004 | 0508 | 0A67 | 09F4 | 1002 | 0100 | 0A0A | 0C76 | 04FA | 0181 | 0100 | 00AA | 171C | 01D5 | |
| 0DCB | TMS583 | 0002 | 0201 | 0007 | 0054 | 1DF0 | 02D8 | 0AF7 | 02F4 | 0131 | 041F | 0CD3 | 0131 | 040F | 0111 | 01D7 | 01D8 | 1F30 | |
| 0DDC | TMS583 | 0072 | 0309 | 01DF | 12A8 | 0508 | 0A67 | 09F4 | 1240 | 1F8F | 032C | 0121 | 041F | 01D6 | 0C30 | 0A07 | 02F8 | 0C7F | |
| 0DED | TMS583 | 0C58 | 0C40 | 0C80 | 032C | 1A08 | 00A3 | 0121 | 040F | 0111 | 032C | 0121 | 040F | 0131 | 0099 | 0008 | 1A08 | 0308 | |
| 0DFF | TMS583 | 1A04 | 0004 | 01D7 | 0400 | 1F25 | 0029 | 1076 | 0ED8 | 0034 | 1F70 | 0098 | 1A67 | 0080 | 1015 | 01D7 | 0477 | 09F0 | |
| 0E0F | TMS583 | 01D7 | 1F40 | 1910 | 1006 | 100C | 1004 | 1008 | 1AF0 | 1AFF | 1002 | 1000 | 0447 | 02F4 | 0131 | 041F | 0106 | 03D0 | |
| 0E20 | TMS583 | 1A84 | 1AF0 | 1A80 | 1AFC | 1F2A | 1AFA | 1F20 | 1F22 | 1F20 | 1AF0 | 177A | 0467 | 1914 | 1442 | 0445 | 1F73 | 1297 | |
| 0E31 | TMS583 | 1A00 | 1AFF | 1ACF | 1F08 | 1ACA | 1F00 | 1F02 | 1F00 | 1AF0 | 0044 | 0042 | 00CA | 0002 | 0001 | 0059 | 1A7F | 1A80 | |
| 0E42 | TMS583 | 1A4F | 1A4C | 1FFA | 1A4A | 1FF4 | 1FF2 | 1FF0 | 1A40 | 01D7 | 0201 | 0007 | 00D0 | 0054 | 1F14 | 0001 | 1A90 | 1A4F | |
| 0E53 | TMS583 | 1A0F | 1A84 | 1A4A | 1A44 | 1A42 | 1A40 | 0089 | 041F | 0900 | 040C | 0075 | 01A8 | 10AF | 1A70 | 1A4E | 1F44 | | |
| 0E64 | TMS583 | 0083 | 1A4A | 1A44 | 1A2F | 00C9 | 1A40 | 01D5 | 0092 | 00C4 | 0052 | 0002 | 1FCA | 1F30 | 1A50 | 1A10 | 1A0C | 1A04 | |
| 0E75 | TMS583 | 1A0A | 1A30 | 1A32 | 0100 | 0051 | 1A25 | 010C | 01A8 | 01A8 | 01D5 | 01B0 | 1A16 | 1A30 | 1A2E | 1A2C | 1EAA | 1A0E | |
| 0E86 | TMS583 | 1A24 | 1A24 | 1A22 | 1A20 | 1F44 | 10D4 | 00A0 | 1A08 | 00A0 | 1018 | 0051 | 1A10 | 1A0F | 1A0C | 1F0A | 1A0A | 1F44 | |
| 0E97 | TMS583 | 1A04 | 1A02 | 0082 | 0040 | 15AC | 0219 | 1342 | 017E | 0308 | 195A | 0910 | 0000 | 1097 | 1F4A | 01D7 | 041F | 01D0 | |
| 0EA8 | TMS583 | 0437 | 0AFA | 0A70 | 040F | 0101 | 040A | 09F0 | 02F4 | 0008 | 0009 | 0009 | 1111 | 090F | 100C | 0939 | 10C7 | 0437 | |
| 0EB9 | TMS583 | 0AFA | 0000 | 0901 | 02F4 | 1CD3 | 0089 | 041F | 0100 | 09AA | 041A | 0508 | 1E6D | 0909 | 010E | 017F | 017E | 09DE | |
| 0EC4 | TMS583 | 0139 | 1A04 | 0437 | 09F4 | 0900 | 0908 | 1F85 | 010A | 010A | 0306 | 030A | 01DE | 1285 | 0041 | 0901 | 02F4 | 1A87 | |
| 0ED8 | TMS583 | 0100 | 04FA | 0181 | 0104 | 0475 | 010A | 1632 | 030A | 1A47 | 017F | 017F | 1A09 | 0139 | 0009 | 100E | 003A | 1A1A | |
| 0EEC | TMS583 | 0709 | 1A10 | 0C19 | 1A10 | 0447 | 02F3 | 0249 | 1A08 | 040C | 0045 | 046A | 040C | 0045 | 0020 | 1A04 | 046B | 0A4A | |
| 0EFD | TMS583 | 0042 | 0042 | 0002 | 0050 | 1A0F | 1F45 | 0100 | 0100 | 0100 | 0100 | 0100 | 0100 | 0100 | 0100 | 0100 | 0100 | 0475 | |
| 0F0E | TMS583 | 1A4C | 0939 | 1014 | 041F | 01DC | 094A | 0008 | 0008 | 0008 | 0900 | 040F | 0101 | 0049 | 0000 | 11C5 | 004A | 177F | |
| 0F1F | TMS583 | 0004 | 01D2 | 0009 | 1A03 | 0100 | 0646 | 0C7A | 04FA | 0181 | 0100 | 0408 | 02F6 | 0201 | 041A | 0455 | 0465 | 0231 | |
| 0F30 | TMS583 | 041A | 1F90 | 01DA | 1F9A | 1F4F | 170C | 0401 | 040C | 0498 | 040A | 1005 | 0488 | 0404 | 0455 | 1A00 | 0400 | 04FF | |
| 0F41 | TMS583 | 0440 | 00FF | 1019 | 1F55 | 0100 | 04FA | 0181 | 0104 | 0477 | 02F0 | 0090 | 0092 | 1A0F | 00CA | 0050 | 1048 | 0000 | |
| 0F52 | TMS583 | 15F2 | 040C | 0231 | 041A | 0239 | 017F | 197F | 0239 | 1983 | 00F5 | 00F5 | 0005 | 0475 | 1A04 | 0045 | 0455 | 1A08 | |
| 0F63 | TMS583 | 0045 | 0455 | 1A04 | 0095 | 0445 | 1A04 | 0085 | 0231 | 041A | 0015 | 040C | 0120 | 0433 | 040F | 0111 | 0406 | 02F0 | |
| 0F74 | TMS583 | 0107 | 0497 | 02F3 | 0111 | 041F | 0100 | 0500 | 0111 | 040F | 0101 | 0400 | 0400 | 0400 | 041F | 0100 | 1A40 | 0140 | |
| 0F85 | TMS583 | 0375 | 04FA | 0181 | 0131 | 004A | 1F20 | 01D7 | 0A03 | 0000 | 0045 | 1FFA | 0447 | 04FA | 0155 | 041F | 0900 | 09AA | |
| 0F96 | TMS583 | 0944 | 041A | 1C9D | 0455 | 0400 | 1A48 | 1F41 | 0440 | 0AF0 | 041F | 01D0 | 0700 | 1340 | 040F | 0101 | 0908 | 0C40 | |
| 0FA7 | TMS583 | 0C40 | 0091 | 0041 | 0001 | 1CFF | 1D48 | 17AF | 0497 | 02F3 | 0111 | 041F | 01D0 | 0908 | 0AF3 | 0908 | 0950 | 0900 | |
| 0FB8 | TMS583 | 0F51 | 0C53 | 0950 | 0111 | 040F | 0101 | 1F03 | 1749 | 01D7 | 0000 | 1AF4 | 0407 | 02F0 | 0101 | 041F | 0900 | 0908 | |
| 0FC9 | TMS583 | 0140 | 0140 | 0908 | 0954 | 0908 | 0C40 | 0C40 | 0908 | 02F0 | 1351 | 1F00 | 1FAC | 0CC8 | 00C0 | 1010 | 0023 | 0457 | |
| 0FDA | TMS583 | 041A | 0CD4 | 00C0 | 1A40 | 0022 | 0CCC | 1014 | 0CC8 | 00C0 | 0000 | 1A08 | 0023 | 0CCC | 1A25 | 0CD2 | 0CC0 | 0CAC | |
| 0FEB | TMS583 | 0CD8 | 1F87 | 0CA4 | 04F8 | 0141 | 030A | 0008 | 1391 | 1FC4 | 01A0 | 0A63 | 0C53 | 03D3 | 0416 | 02F6 | 04FA | 0191 | |
| 0FFC | TMS583 | 0131 | 01D5 | 0800 | 1FFD | | | | | | | | | | | | | | |
| 1000 | TMS583 | 1F50 | 1F0C | 1F0E | 1F08 | 1F06 | 1F3C | 1F00 | 1F3E | 1F34 | 1F36 | 1F3A | 1F2C | 1F38 | 1F32 | 1F24 | | | |
| 1011 | TMS583 | 1F2E | 1F2C | 1F1C | 1F2A | 1F26 | 1F18 | 1F22 | 1F20 | 1F0C | 1F16 | 1F04 | 1F16 | 1D49 | 1F10 | 1F7C | | | |
| 1022 | TMS583 | 1FFE | 1FD4 | 1FF2 | 1FD6 | 1FD8 | 1FF4 | 1FD0 | 1FFE | 1FF2 | 1FF4 | 1FFA | 1FD4 | 1FF0 | 1FF2 | 1FD2 | 1FFE | 1FFC | |
| 1033 | TMS583 | 1F58 | 1FD2 | 1FE4 | 1FF2 | 1FC4 | 1FF0 | 1F0C | 1FC2 | 1FD4 | 1F46 | 1F94 | 0176 | 1F94 | 1FD4 | 1FF0 | 1FF2 | 1F4E | |
| 1044 | TMS583 | 1FD4 | 1FC0 | 1FD8 | 1FD4 | 1F0C | 1FFE | 1FFE | 1FD0 | 1FD8 | 1F9E | 1F94 | 1F4C | 1FC4 | 1F94 | 1FD0 | 1F4C | 1F42 | |
| 1055 | TMS583 | 1FF4 | 1FD6 | 1F4E | 1FC0 | 1F4E | 1FD2 | 1F96 | 1F44 | 1F7C | 1A71 | 1D4A | 1F42 | 1F78 | 1F92 | 1F9C | 1F32 | 1F9C | |
| 1066 | TMS583 | 1FA4 | 1FF6 | 1FC0 | 1F3E | 1FF4 | 1FD6 | 1F3A | 1F96 | 1F4A | 1FB2 | 1FF2 | 1FA4 | 1FA0 | 1FB6 | 1F76 | 1F70 | 1FD6 | |
| 1077 | TMS583 | 1E70 | 1F72 | 1F74 | 1FA2 | 1FA2 | 1FAA | 1F3C | 1A00 | 1A05 | 1F38 | 1FA0 | 1F6A | 1F50 | 1E50 | 1F4E | 1F54 | 1F4A | |
| 1088 | TMS583 | 1F4A | 1E50 | 1F22 | 1F30 | 1F4C | 1E7C | 1F3C | 1E32 | 1F9C | 1F4C | 1F38 | 1F3C | 1F00 | 1F2E | 1F30 | 1F0A | 1F06 | |
| 1099 | TMS583 | 1F5E | 1DFE | 1DFE | 1E22 | 1F20 | 0910 | 1F22 | 1E2C | 1F06 | 1F2A | 1F10 | 1F10 | 1DFE | 1E06 | 1DF0 | 1DF2 | 1DFE | |
| 10AA | TMS583 | 1F24 | 1DF4 | 1DFA | 1E22 | 1DF0 | 1DF2 | 1F50 | 1DFE | 1E02 | 1DFE | 1DCE | 1E06 | 1DF4 | 1DF0 | 1F20 | 1DF4 | 1DFE | |
| 10BB | TMS583 | 1DF0 | 1DFA | 1DF2 | 017E | 1AF0 | 1DF0 | 1D80 | 1D80 | 1D04 | 1DCE | 1DFA | 1DF4 | 1DF2 | 1DCE | 1DF8 | 1DFC | 1D9C | |
| 10CC | TMS583 | 1DFE | 1D94 | 1DC2 | 1D92 | 1DFA | 1D4E | 1DF2 | 1D90 | 1D9A | 1D92 | 1D9A | 1D42 | 1D4F | 1D4F | 1D4F | 1D94 | 1D4A | |
| 1DDD | TMS583 | 1D4A | 017E | 1F21 | 1D74 | 1D7A | 1D96 | 1D90 | 1D70 | 1D4E | 1D84 | 1D8A | 1D8A | 1D8A | 1D42 | 1D4A | 1D4E | 1D44 | |
| 1DEE | TMS583 | 1D7C | 1D72 | 1D94 | 1D4E | 1D82 | 1D52 | 1D7E | 1D4A | 1D80 | 1D42 | 1D60 | 1D9A | 1DBC | 1D54 | 1DC2 | 1D56 | 01D7 | |
| 1DFF | TMS583 | 1C59 | 1D38 | 1D5A | 1D4C | 1D50 | 1D50 | 1D50 | 1D4E | 1D5F | 1D5F | 1D7A | 1D4C | 1D54 | 1D4E | 1D4A | 1D38 | 1D32 | |
| 1110 | TMS583 | 1D64 | 1D2F | 1D4F | 1D30 | 1D30 | 1D4A | 1D4A | 1D3F | 1D2A | 1D32 | 1D00 | 1D1A | 1D44 | 1D16 | 0100 | 1F0A | 1D1A | |
| 1121 | TMS583 | 1D1A | 1D22 | 1D12 | 1D76 | 1D10 | 1D16 | 1D0A | 1D04 | 1CFF | 1D40 | 1CF4 | 1D1C | 1D6A | 1D2E | 1CF2 | 1D40 | 1CFF | |
| 1132 | TMS583 | 1CF2 | 1CF8 | 1D26 | 1D22 | 1CEC | 1CC6 | 1D28 | 1CC2 | 1CC4 | 1CE0 | 1CF2 | 1CE8 | 0447 | 1A04 | 0437 | 02F6 | 0A87 | |
| 1143 | TMS583 | 1F55 | 0A62 | 0A91 | 0497 | 02F4 | 0131 | 041F | 01D0 | 0E0A | 0131 | 040F | 0101 | 01D7 | 0051 | 1F00 | 0051 | 0131 | |
| 1154 | TMS583 | 041F | 01D0 | 1F15 | 01D2 | 0140 | 040A | 02F0 | 011A | 030A | 1A28 | 017F | 017E | 1A09 | 0000 | 1A00 | 040C | 011A | |
| 1165 | TMS583 | 1D94 | 041F | 0900 | 0509 | 1A55 | 0AF7 | 02F3 | 0111 | 041F | 0200 | 0009 | 1D04 | 0CD7 | 0509 | 0000 | 1FAA | 01D7 | |

TABLE IIb

| HEX ADDRESS | CHIP | INSTRUCTION WORDS→ | | | | | | | | | | | | | | | | | | | |
|---|---|---|---|---|---|---|---|---|---|---|---|---|---|---|---|---|---|---|---|---|---|
| 1170 | TMC583 | 0AF7 | 02F0 | 0AF3 | 0121 | 041F | 0100 | 0308 | 1030 | 041F | 010A | 0103 | 002C | 0320 | 0C00 | 0C00 | 0076 | 0308 | | | |
| 1187 | TMC583 | 1807 | 0C0A | 0C0A | 0076 | 0320 | 1809 | 0076 | 009A | 0AF3 | 0AF0 | 0A0F | 0131 | 0708 | 1FC4 | 0006 | 0AFD | 1045 | | | |
| 1198 | TMC583 | 0131 | 041F | 0100 | 0A0A | 0C08 | 0C0A | 0030 | 0C00 | 0C00 | 0030 | 0131 | 0A0F | 0101 | 0411 | 02F0 | 0058 | 0419 | | | |
| 1189 | TMC583 | 1755 | 1F08 | 1D40 | 0031 | 041F | 0239 | 017E | 0475 | 0455 | 0405 | 1174 | 0465 | 1972 | 00C8 | 1974 | 0001 | 00C4 | | | |
| 1194 | TMC583 | 1F03 | 1F57 | 0120 | 0A0A | 02F0 | 0103 | 0107 | 0509 | 0501 | 108B | 0008 | 02F4 | 0800 | 100A | 0008 | 00D8 | 0008 | | | |
| 11CB | TMC583 | 0C0A | 101A | 0D0A | 1059 | 0D0A | 1005 | 0D0A | 10FF | 0A00 | 0AF7 | 041A | 0A00 | 1909 | 0059 | 0414 | 02F0 | 0131 | | | |
| 11DC | TMC583 | 0A0F | 0121 | 0051 | 14C3 | 1F44 | 0105 | 041F | 0103 | 005B | 0053 | 0A0F | 0111 | 0099 | 0AF7 | 02F3 | 0111 | 0A0F | | | |
| 11E0 | TMC583 | 0008 | 0008 | 17A8 | 1F72 | 0100 | 0100 | 0100 | 0100 | 0100 | 0100 | 0100 | 0100 | 0100 | 0485 | 0910 | 1046 | 0207 | | | |
| 11FE | TMC583 | 0A47 | 02F0 | 0101 | 041F | 0103 | 0101 | 0A0F | 0121 | 0107 | 0C5A | 0C00 | 0308 | 100C | 0153 | 0153 | 0C00 | 0C00 | | | |
| 120F | TMC583 | 1800 | 0105 | 0080 | 172F | 0920 | 019C | 0153 | 0153 | 0190 | 0105 | 0000 | 0C0A | 0308 | 1805 | 0907 | 0146 | 0107 | | | |
| 1220 | TMC583 | 0158 | 0509 | 0108 | 153F | 0100 | 0427 | 00F3 | 0AF3 | 00AA | 0108 | 0508 | 0509 | 0453 | 0C53 | 1555 | 0080 | 0105 | | | |
| 1231 | TMC583 | 1FFA | 0140 | 0000 | 0C00 | 0308 | 1805 | 01AC | 01AC | 00A4 | 0102 | 0008 | 0158 | 1830 | 0100 | 1E05 | 0082 | 017F | | | |
| 1242 | TMC583 | 100F | 0002 | 0000 | 1004 | 0CD2 | 0210 | 0173 | 1808 | 0303 | 0A08 | 0410 | 0CD2 | 15FF | 0219 | 0105 | 1347 | 0102 | | | |
| 1253 | TMC583 | 0A47 | 02F0 | 0219 | 1004 | 0203 | 0000 | 0004 | 02AA | 00F3 | 1F09 | 0000 | 0AB7 | 0AF0 | 0600 | 0C00 | 0C07 | 1EA9 | | | |
| 1264 | TMC583 | 0000 | 0082 | 1491 | 0105 | 0A47 | 02F0 | 0101 | 041F | 0104 | 1045 | 00CA | 00CA | 1094 | 0239 | 1004 | 0000 | 0091 | | | |
| 1275 | TMC583 | 0052 | 100E | 1F80 | 1H50 | 0000 | 0308 | 1012 | 0708 | 1807 | 0908 | 0308 | 1805 | 0000 | 16C4 | 1F0F | 0208 | 1B0F | | | |
| 1286 | TMC583 | 0A07 | 02F0 | 0000 | 100C | 0101 | 041F | 0000 | 00AC | 00AC | 0023 | 0000 | 0437 | 02F4 | 00AC | 041A | 041E | 032C | | | |
| 1297 | TMC583 | 1800 | 0300 | 0700 | 010C | 0153 | 043E | 040C | 040A | 02F0 | 0160 | 040F | 040C | 040A | 02F0 | 0160 | 1017 | 0308 | | | |
| 12A8 | TMC583 | 1004 | 0123 | 1823 | 0980 | 0163 | 0153 | 0000 | 1000 | 0437 | 02F0 | 0040 | 041A | 041F | 0308 | 1800 | 0105 | 0107 | | | |
| 12B9 | TMC583 | 1FFA | 1F67 | 1A5A | 0175 | 0082 | 0040 | 1801 | 0000 | 1347 | 040C | 070F | 0C1A | 0431 | 041A | 0000 | 0A7E | 0AAA | | | |
| 12CA | TMC583 | 1000 | 061A | 0408 | 0408 | 0040 | 13F3 | 0700 | 0300 | 040C | 0631 | 041A | 0400 | 0C7F | 0AAA | 0308 | 1B0F | 0700 | | | |
| 12DB | TMC583 | 1074 | 0408 | 0408 | 0427 | 02F0 | 181D | 0107 | 0437 | 02F0 | 015H | 042E | 040C | 040A | 00F3 | 0308 | 1800 | 040F | | | |
| 12EC | TMC583 | 040C | 0437 | 02F0 | 040C | 041F | 041E | 041F | 041E | 043F | 040C | 040A | 00F6 | 040E | 040C | 0400 | 0AF4 | 0476 | | | |
| 12FD | TMC583 | 0174 | 0211 | 041A | 0158 | 041F | 0308 | 1808 | 00HE | 1004 | 0030 | 1224 | 000B | 00D8 | 1184 | 0407 | 02F0 | 0101 | | | |
| 130E | TMC583 | 041F | 010A | 0004 | 0101 | 0A0F | 0131 | 1800 | 0AAA | 0000 | 0114 | 10F0 | 13F7 | 0120 | 0107 | 0050 | 1AAA | 041F | | | |
| 131F | TMC583 | 0100 | 0407 | 02F0 | 0AF0 | 0008 | 032C | 1805 | 0000 | 072C | 1805 | 0A0F | 0101 | 0A47 | 02F0 | 0101 | 041F | 010D | | | |
| 1330 | TMC583 | 00H0 | 16ED | 1AF7 | 1F4E | 010D | 032A | 0101 | 0A0F | 0111 | 0008 | 0008 | 1A93 | 0AF7 | 01F0 | 0101 | 0A0F | 0111 | | | |
| 1341 | TMC583 | 0089 | 041F | 0203 | 0A0F | 0111 | 0A97 | 01F4 | 0121 | 041F | 01F0 | 0A00 | 0A0B | 0121 | 0A0F | 0101 | 0308 | 0080 | | | |
| 1352 | TMC583 | 1AC1 | 0A47 | 01F4 | 0C0C | 0529 | 01DE | 1AD7 | 0C40 | 0427 | 00F6 | 0AF4 | 00AC | 0C0C | 052C | 054F | 0476 | 0C7A | | | |
| 1363 | TMC583 | 1AF0 | 0101 | 041F | 0000 | 00AA | 00AB | 0003 | 0000 | 0437 | 02F0 | 0AF0 | 00AA | 041A | 041E | 0308 | 1800 | 05D0 | | | |
| 1374 | TMC583 | 0300 | 0033 | 010F | 043F | 040C | 040A | 02F4 | 0176 | 040F | 040C | 040A | 02F4 | 0176 | 1015 | 0176 | 0176 | 0500 | | | |
| 1385 | TMC583 | 1823 | 0010 | 00AB | 041A | 041F | 0708 | 1800 | 0CD2 | 0000 | 1950 | 0003 | 043E | 040C | 040A | 0AF4 | 040F | 040C | | | |
| 1396 | TMC583 | 0108 | 02F4 | 1083 | 0000 | 0000 | 0000 | 0000 | 0000 | 0000 | 0000 | 0000 | 0000 | 0000 | 0000 | 0000 | 0000 | 0000 | | | |
| 13A7 | TMC583 | 0000 | 00D0 | 1820 | 1802 | 0000 | 0000 | 0000 | 0000 | 0000 | 0000 | 0000 | 0000 | 0000 | 0000 | 0000 | 0000 | 0000 | | | |
| 13B8 | TMC583 | 0000 | 0000 | 0085 | 0000 | 0068 | 1920 | 0000 | 0000 | 0000 | 0000 | 0000 | 0000 | 0000 | 0000 | 0000 | 0000 | 0000 | | | |
| 13C9 | TMC583 | 0000 | 0000 | 0000 | 0000 | 0095 | 1825 | 00C9 | 0320 | 0105 | 0101 | 041F | 010D | 0F20 | 0105 | 1080 | 0457 | 041A | | | |
| 13DA | TMC583 | 0000 | 0000 | 0000 | 0000 | 0000 | 0000 | 0000 | 0000 | 0000 | 0000 | 0085 | 1831 | 0070 | 0072 | 1003 | 0000 | 0002 | | | |
| 13EB | TMC583 | 150B | 041F | 0100 | 0108 | 0108 | 00AB | 0058 | 0058 | 0053 | 0053 | 0053 | 0088 | 0103 | 0000 | 0003 | 0000 | 0000 | | | |
| 13FC | TMC583 | 0000 | 0153 | 0176 | 0006 | | | | | | | | | | | | | | | | |

TABLE IIc

| HEX ADDRESS | CHIP | INSTRUCTION WORDS→ | | | | | | | | | | | | | | | | | | | |
|---|---|---|---|---|---|---|---|---|---|---|---|---|---|---|---|---|---|---|---|---|---|
| 1000 | TMC571 | 0000 | 103C | 041F | 0000 | 0C0B | 0C0B | 1B3B | 0000 | 0AEB | 1032 | 0A57 | 01F3 | 0A47 | 00F3 | 0076 | 0170 | 0100 | | | |
| 1011 | TMC571 | 0153 | 0153 | 0153 | 0153 | 0153 | 0000 | 00CB | 1775 | 0000 | 0015 | 0000 | 0000 | 0004 | 14C0 | 0000 | 0AED | 1045 | | | |
| 1022 | TMC571 | 0410 | 00EB | 1835 | 0408 | 0408 | 1005 | 0AAB | 040C | 0133 | 0040 | 100C | 0478 | 0040 | 16F3 | 0008 | 12C3 | 0105 | | | |
| 1033 | TMC571 | 01AC | 0620 | 041A | 0475 | 1800 | 00C5 | 0465 | 1800 | 0085 | 0455 | 1800 | 0045 | 0405 | 040C | 1800 | 0427 | 06F0 | | | |
| 1044 | TMC571 | 0005 | 0005 | 0437 | 00F4 | 0223 | 0298 | 1800 | 0720 | 0200 | 1800 | 0720 | 0D2C | 1026 | 0A20 | 041A | 0455 | 0000 | | | |
| 1055 | TMC571 | 1800 | 0005 | 0445 | 0080 | 1800 | 0045 | 0220 | 041A | 0320 | 1800 | 0720 | 0407 | 0015 | 041A | 0114 | 0105 | 0000 | | | |
| 1066 | TMC571 | 0000 | 1335 | 0080 | 1830 | 040C | 0005 | 0045 | 0AAA | 1H01 | 0A47 | 02F0 | 0101 | 040F | 0131 | 0408 | 02F0 | 0431 | | | |
| 1077 | TMC571 | 0CF4 | 0308 | 1300 | 0176 | 0176 | 1809 | 0417 | 041A | 041F | 040C | 041F | 041F | 041F | 0000 | 040F | 040C | 0408 | | | |
| 1088 | TMC571 | 02F3 | 0219 | 1403 | 0497 | 01F0 | 0C07 | 0101 | 041F | 0000 | 0C0B | 0C0B | 0000 | 0C03 | 0C00 | 0437 | 02F0 | 0C0B | | | |
| 1099 | TMC571 | 0419 | 041F | 0308 | 1800 | 0700 | 0300 | 0133 | 010E | 0153 | 043F | 040C | 040A | 02F4 | 0176 | 040F | 040C | 0400 | | | |
| 10AA | TMC571 | 02F4 | 0176 | 0308 | 1810 | 0700 | 1823 | 0176 | 0170 | 0008 | 01D2 | 0323 | 0111 | 041F | 010A | 0437 | 02F0 | 0008 | | | |
| 10BB | TMC571 | 041A | 041F | 0175 | 0308 | 1800 | 0930 | 0080 | 0008 | 0080 | 0080 | 0083 | 1AHH | 01D2 | 0008 | 0008 | 16C3 | 0447 | | | |
| 10CC | TMC571 | 02F0 | 0101 | 0A0F | 0121 | 0477 | 02F0 | 0AF0 | 010C | 0160 | 043E | 040C | 040A | 02F4 | 0176 | 040F | 040C | 0408 | | | |
| 10DD | TMC571 | 02F4 | 0008 | 1144 | 0308 | 1814 | 0176 | 0C4C | 02F4 | 0176 | 01AC | 02F4 | 0708 | 1800 | 0107 | 0004 | 0148 | 0108 | | | |
| 10EE | TMC571 | 1008 | 0100 | 0100 | 0100 | 0100 | 0100 | 0100 | 0100 | 0100 | 0100 | 0100 | 0708 | 1004 | 0009 | 0427 | 041A | 041F | | | |
| 10FF | TMC571 | 040C | 041F | 041E | 041F | 0008 | 0504 | 0A0F | 0131 | 0105 | 010C | 0108 | 0308 | 043F | 040C | 0408 | 02F3 | 0153 | | | |
| 1110 | TMC571 | 0A0F | 040C | 0408 | 02F3 | 0153 | 1015 | 0153 | 0153 | 0000 | 1004 | 0020 | 1825 | 0437 | 02F0 | 0008 | 041A | 041F | | | |
| 1121 | TMC571 | 0308 | 1800 | 0105 | 0121 | 041F | 0103 | 02F0 | 0308 | 0703 | 1F29 | 0400 | 040C | 0303 | 0A07 | 02F4 | 0131 | 041F | | | |
| 1132 | TMC571 | 0104 | 0A7F | 0050 | 1050 | 0400 | 0000 | 1555 | 0410 | 00EH | 1DFB | 0040 | 1A2C | 041F | 0006 | 02F4 | 0239 | 0450 | | | |
| 1143 | TMC571 | 1012 | 0105 | 0F2C | 0F2C | 0105 | 19HE | 0400 | 0HFH | 11H8 | 0A9H | 0408 | 1005 | 0H0A | 040D | 0A7A | 1948 | 0A50 | | | |
| 1154 | TMC571 | 1411 | 1A2F | 00FB | 00F4 | 0A10 | 0323 | 0111 | 041F | 010B | 10A2 | 0C0B | 0009 | 1000 | 0000 | 0C0B | 0020 | 0C0B | | | |
| 1165 | TMC571 | 0C0B | 0C0B | 0A0B | 1500 | 02F4 | 0004 | 041F | 0000 | 0C0B | 0C0B | 0C0B | 0C0B | 0C0B | 0A50 | 1000 | 0000 | 0C53 | | | |
| 1176 | TMC571 | 0A07 | 0010 | 1800 | 0A47 | 02F0 | 0C53 | 0294 | 0053 | 0054 | 0C74 | 0C74 | 0070 | 0020 | 0111 | 0A0F | 0131 | 0A97 | | | |
| 1187 | TMC571 | 02F3 | 0111 | 041F | 0CD4 | 0111 | 0A0F | 0131 | 0020 | 010C | 010C | 010C | 094C | 010F | 0170 | 017F | 0A0C | 0024 | | | |
| 1198 | TMC571 | 0004 | 0004 | 0040 | 0040 | 0020 | 1800 | 0000 | 0720 | 0C40 | 1000 | 0F2C | 094C | 0C00 | 0C40 | 0427 | 02F0 | 0022 | | | |
| 11A9 | TMC571 | 0054 | 0032 | 1FE1 | 0107 | 0920 | 0008 | 015H | 0140 | 0140 | 0190 | 1F37 | 0051 | 0308 | 1180 | 0140 | 0140 | 1808 | | | |
| 11BA | TMC571 | 0107 | 0477 | 0004 | 041F | 0003 | 0001 | 0000 | 0H04 | 0000 | 0105 | 0000 | 100A | 0008 | 0020 | 0704 | 0956 | 0940 | | | |
| 11CB | TMC571 | 0008 | 1807 | 0002 | 0720 | 0008 | 041A | 041F | 0100 | 0105 | 100F | 0455 | 1B0F | 0000 | 1F91 | 03HP | 1B0C | 0445 | | | |
| 11DC | TMC571 | 1004 | 0008 | 1440 | 0940 | 0104 | 1D0F | 0000 | 1934 | 040B | 040B | 1005 | 0A0A | 0004 | 040C | 0931 | 041A | 0400 | | | |
| 11EB | TMC571 | 0071 | 0A0A | 0939 | 100F | 0070 | 0002 | 140C | 0407 | 0005 | 041A | 0A0 | 0041 | 0A0A | 1FFF | 01D2 | 01HA | 0102 | | | |
| 11FE | TMC571 | 0108 | 017E | 017F | 017F | 00DE | 017F | 0400 | 02F0 | 0308 | 1540 | 0176 | 0176 | 1B00 | 0105 | 0430 | 1B30 | 1741 | | | |
| 1A0F | TMC571 | 0105 | 0F20 | 1000 | 0408 | 0408 | 1005 | 0A08 | 041F | 0003 | 0700 | 040C | 0411 | 041A | 0408 | 0A58 | 0A68 | 072C | | | |
| 1A20 | TMC571 | 100F | 0400 | 041A | 0400 | 0105 | 0408 | 0408 | 0106 | 0009 | 1810 | 040C | 0407 | 041A | 0009 | 0095 | 0AAA | 1B00 | | | |
| 1A31 | TMC571 | 0408 | 040C | 00F8 | 007A | 1004 | 0709 | 1B0A | 0478 | 1B14 | 0219 | 0408 | 041A | 0400 | 0001 | 0A4A | 1B00 | 0030 | | | |
| 1A42 | TMC571 | 040C | 1B00 | 0005 | 0A4A | 0130 | 0308 | 040C | 1B04 | 0095 | 0200 | 0A6H | 040C | 0000 | 1A06 | 0210 | 1F2F | 0948 | | | |
| 1A53 | TMC571 | 041A | 0400 | 0219 | 0A4A | 1021 | 0CHA | 1B29 | 0103 | 0107 | 0901 | 02F4 | 041A | 0475 | 1000 | 0410 | 00EA | 1B3A | | | |
| 1A64 | TMC571 | 0400 | 0475 | 1B0C | 0419 | 0030 | 0020 | 1111 | 0467 | 00F0 | 0400 | 0B0A | 1118 | 040C | 0005 | 0075 | 0045 | 0A9A | | | |
| 1A75 | TMC571 | 0408 | 1005 | 0A0A | 0008 | 1006 | 0A08 | 1H07 | 0A4A | 0A4A | 0110 | 1949 | 0107 | 0445 | 0407 | 02F3 | 0111 | 041F | | | |
| 1A86 | TMC571 | 0103 | 0A6A | 0A50 | 1347 | 0440 | 00F0 | 1005 | 040A | 11AC | 0419 | 1B06 | 0031 | 0C0B | 0C0B | 0407 | 0A63 | 0A02 | | | |
| 1A97 | TMC571 | 0008 | 0A49 | 1222 | 0419 | 0A9B | 0A9H | 020C | 0A05 | 0449 | 100C | 03H4 | 0D8A | 1006 | 0030 | 1204 | 009C | 0032 | | | |
| 1AA8 | TMC571 | 0414 | 0619 | 19EA | 072C | 0A2A | 0A4B | 0448 | 0140 | 0214 | 0126 | 0440 | 0AFD | 11C4 | 0400 | 0408 | 100H | 0401 | | | |
| 1AB9 | TMC571 | 00B8 | 1B0A | 0A5H | 1B08 | 0AEB | 0440 | 00FD | 11H2 | 040H | 1009 | 0A37 | 0060 | 0000 | 0008 | 0200 | 0A27 | 0AFD | | | |
| 1AC4 | TMC571 | 00HH | 100F | 0A5B | 0A2B | 040C | 010E | 0408 | 02F4 | 02H0 | 0A5H | 0A2B | 040C | 0C7F | 0A00 | 0A5H | 00EA | 02F3 | 0200 | | |
| 1AD8 | TMC571 | 1002 | 0708 | 1B15 | 0419 | 1904 | 0148 | 0119 | 1B0F | 0020 | 1B04 | 0485 | 1B2E | 0130 | 040C | 0000 | 0440 | 0AFD | | | |
| 1AEC | TMC571 | 1010 | 0400 | 040B | 100F | 0A5A | 0408 | 0AC5 | 1H07 | 0008 | 11H4 | 1B90 | 0020 | 1B08 | 0085 | 0AEA | 0A3B | 1B10 | | | |

TABLE IIc

| HEX ADDRESS | CHIP | INSTRUCTION WORDS+ | | | | | | | | | | | | | | | | | | | |
|---|---|---|---|---|---|---|---|---|---|---|---|---|---|---|---|---|---|---|---|---|---|
| 1AF0 | TMC571 | 0F24 | 0306 | 1808 | 0A77 | 0A10 | 0C76 | 0C4A | 0A2A | 0141 | 0113 | 0C7E | 095E | 097E | 097E | 097F | 097F | 097F | 097E | | |
| 1B0F | TMC571 | 097F | 097F | 097F | 097F | 097E | 0153 | 0153 | 0A0C | 0931 | 0A1A | 02F3 | 0445 | 1808 | 0085 | 0455 | 1808 | 0095 | | | |
| 1B1F | TMC571 | 0A45 | 1808 | 0045 | 0A75 | 1809 | 0045 | 0280 | 097F | 0931 | 0A1A | 02F3 | 0280 | 1002 | 0A0A | 0A3A | 0708 | 1808 | | | |
| 1B30 | TMC571 | 0C4C | 0724 | 0008 | 1807 | 0A0C | 0201 | 0A1A | 0A2A | 0A3A | 0A2A | 0A3A | 0A2A | 0107 | 0C4A | 0C03 | 0C40 | 0C40 | | | |
| 1B41 | TMC571 | 0C40 | 0A08 | 0C00 | 0A04 | 1002 | 0004 | 0084 | 0091 | 020B | 0008 | 1845 | 0004 | 0A1F | 0008 | 0529 | 1346 | 1F87 | | | |
| 1B52 | TMC571 | 0280 | 0231 | 1002 | 0A1A | 0A2A | 0A3A | 0172 | 0708 | 1611 | 0A0C | 0105 | 0206 | 0C76 | 0A0E | 010C | 0107 | 0130 | | | |
| 1B63 | TMC571 | 0107 | 0A77 | 0A20 | 0048 | 1F61 | 0A5A | 0A2A | 0A0C | 0153 | 0A08 | 02F3 | 0A07 | 0A1A | 0A85 | 1808 | 0045 | 0A95 | | | |
| 1B74 | TMC571 | 1808 | 0055 | 0A45 | 1808 | 0045 | 0A45 | 1808 | 0075 | 0280 | 0153 | 0A08 | 02F3 | 0280 | 1002 | 0708 | 1837 | 0C40 | | | |
| 1B85 | TMC571 | 0A28 | 0141 | 0111 | 0C4C | 0A5A | 0A2A | 0A0C | 0724 | 0008 | 0A77 | 0A20 | 1848 | 0A08 | 02F3 | 0280 | 0210 | 0A08 | | | |
| 1B96 | TMC571 | 1808 | 0A08 | 0080 | 0A02 | 0908 | 0C40 | 0C40 | 1803 | 0080 | 1816 | 070C | 1918 | 0140 | 0246 | 0230 | 1170 | 0A85 | | | |
| 1BA7 | TMC571 | 1853 | 0031 | 1857 | 0040 | 1807 | 0508 | 0A1A | 0A07 | 0260 | 1012 | 0A65 | 101F | 0246 | 0131 | 0A0F | 0111 | 0107 | | | |
| 1BB8 | TMC571 | 1C18 | 0A0C | 0300 | 0101 | 0A05 | 0A08 | 0A45 | 1809 | 1013 | 0A98 | 0A08 | 1005 | 0A88 | 0A05 | 1808 | 0011 | 0A87 | | | |
| 1BC9 | TMC571 | 0250 | 0101 | 0A1F | 0900 | 0A07 | 0A50 | 0010 | 1808 | 0708 | 0A0C | 0908 | 0A6A | 0908 | 0A1A | 0455 | 1808 | 0085 | | | |
| 1BDA | TMC571 | 0A45 | 1808 | 0095 | 0A05 | 0A3A | 0A1A | 1808 | 0075 | 0A08 | 0708 | 1825 | 0010 | 0051 | 0102 | 1383 | 0102 | 0308 | | | |
| 1BEB | TMC571 | 0280 | 1845 | 0A08 | 1A6F | 0090 | 1CC5 | 0030 | 1940 | 0A07 | 02F3 | 0111 | 0A1F | 0106 | 0C76 | 0506 | 0C7E | 0111 | | | |
| 1BFC | TMC571 | 0A0F | 0131 | 0021 | 1907 | | | | | | | | | | | | | | | | |

TABLE III

| PROGRAM CODE | FUNCTION | KEY(s) |
|---|---|---|
| 00 | 0 | 0 |
| 01 | 1 | 1 |
| 02 | 2 | 2 |
| 03 | 3 | 3 |
| 04 | 4 | 4 |
| 05 | 5 | 5 |
| 06 | 6 | 6 |
| 07 | 7 | 7 |
| 08 | 8 | 8 |
| 09 | 9 | 9 |
| 10 | $E^1$ | 2nd, E |
| 11 | A | A |
| 12 | B | B |
| 13 | C | C |
| 14 | D | D |
| 15 | E | E |
| 16 | $A^1$ | 2nd, A |
| 17 | $B^1$ | 2nd, B |
| 18 | $C^1$ | 2nd, C |
| 19 | $D^1$ | 2nd, D |
| 20 | Clear | 2ND, CLR |
| 21 | 2nd | 2nd |
| 22 | Inverse Function | INV |
| 23 | LNX | LNX |
| 24 | Clear Entry | CE |
| 25 | Clear | CLR |
| 26 | 2nd | 2nd, 2nd |
| 27 | Inverse Function | 2nd, INV |
| 28 | log | 2nd, log |
| 29 | Clear Program | 2nd, CP |
| 30 | Tangent | 2nd, TAN |
| 31 | Learn | LRN |
| 32 | Exchange display and T register | $X \rightleftarrows T$ |
| 33 | $X^2$ | $X^2$ |
| 34 | $\sqrt{X}$ | $\sqrt{X}$ |
| 35 | 1/X | 1/X |
| 36 | Program Page | 2nd, PGM |
| 37 | Polar to Rectangular | 2nd, $P \rightarrow R$ |
| 38 | Sine | 2nd, Sin |
| 39 | Cosine | 2nd, COS |
| 40 | Indirect Addressing | 2nd, IND |
| 41 | Single Step | SST |
| 42 | Store in Memory # | STO |
| 43 | Recall from Memory # | RCL |
| 44 | Sum into Memory # | SUM |
| 45 | $Y^X$ | $Y^X$ |
| 46 | Insert Program Code | 2nd, INS |
| 47 | Clear Memories | 2nd, CMs |
| 48 | Exchange Display and Memory # | 2nd, EXC |
| 49 | Multiply Display into Memory # | 2nd, prod |
| 50 | Absolute Value | 2nd, \|x\| |
| 51 | Back Step | BST |
| 52 | Exponent Entry | EE |
| 53 | ( | ( |

TABLE III-continued

| PROGRAM CODE | FUNCTION | KEY(s) |
|---|---|---|
| 54 | ) | ) |
| 55 | ÷ | ÷ |
| 56 | Delete Program Code | 2nd, DEL |
| 57 | Engineering Notation | 2nd, ENG |
| 58 | Fixed Point Notation | 2nd, FIX |
| 59 | Integer | 2nd, INT |
| 60 | Degree | 2nd, DEG |
| 61 | Go To | GTO |
| 62 | Indirect Program Page # | 2ND, PGM 2ND, IND |
| 63 | Exchange Indirect Memory # with display | 2ND, EXC 2ND, IND |
| 64 | Multiply Display Into Indirect Memory # | 2ND, PROD 2ND, IND |
| 65 | Multiply | X |
| 66 | Pause | 2nd, PAUSE |
| 67 | Go To # if x = t | 2nd, x = t |
| 68 | No Operation | 2nd, NOP |
| 69 | Operation Code # | 2nd, OP |
| 70 | Radians | 2nd, RAD |
| 71 | Subroutine Call | SBR |
| 72 | Store in Indirect Memory # | STO, 2ND, IND |
| 73 | Recall Indirect Memory # | RCL, 2ND IND |
| 74 | Add Display into Indirect Memory # | SUM, 2ND IND |
| 75 | Minus | − |
| 76 | Lable Key | 2nd, LBL |
| 77 | Go To # if $x \geqq t$ | 2nd, $x \geqq t$ |
| 78 | Insert Data Point | 2nd, $\Sigma+$ |
| 79 | Mean | 2nd, $\bar{X}$ |
| 80 | Grad | GRD |
| 81 | Reset | RST |
| 82 | Hierarchy Address | Not directly accessible |
| 83 | Go to Indirect Address | GTO, 2ND IND |
| 84 | Operation Code Indirect # | 2ND, OP 2ND, IND |
| 85 | Plus | + |
| 86 | Set Flag # | 2nd, ST FLG |
| 87 | If Flag # Set, Go To # | 2nd, IF FLG |
| 88 | Degrees, Minutes, Seconds | 2nd, DMS |
| 89 | $\pi$ | 2nd, $\pi$ |
| 90 | List Program | 2nd, LIST |
| 91 | Run/Stop | R/S |
| 92 | Return | INV, SBR |
| 93 | Decimal Point | . |
| 94 | Change Sign | +/− |
| 95 | Equals | = |
| 96 | Write | 2nd, Write |
| 97 | Decrement Register # and Go To # when zero | 2nd, DSZ |
| 98 | Advance Paper | 2nd, PAP |
| 99 | Print | 2nd, PRT |

TABLE IV

| Program codes following an heirarchy address code (82) | |
|---|---|
| FIRST DIGIT | FUNCTION |
| 0 | store |
| 1 | recall |
| 2 | conditional return (second digit is ignored) |
| 3 | sum into |
| 4 | multiply into |
| 5 | subtract from |
| 6 | divide into |
| 7 | " |
| 8 | " |
| 9 | " |
| SECOND DIGIT | HEIRARCHY REGISTER |
| 0 | no operation |
| 1 | 1 |
| 2 | 2 |
| 3 | 3 |
| 4 | 4 |
| 5 | 5 |
| 6 | 6 |
| 7 | 7 |
| 8 | 8 |
| 9 | no operation |

TABLE V

| Codes Following OP Code (69) | |
|---|---|
| CODE | MEANING |
| | Initialize for alphanumeric printing |
| 01 | Fill far left quarter of print buffer |
| 02 | Fill next to left quarter of print buffer |
| 03 | Fill next to right quarter of print buffer |
| 04 | Fill far right quarter of print buffer |
| 05 | Print the buffer as filled with OPS 01–04 |
| 06 | Print display plus contents of OP 04 |
| 07 | Plot asterisk in column number contained in display register (0–19) |
| 08 | List labels |
| 09 | Download page |
| 10 | Signum |
| 11 | Variance |
| 12 | Slope, intercept |
| 13 | Correlation |
| 14 | y' |
| 15 | x' |
| 16 | See current partition RAM |
| 17 | Repartition RAM |
| 18 | If not error - Set flag 7 |
| 19 | If error - Set flag 7 |
| 20 | |
| ' | Increment memory 0–9 |
| ' | |
| 29 | |
| 30 | |
| ' | Decrement memory 0–9 |
| ' | |
| 39 | |

TABLE VI

```
SCOMP 1,STOF=0A0F,RCLF=081F,REG=LO,DIGITS=USFD
ADDRESS CONSTANT=1,2,3,5,6,7,8
CONSTANT  0=230258509290000C
CONSTANT  1=0A9318719559905
CONSTANT  2=009531017900A325
CONSTANT  3=0009950330853168
CONSTANT  4=0000099500333084
CONSTANT  5=0000000999500333
CONSTANT  6=0000000999995000
CONSTANT  7=0000000999999500
CONSTANT  8=0078539816330795C
CONSTANT  9=0099A6A65209120C
CONSTANT  10=0009999966AAA6A670
CONSTANT  11=0000999999966AAA7
CONSTANT  12=0000009999999966A7
CONSTANT  13=157079A326795C1F
CONSTANT  14=3181592A53590000C
CONSTANT  15=572957795130801F
CONSTANT  16=3750833530882
CONSTANT  17=50038355018385C4
CONSTANT  18=3308375058353355
CONSTANT  19=2053535058038355
CONSTANT  20=0183590008332C5
CONSTANT  21=5320825003035554
CONSTANT  22=3255581882585853
CONSTANT  23=5188265325392584
CONSTANT  24=3550883530250312
CONSTANT  25=3550183533250803
CONSTANT  26=5985333208250C3
CONSTANT  27=3332500303550243
CONSTANT  28=3035505385985853
CONSTANT  29=7505035353023254
CONSTANT  30=5558030355330003
CONSTANT  31=0882500175038353
```

CONSTANTS

PROGRAM CODES

```
SCOMP 2,STOF=0A0F,RCLF=081F,REG=NI,DIGITS=UNUSFD
ADDRESS CONSTANT=1,2,3,5,6,7,8
CONSTANT  32=750203535332354C
CONSTANT  33=555003435535018C
CONSTANT  34=035353023854188C
CONSTANT  35=55018365008375C4
CONSTANT  36=503535355583383
CONSTANT  37=5003035533008375
CONSTANT  38=3301037502835365
CONSTANT  39=0254385050038355
CONSTANT  40=3202833308P20108
CONSTANT  41=0833078248820008
CONSTANT  42=0100203A02A10105
CONSTANT  43=2252020083308882
CONSTANT  44=0833078208820008
CONSTANT  45=378203008018588
CONSTANT  46=0332178206001882
CONSTANT  47=3285330882539285
CONSTANT  48=535332585033782
CONSTANT  49=5302255055517882
CONSTANT  50=2250178255188253
CONSTANT  51=3008825392285030
CONSTANT  52=0253325008782365
CONSTANT  53=5302501782653818
CONSTANT  54=0008A5590882553
CONSTANT  55=0165502218825585
CONSTANT  56=0554590882500000
CONSTANT  57=0550221882850693
CONSTANT  58=0253530250060355
CONSTANT  59=0550221882850908
CONSTANT  60=0500000018550A93
CONSTANT  61=1882855053308882
CONSTANT  62=0355500A03355022
CONSTANT  63=0000000A0250C100
```

PROGRAM CODES

TABLE VIa

| LOCATIONS | ROUTINE |
|---|---|
| 16-0-21-6 | m,b |
| 21-7-23-1 | $X^1$ |
| 23-2-24-2 | $Y^1$ |
| 24-3-26-3 | mean |
| 26-4-29-2 | variance |
| 29-3-34-4 | standard deviation |
| 34-5-39-7 | correlation coefficient(R) |
| 40-0-42-3 | Σ+ |
| 42-4-47-1 | Σ− |
| 47-2-51-2 | R → P |
| 51-3-53-6 | P → R |
| 53-7-58-4 | D.MS (degrees, decimal point, minutes and seconds) |
| 58-5-63-3 | D.d (degrees, decimal point, fractional degree) |

TABLE VII

| ALPHANUMERIC CHARACTER | ALPHANUMERIC CODE |
|---|---|
| A | 13 |
| B | 14 |
| C | 15 |
| D | 16 |
| E | 17 |
| F | 21 |
| G | 22 |
| H | 23 |
| I | 24 |
| J | 25 |
| K | 26 |
| L | 27 |
| M | 30 |
| N | 31 |
| O | 32 |
| P | 33 |
| Q | 34 |
| R | 35 |
| S | 36 |
| T | 37 |
| U | 41 |
| V | 42 |

TABLE VII-continued

| ALPHANUMERIC CHARACTER | ALPHANUMERIC CODE |
|---|---|
| W | 43 |
| X | 44 |
| Y | 45 |
| Z | 46 |
| 0 | 01 |
| 1 | 02 |
| 2 | 03 |
| 3 | 04 |
| 4 | 05 |
| 5 | 06 |
| 6 | 07 |
| 7 | 10 |
| 8 | 11 |
| 9 | 12 |
| blank | 00 |
| − | 20 |
| . | 40 |
| + | 47 |
| x | 50 |
| * | 51 |
| √ | 52 |
| π | 53 |
| e | 54 |
| ( | 55 |
| ) | 56 |
| ' | 57 |
| ↑ | 60 |
| % | 61 |
| > | |
| < | 62 |
| / | 63 |
| = | 64 |
| , | 65 |
| × | 66 |
| x̄ | 67 |
| 2 | 70 |
| ? | 71 |
| ÷ | 72 |
| ! | 73 |
| ][ | 74 |
| Δ | 75 |
| Π | 76 |
| Σ | 77 |

TABLE VIII

| BCD ADDRESS | CHIP | PROGRAM CODES→ | | | | | | | | | | | | | | | | | |
|---|---|---|---|---|---|---|---|---|---|---|---|---|---|---|---|---|---|---|---|
| 0 | TMC501 | 25 | 00 | 00 | 50 | 02 | 03 | 11 | 01 | 10 | 15 | 15 | 02 | 17 | 01 | 10 | 51 | 20 |
| 17 | TMC501 | 29 | 21 | 73 | 22 | 91 | 20 | 10 | 26 | 00 | 27 | 60 | 29 | 52 | 30 | 95 | 32 | 31 |
| 38 | TMC501 | 33 | 63 | 30 | 00 | 36 | 51 | 02 | 00 | 00 | 31 | 05 | 26 | 06 | 20 | 06 | 72 | 07 |
| 51 | TMC501 | 00 | 00 | 02 | 76 | 20 | 00 | 02 | 00 | 00 | 58 | 00 | 76 | 25 | 20 | 00 | 02 | 01 |
| 68 | TMC501 | 00 | 72 | 01 | 07 | 01 | 00 | 15 | 02 | 76 | 05 | 71 | 20 | 05 | 32 | 03 | 00 | 37 |
| 85 | TMC501 | 70 | 22 | 37 | 70 | 60 | 12 | 00 | 70 | 60 | 11 | 22 | 00 | 22 | 70 | 60 | 10 | 55 |
| 102 | TMC501 | 20 | 75 | 36 | 15 | 71 | 00 | 50 | 52 | 22 | 52 | 32 | 03 | 07 | 07 | 03 | 02 | 05 |
| 119 | TMC501 | 00 | 00 | 00 | 05 | 00 | 07 | 06 | 00 | 35 | 76 | 06 | 00 | 00 | 01 | 03 | 03 | 06 |
| 136 | TMC501 | 03 | 07 | 01 | 07 | 03 | 05 | 69 | 00 | 03 | 00 | 60 | 03 | 60 | 05 | 01 | 00 | 02 |
| 153 | TMC501 | 76 | 11 | 00 | 00 | 62 | 00 | 11 | 00 | 02 | 76 | 12 | 00 | 00 | 62 | 00 | 12 | 00 |
| 170 | TMC501 | 02 | 76 | 13 | 00 | 00 | 62 | 00 | 13 | 00 | 02 | 76 | 14 | 00 | 00 | 62 | 00 | 14 |
| 187 | TMC501 | 00 | 02 | 76 | 15 | 00 | 00 | 62 | 00 | 15 | 00 | 02 | 76 | 16 | 00 | 00 | 62 | 00 |
| 204 | TMC501 | 16 | 00 | 02 | 76 | 17 | 00 | 00 | 62 | 00 | 17 | 00 | 02 | 76 | 10 | 00 | 00 | 62 |
| 221 | TMC501 | 00 | 10 | 00 | 02 | 76 | 10 | 00 | 00 | 62 | 00 | 10 | 00 | 02 | 76 | 10 | 00 | 00 |
| 238 | TMC501 | 62 | 00 | 10 | 00 | 02 | 76 | 10 | 05 | 53 | 20 | 75 | 01 | 50 | 65 | 03 | 07 | 05 |
| 255 | TMC501 | 07 | 05 | 02 | 76 | 10 | 61 | 00 | 11 | 01 | 22 | 00 | 01 | 03 | 07 | 22 | 00 | 02 |
| 272 | TMC501 | 02 | 22 | 07 | 05 | 00 | 51 | 75 | 01 | 00 | 01 | 03 | 07 | 00 | 02 | 73 | 01 | 65 |
| 289 | TMC501 | 73 | 02 | 61 | 00 | 10 | 02 | 22 | 07 | 05 | 00 | 60 | 75 | 71 | 00 | 20 | 73 | 01 |
| 306 | TMC501 | 65 | 73 | 02 | 61 | 00 | 52 | 02 | 76 | 11 | 02 | 07 | 00 | 00 | 02 | 76 | 12 | 75 |
| 323 | TMC501 | 32 | 01 | 05 | 65 | 03 | 07 | 05 | 00 | 05 | 02 | 01 | 32 | 02 | 00 | 72 | 01 | 02 |
| 340 | TMC501 | 32 | 01 | 00 | 01 | 32 | 61 | 00 | 03 | 76 | 13 | 03 | 07 | 02 | 05 | 05 | 33 | 05 |
| 357 | TMC501 | 07 | 05 | 02 | 01 | 03 | 05 | 72 | 01 | 01 | 22 | 00 | 01 | 07 | 05 | 01 | 10 | 01 |
| 374 | TMC501 | 02 | 00 | 02 | 00 | 03 | 00 | 05 | 07 | 05 | 02 | 03 | 75 | 03 | 07 | 75 | 00 | 05 |
| 391 | TMC501 | 02 | 05 | 03 | 00 | 10 | 02 | 02 | 73 | 02 | 50 | 32 | 22 | 07 | 05 | 01 | 00 | 01 |
| 408 | TMC501 | 00 | 02 | 73 | 02 | 50 | 22 | 77 | 01 | 50 | 32 | 03 | 07 | 05 | 03 | 05 | 05 | 00 |
| 425 | TMC501 | 05 | 02 | 03 | 61 | 01 | 50 | 03 | 03 | 32 | 03 | 00 | 05 | 07 | 05 | 07 | 02 | 20 |
| 442 | TMC501 | 02 | 02 | 01 | 00 | 00 | 06 | 03 | 07 | 05 | 01 | 05 | 02 | 05 | 73 | 02 | 03 | 03 |
| 459 | TMC501 | 72 | 02 | 03 | 07 | 00 | 02 | 00 | 03 | 07 | 05 | 02 | 12 | 03 | 00 | 10 | 02 | 01 |
| 476 | TMC501 | 73 | 01 | 00 | 06 | 20 | 07 | 03 | 31 | 03 | 07 | 02 | 05 | 03 | 00 | 10 | 02 | 02 |
| 493 | TMC501 | 05 | 03 | 05 | 75 | 03 | 00 | 05 | 02 | 03 | 73 | 03 | 55 | 73 | 02 | 05 | 02 | 01 |
| 510 | TMC501 | 72 | 03 | 03 | 07 | 00 | 02 | 00 | 03 | 33 | 05 | 00 | 05 | 32 | 03 | 03 | 77 | 02 |
| 527 | TMC501 | 07 | 03 | 01 | 00 | 05 | 73 | 02 | 05 | 70 | 03 | 01 | 02 | 00 | 01 | 22 | 00 | 05 |
| 544 | TMC501 | 03 | 05 | 32 | 03 | 00 | 07 | 03 | 12 | 01 | 02 | 05 | 01 | 00 | 00 | 03 | 07 | 32 |

TABLE VIII

| BCD ADDRESS | CHIP | PROGRAM CODES* | | | | | | | | | | | | | | | | | |
|---|---|---|---|---|---|---|---|---|---|---|---|---|---|---|---|---|---|---|---|
| 5A1 | TMC501 | 03 | 00 | 67 | 03 | 2A | A1 | 01 | 35 | 10 | 02 | 01 | 71 | 01 | 89 | 0A | 03 | 0A |
| 57A | TMC501 | 0A | 09 | 0A | 02 | 6A | AA | AA | AA | 6A | AA | AA | AA | AA | AA | 6A | 7A | 10 |
| 5D5 | TMC501 | 02 | 05 | 02 | 02 | 03 | 03 | 07 | 33 | A5 | 07 | 95 | 02 | 01 | 03 | 05 | 32 | 03 |
| 612 | TMC501 | 07 | 22 | 77 | 03 | 50 | 01 | 00 | 01 | 73 | 01 | 22 | A7 | 03 | 70 | 03 | 07 | 00 |
| 620 | TMC501 | 01 | 01 | 00 | 05 | 03 | 03 | 72 | 01 | 09 | 02 | A1 | 03 | 55 | 7A | 15 | 01 | 02 |
| 66A | TMC501 | 00 | 03 | 07 | A5 | 33 | A5 | 07 | 95 | 02 | 01 | 03 | 00 | 02 | 05 | 75 | 03 | 07 |
| 6A3 | TMC501 | A5 | 07 | 95 | 02 | 02 | 00 | 71 | 00 | 30 | A5 | 01 | 00 | 01 | 73 | 01 | 95 | 72 |
| 6A0 | TMC501 | 01 | 01 | 00 | 00 | 03 | 00 | 32 | 03 | 07 | 77 | 00 | 00 | 01 | 02 | 00 | 07 | A5 |
| 6B7 | TMC501 | 53 | 03 | 07 | A5 | 01 | 50 | 33 | 95 | 02 | 01 | 75 | 03 | 07 | 75 | 03 | 00 | 02 |
| 710 | TMC501 | 05 | 95 | 02 | 02 | 00 | 71 | 00 | 52 | A5 | 71 | 00 | 20 | 73 | 01 | 95 | 55 | 73 |
| 731 | TMC501 | 02 | 05 | 72 | 01 | 01 | 00 | 00 | 03 | 00 | 32 | 03 | 07 | 77 | 00 | 52 | 0A | 01 |
| 74A | TMC501 | 02 | 7A | 1A | A5 | 32 | 07 | A5 | 03 | 07 | A5 | 53 | 30 | A5 | 01 | 53 | 95 | 02 |
| 765 | TMC501 | 01 | 32 | 02 | 73 | 01 | 00 | 02 | 01 | 00 | 01 | 61 | 05 | 25 | 7A | 17 | 01 | 02 |
| 782 | TMC501 | 00 | 03 | 00 | 19 | 95 | 02 | 01 | 73 | 01 | 35 | 72 | 01 | 01 | 00 | 00 | 03 | 00 |
| 790 | TMC501 | 32 | 03 | 07 | 77 | 05 | 00 | 01 | 90 | 00 | 00 | 01 | 02 | 03 | 03 | 00 | 10 | 02 |
| 81A | TMC501 | 01 | 75 | 03 | 03 | 02 | 05 | 95 | 02 | 02 | 73 | 01 | 65 | 73 | 02 | 90 | 71 | 00 |
| 833 | TMC501 | 52 | 05 | 65 | 71 | 00 | 20 | 73 | 02 | 05 | 72 | 01 | 01 | 00 | 05 | 03 | 00 | 32 |
| 850 | TMC501 | 03 | 03 | 22 | 67 | 05 | 60 | 01 | 02 | 03 | 22 | 00 | 00 | 03 | 00 | 32 | 01 | 22 |
| 8A7 | TMC501 | 67 | 05 | 60 | 03 | 00 | 10 | 02 | 01 | 05 | 03 | 03 | 02 | 05 | 05 | 02 | 02 | 73 |
| 8B0 | TMC501 | 02 | 90 | 71 | 00 | 30 | A5 | 01 | 00 | 01 | 05 | 72 | 01 | 01 | 00 | 03 | 03 | 03 |
| 901 | TMC501 | 32 | 03 | 07 | 75 | 03 | 00 | 05 | 77 | 0A | 27 | 01 | 00 | 00 | 02 | 03 | 03 | 07 |
| 91B | TMC501 | 32 | 03 | 00 | 22 | A7 | 0A | 27 | 01 | 02 | 00 | 03 | 00 | 02 | 05 | 10 | 02 | 03 |
| 935 | TMC501 | 03 | 05 | 10 | 02 | 01 | 03 | 03 | 02 | 02 | 03 | 07 | 75 | 03 | 05 | 05 | 01 | 05 |
| 952 | TMC501 | 0B | 05 | 32 | 73 | 03 | 90 | 71 | 00 | 30 | 05 | 90 | 72 | 03 | 03 | 07 | 00 | 03 |
| 969 | TMC501 | 32 | 05 | 01 | 05 | 02 | 05 | 32 | 77 | 0A | 02 | 32 | 03 | 00 | A7 | 00 | 0A | 05 |
| 98A | TMC501 | 01 | 05 | 02 | 05 | 03 | 00 | 10 | 05 | 01 | 05 | 02 | 03 | 03 | 05 | 10 | 02 | 02 |
| 1003 | TMC501 | 03 | 03 | 02 | 01 | 03 | 07 | 75 | 03 | 05 | 05 | 01 | 05 | 0B | 05 | 32 | 73 | 01 |
| 1020 | TMC501 | 65 | 73 | 02 | 90 | 71 | 00 | 30 | 05 | 90 | 72 | 03 | 01 | 00 | 03 | 05 | 32 | 05 |
| 1037 | TMC501 | 02 | 05 | 32 | 03 | 07 | 77 | 07 | 55 | 01 | 00 | 00 | 61 | 0A | 05 | 90 | 01 | 02 |
| 1050 | TMC501 | 02 | 03 | 32 | 03 | 07 | 22 | 77 | 00 | 10 | 05 | 02 | 05 | 33 | 05 | 07 | 05 | 02 |
| 1071 | TMC501 | 01 | 00 | 02 | 00 | 73 | 01 | 67 | 0A | 05 | 01 | 22 | 00 | 01 | 07 | 05 | 0A | 32 |
| 108A | TMC501 | 03 | 05 | 75 | 01 | 05 | 05 | 03 | 07 | 05 | 07 | 05 | 02 | 01 | 32 | 02 | 01 | 00 |
| 1105 | TMC501 | 01 | 00 | 00 | 73 | 01 | 09 | 02 | 03 | 00 | 32 | 03 | 07 | 22 | 67 | 0B | 60 | 01 |
| 1122 | TMC501 | 05 | 03 | 03 | 05 | 1B | 61 | 0B | 60 | 7A | 10 | 13 | 29 | 67 | 0B | 05 | 17 | 03 |
| 1139 | TMC501 | 0A | 02 | 7A | 11 | 0B | 00 | 0B | 03 | 03 | 00 | 9A | 09 | 02 | 7A | 12 | 75 | 32 |
| 115A | TMC501 | 01 | 05 | 05 | 03 | 03 | 05 | 0B | 05 | 02 | 07 | 32 | 9B | 02 | 76 | 50 | 72 | 07 |
| 1173 | TMC501 | 32 | 01 | 00 | 07 | 32 | 09 | 02 | 61 | 50 | 7A | 13 | 05 | 32 | 03 | 00 | 75 | 01 |
| 1190 | TMC501 | 05 | 05 | 03 | 03 | 05 | 0B | 05 | 02 | 07 | 32 | 9B | 02 | 61 | 50 | 7A | 10 | 0B |
| 1207 | TMC501 | 0A | 0B | 05 | 03 | 0A | 90 | 09 | 02 | 7A | 15 | 07 | 02 | 01 | 05 | 53 | 03 | 03 |
| 1220 | TMC501 | 05 | 03 | 00 | 50 | 02 | 07 | 05 | 02 | 02 | 7A | 33 | 01 | 00 | 01 | 00 | 02 | 03 |
| 1201 | TMC501 | 05 | 05 | 73 | 01 | 05 | 03 | 0A | 05 | 73 | 02 | 05 | 72 | 01 | 07 | 07 | 33 | 01 |
| 125B | TMC501 | 02 | 7A | 1A | 12 | 02 | 7A | 05 | 73 | 07 | 09 | 02 | 01 | 00 | 07 | 61 | 05 | 76 |
| 1275 | TMC501 | 17 | 05 | 32 | 03 | 03 | 05 | 53 | 03 | 00 | 05 | 01 | 50 | 05 | 0B | 05 | 02 | 07 |
| 1292 | TMC501 | 32 | 9B | 02 | 7A | 60 | 72 | 07 | 32 | 01 | 00 | 07 | 32 | 09 | 02 | 61 | 60 | 7A |
| 1309 | TMC501 | 1B | 03 | 03 | 75 | 32 | 0B | 05 | 90 | 02 | 01 | 7A | 52 | 03 | 03 | 65 | 53 | 03 |
| 1326 | TMC501 | 00 | 02 | 07 | A5 | 01 | 50 | 05 | 0B | 05 | 02 | 02 | 00 | 7A | 59 | 05 | 03 | 03 |
| 1303 | TMC501 | 00 | 01 | 01 | 00 | 02 | 73 | 01 | 65 | 73 | 02 | 07 | 07 | 59 | 05 | 0B | 03 | 00 |
| 1340 | TMC501 | 01 | 0B | 03 | 72 | 01 | 32 | 75 | 01 | 05 | 02 | 01 | 29 | 67 | 25 | 00 | 05 | 0B |
| 1377 | TMC501 | 05 | 0B | 01 | 32 | 61 | 52 | 7A | 25 | 01 | 02 | 7A | 19 | 05 | 32 | 07 | 05 | 03 |
| 1390 | TMC501 | 03 | 05 | 03 | 00 | 05 | 02 | 07 | 32 | 9B | 02 | 7A | 57 | 73 | 07 | 09 | 02 | 01 |
| 1011 | TMC501 | 00 | 07 | 61 | 57 | 7A | 10 | 03 | 01 | 0B | 03 | 02 | 01 | 03 | 02 | 0B | 00 | 02 |
| 102B | TMC501 | 02 | 00 | 02 | 7A | 11 | 29 | 70 | 0B | 02 | 0B | 01 | 03 | 02 | 20 | 02 | 7A | 1A |
| 1045 | TMC501 | 0B | 00 | 0B | 03 | 03 | 00 | 20 | 02 | 7A | 12 | 03 | 00 | 00 | 02 | 03 | 02 | 32 |
| 1062 | TMC501 | 03 | 03 | 00 | 01 | 03 | 01 | 02 | 7A | 17 | 01 | 90 | 09 | 03 | 09 | 00 | 12 | 02 |
| 1079 | TMC501 | 7A | 13 | 53 | 03 | 01 | 05 | 03 | 03 | 75 | 03 | 02 | 05 | 03 | 00 | 50 | 32 | 53 |
| 109A | TMC501 | 03 | 01 | 05 | 03 | 00 | 05 | 03 | 02 | 05 | 03 | 03 | 50 | 02 | 02 | 32 | 02 | 01 |
| 1513 | TMC501 | 02 | 7A | 1B | 01 | 00 | 00 | 00 | 53 | 03 | 03 | 33 | 05 | 03 | 00 | 33 | 50 | 35 |
| 1530 | TMC501 | 09 | 01 | 09 | 02 | 13 | 02 | 7A | 10 | 10 | 36 | 05 | 12 | 29 | 67 | 10 | 3A | 05 |
| 1507 | TMC501 | 1A | 13 | 3A | 05 | 17 | 02 | 7A | 19 | 3A | 05 | 1A | 10 | 3A | 05 | 1A | 10 | 1A |
| 15A0 | TMC501 | 02 | 7A | 15 | 10 | 3A | 05 | 12 | 29 | 67 | 10 | 3A | 05 | 1A | 1B | 3A | 05 | 17 |
| 15B1 | TMC501 | 02 | 7A | 10 | 53 | 53 | 03 | 02 | 22 | 23 | A5 | 35 | 50 | 55 | 02 | 50 | 70 | 02 |
| 15B8 | TMC501 | 7A | 11 | 3A | 00 | 11 | 02 | 7A | 12 | 70 | 03 | 01 | 32 | 03 | 02 | 22 | 37 | 32 |
| 1615 | TMC501 | 02 | 7A | 1A | 12 | 23 | 02 | 01 | 32 | 02 | 02 | 32 | 02 | 7A | 17 | 7A | 03 | 01 |
| 1632 | TMC501 | 22 | 23 | 32 | 03 | 02 | 37 | 02 | 02 | 32 | 02 | 01 | 02 | 7A | 13 | 12 | 33 | 53 |
| 1609 | TMC501 | 32 | 65 | 7A | 52 | 02 | 50 | 37 | 02 | 02 | 32 | 02 | 01 | 02 | 7A | 10 | 12 | 30 |
| 16AA | TMC501 | 53 | 32 | 55 | 61 | 52 | 7A | 15 | 01 | 02 | 03 | 00 | 02 | 00 | 3A | 00 | 10 | 3A |
| 16B3 | TMC501 | 00 | 1B | 02 | 7A | 1B | 53 | 53 | 03 | 02 | 22 | 23 | 75 | 35 | 50 | 55 | 02 | 50 |
| 1700 | TMC501 | 02 | 7A | 1A | 70 | 53 | 53 | 03 | 01 | 05 | 01 | 50 | 33 | 05 | 03 | 02 | 33 | 50 |
| 1717 | TMC501 | 30 | 02 | 7A | 10 | 53 | 53 | 03 | 01 | 75 | 01 | 50 | 33 | 05 | 03 | 02 | 33 | 50 |
| 1730 | TMC501 | 30 | 02 | 7A | 15 | 53 | 53 | 1A | 05 | 10 | 50 | 55 | 02 | 05 | 53 | 52 | 22 | 52 |
| 1751 | TMC501 | 33 | 75 | 01 | 50 | 30 | 50 | 23 | 02 | 7A | 11 | 3A | 00 | 11 | 02 | 7A | 12 | 70 |
| 17AB | TMC501 | 53 | 03 | 01 | 39 | 05 | 3A | 05 | 10 | 50 | 32 | 53 | 03 | 01 | 39 | 05 | 3A | 05 |
| 17B5 | TMC501 | 1B | 50 | 02 | 02 | 32 | 02 | 01 | 02 | 7A | 13 | 70 | 53 | 03 | 01 | 39 | 05 | 3A |
| 1802 | TMC501 | 05 | 10 | 50 | 32 | 53 | 03 | 01 | 38 | 00 | 05 | 3A | 05 | 1B | 50 | 02 | 02 | 32 |
| 1819 | TMC501 | 02 | 01 | 02 | 7A | 10 | 03 | 01 | 02 | 03 | 03 | 02 | 02 | 00 | 13 | 3A | 00 | 10 |
| 183A | TMC501 | 12 | 3A | 00 | 1B | 02 | 76 | 17 | 53 | 53 | 1A | 75 | 10 | 50 | 55 | 02 | 50 | 22 |
| 1853 | TMC501 | 3B | 32 | 15 | 02 | 02 | 32 | 02 | 01 | 02 | 7A | 1B | 53 | 53 | 16 | 75 | 10 | 50 |
| 1870 | TMC501 | 55 | 02 | 50 | 22 | 39 | 32 | 15 | 00 | 02 | 02 | 32 | 02 | 01 | 02 | 7A | 19 | 53 |
| 1887 | TMC501 | 53 | 01 | 75 | 03 | 01 | 33 | 75 | 03 | 02 | 33 | 50 | 32 | 53 | 02 | 05 | 03 | 01 |
| 1904 | TMC501 | 50 | 22 | 37 | 55 | 02 | 50 | 32 | 53 | 53 | 53 | 03 | 01 | 33 | 05 | 53 | 03 | 02 |
| 1921 | TMC501 | 05 | 01 | 53 | 33 | 50 | 55 | 53 | 03 | 01 | 33 | 05 | 53 | 03 | 02 | 75 | 01 | 50 |
| 193B | TMC501 | 33 | 50 | 50 | 23 | 55 | 00 | 50 | 02 | 02 | 32 | 02 | 01 | 02 | 7A | 11 | 02 | 00 |
| 1955 | TMC501 | 09 | 02 | 7A | 12 | 53 | 20 | 05 | 32 | 05 | 50 | 02 | 01 | 32 | 0B | 02 | 7A | 50 |
| 1972 | TMC501 | 72 | 01 | 32 | 01 | 00 | 01 | 32 | 09 | 02 | 61 | 50 | 7A | 13 | 0B | 09 | 02 | 03 |
| 1B0B | TMC501 | 53 | 03 | 00 | 02 | 02 | 05 | 05 | 50 | 02 | 01 | 01 | 00 | 02 | 73 | 01 | 7A | 60 |
| 2006 | TMC501 | 22 | 07 | 02 | 70 | 22 | 07 | 01 | 70 | 53 | 20 | 65 | 03 | 03 | 05 | 73 | 01 | 50 |
| 2023 | TMC501 | 61 | 60 | 7A | 70 | 09 | 02 | 7A | 11 | 02 | 01 | 02 | 7A | 12 | 53 | 02 | 02 | 75 |
| 2040 | TMC501 | 32 | 03 | 01 | 53 | 02 | 03 | 03 | 00 | 01 | 02 | 0B | 32 | 02 | 7A | 13 | 02 | 03 |

TABLE VIII

| BCD ADDRESS | CHIP | PROGRAM CODES+ | | | | | | | | | | | | | | | | | | | |
|---|---|---|---|---|---|---|---|---|---|---|---|---|---|---|---|---|---|---|---|---|---|
| 2057 | TMC501 | 02 | 7A | 1A | 42 | 0A | 02 | 7A | 15 | 53 | 2A | 43 | 02 | 32 | 43 | 01 | 77 | 50 | | | |
| 2070 | TMC501 | 42 | 0A | A5 | 43 | 03 | 5A | 42 | 01 | 42 | 05 | 3A | A0 | 1A | 42 | 07 | 53 | 43 | | | |
| 2081 | TMC501 | 0A | 42 | 0A | 36 | 00 | 1A | 20 | A7 | 70 | A5 | 4A | 07 | 5A | 77 | 15 | 7A | A0 | | | |
| 2108 | TMC501 | 53 | 53 | 43 | 04 | A5 | 43 | 05 | 5A | 55 | 02 | 5A | 42 | 0A | 43 | 0A | 32 | 53 | | | |
| 2125 | TMC501 | 43 | 05 | 75 | 43 | 0A | 5A | 22 | 77 | 70 | 53 | 43 | 0A | 3A | 00 | 1A | A5 | 43 | | | |
| 2142 | TMC501 | 07 | 5A | 20 | A7 | 70 | 77 | 45 | 43 | 0A | 42 | 05 | A1 | A0 | 7A | 45 | 43 | 0A | | | |
| 2159 | TMC501 | 42 | 0A | A1 | A0 | 7A | 70 | 43 | 0A | 02 | 76 | 50 | 00 | 35 | 02 | 7A | 15 | 53 | | | |
| 2176 | TMC501 | 43 | 01 | A5 | 43 | 05 | A5 | 43 | 03 | 5A | 42 | 7A | 11 | 42 | 01 | 42 | 7A | 12 | | | |
| 2193 | TMC501 | 42 | 02 | 02 | 7A | 13 | 53 | 5A | 42 | 05 | 55 | 02 | 5A | 22 | 5A | 20 | 22 | A7 | | | |
| 2210 | TMC501 | 52 | 53 | 43 | 05 | 35 | A5 | 53 | 43 | 02 | 75 | 43 | 01 | 5A | 5A | 42 | 43 | 42 | | | |
| 2227 | TMC501 | 7A | 52 | 00 | 35 | 02 | 7A | 10 | 15 | 3A | 00 | 1A | 42 | 0A | 7A | 50 | 01 | 22 | | | |
| 2244 | TMC501 | 40 | 05 | 53 | 15 | 3A | 00 | 1A | A5 | 0A | 5A | 40 | 0A | 22 | 07 | 05 | 45 | 53 | | | |
| 2261 | TMC501 | 15 | 3A | 00 | 1A | A5 | 02 | 5A | 40 | 00 | 41 | 50 | 7A | 45 | 15 | 3A | 00 | 1A | | | |
| 2278 | TMC501 | 40 | 00 | 53 | 43 | 03 | 55 | 03 | 5A | 49 | 00 | 43 | 00 | 42 | 7A | 11 | 53 | 50 | | | |
| 2295 | TMC501 | 42 | 05 | 55 | 02 | 5A | 42 | 02 | 22 | 59 | 20 | 22 | A7 | 52 | 43 | 05 | 00 | 42 | | | |
| 2312 | TMC501 | 7A | 52 | 00 | 35 | 02 | 7A | 12 | 02 | 03 | 00 | 02 | 7A | 13 | 53 | 2A | A5 | 32 | | | |
| 2329 | TMC501 | 0A | 5A | 42 | 01 | 32 | 0A | 02 | 76 | 50 | 72 | 01 | 32 | 01 | 40 | 01 | 32 | 00 | | | |
| 2346 | TMC501 | 02 | A1 | 50 | 7A | 10 | 53 | 43 | 05 | A5 | 0A | 5A | 42 | 01 | 73 | 01 | 02 | 0A | | | |
| 2363 | TMC501 | 7A | 05 | 01 | 22 | 40 | 01 | 53 | 73 | 01 | A5 | 00 | 5A | 40 | 00 | 01 | 22 | 40 | | | |
| 2380 | TMC501 | 01 | 22 | 07 | 02 | 33 | 53 | 73 | 01 | 65 | 02 | 5A | 40 | 00 | A1 | 45 | 7A | 33 | | | |
| 2397 | TMC501 | 73 | 01 | 40 | 00 | 53 | 43 | 03 | 55 | 03 | 5A | 49 | 00 | 43 | 00 | 0A | 00 | 02 | | | |
| 2414 | TMC501 | 7A | 1A | 53 | 53 | 43 | 06 | 33 | A5 | 43 | 01 | 33 | 75 | 43 | 02 | 33 | 5A | 55 | | | |
| 2431 | TMC501 | 02 | 55 | 43 | 0A | 55 | 43 | 01 | 5A | 22 | 39 | A7 | 00 | 07 | 42 | 05 | A6 | 00 | | | |
| 2448 | TMC501 | 7A | 57 | 43 | 06 | 0A | 01 | 0A | 02 | 42 | 0A | A1 | 1A | 7A | 07 | A7 | 01 | 6A | | | |
| 2465 | TMC501 | 02 | 00 | A6 | 01 | A1 | 57 | 76 | 6A | 42 | 03 | A7 | 02 | 00 | 7A | 10 | 22 | A6 | | | |
| 2482 | TMC501 | 00 | 22 | A6 | 01 | 22 | A6 | 02 | 22 | A6 | 03 | 02 | 76 | 10 | 53 | 53 | 43 | 02 | | | |
| 2499 | TMC501 | 3A | 65 | 43 | 01 | 55 | 43 | 0A | 5A | 22 | 52 | 52 | 22 | 52 | 22 | 3A | 52 | 22 | | | |
| 2516 | TMC501 | 52 | 42 | 00 | 00 | A5 | 01 | 00 | 22 | 39 | 75 | 43 | 02 | 5A | 42 | 02 | 42 | 05 | | | |
| 2533 | TMC501 | A6 | 03 | 7A | 15 | 53 | 43 | 0A | 33 | A5 | 43 | 01 | 33 | 75 | 02 | 65 | 43 | 0A | | | |
| 2550 | TMC501 | A5 | 43 | 01 | A5 | 43 | 02 | 39 | 5A | 3A | A7 | 03 | 6A | 42 | 02 | A6 | 00 | 6A | | | |
| 2567 | TMC501 | 02 | A1 | 57 | 7A | 00 | 42 | 05 | 43 | 01 | A1 | 10 | 76 | 6A | 42 | 02 | A1 | 10 | | | |
| 2584 | TMC501 | 76 | 17 | 43 | 00 | 02 | 7A | 1A | 43 | 05 | 02 | 7A | 11 | 42 | 0A | 02 | 7A | 12 | | | |
| 2601 | TMC501 | 42 | 01 | 02 | 76 | 13 | 42 | 02 | 02 | 7A | 11 | 42 | 07 | 02 | 7A | 12 | 42 | 00 | | | |
| 2618 | TMC501 | 02 | 7A | 13 | 42 | 05 | 02 | 76 | 16 | 53 | 01 | 00 | 22 | 30 | 75 | 43 | 00 | 75 | | | |
| 2635 | TMC501 | 43 | 05 | 50 | 42 | 03 | A1 | 6A | 76 | 17 | 53 | 01 | 00 | 22 | 30 | 75 | 43 | 00 | | | |
| 2652 | TMC501 | 42 | 03 | 75 | 43 | 05 | 5A | 42 | 00 | A6 | 00 | 7A | 6A | 53 | 43 | 07 | A5 | 43 | | | |
| 2669 | TMC501 | 00 | 3A | 55 | 43 | 03 | 3A | 5A | 42 | 01 | 53 | 43 | 07 | A5 | 43 | 05 | 3A | 55 | | | |
| 2686 | TMC501 | 43 | 03 | 3A | 5A | 42 | 02 | A7 | 00 | A9 | 43 | 03 | 02 | 7A | A9 | 43 | 00 | 22 | | | |
| 2703 | TMC501 | A6 | 00 | 02 | 7A | 10 | 43 | 01 | 02 | 7A | 15 | 43 | 02 | 02 | 7A | 1A | 53 | 53 | | | |
| 2720 | TMC501 | 43 | 07 | A5 | 43 | 01 | A5 | 43 | 02 | 5A | 55 | 02 | 5A | 42 | 0A | 53 | 43 | 0A | | | |
| 2737 | TMC501 | A5 | 53 | 43 | 0A | 75 | 43 | 07 | 5A | A5 | 53 | 43 | 0A | 75 | 43 | 01 | 5A | A5 | | | |
| 2754 | TMC501 | 53 | 43 | 0A | 75 | 43 | 02 | 53 | 5A | 30 | 02 | 7A | 11 | 22 | A6 | 00 | 22 | A6 | | | |
| 2771 | TMC501 | 01 | 20 | 42 | 01 | 3A | 77 | 0A | 23 | 76 | 0A | 43 | 01 | 02 | 7A | 12 | 22 | A6 | | | |
| 2788 | TMC501 | 00 | 22 | A6 | 01 | 20 | 42 | 02 | 77 | AA | 23 | 43 | 02 | 7A | AA | 02 | 76 | 13 | | | |
| 2805 | TMC501 | 02 | 03 | 02 | 7A | 14 | 42 | 00 | A6 | 00 | A6 | 01 | 02 | 7A | 1A | A7 | 00 | 57 | | | |
| 2822 | TMC501 | 53 | 43 | 03 | 55 | 43 | 02 | 5A | 42 | 01 | 02 | 7A | 57 | 70 | 53 | 53 | 43 | 00 | | | |
| 2839 | TMC501 | 55 | 02 | 55 | 43 | 02 | 5A | 22 | 3A | A5 | 02 | 5A | 42 | 01 | 02 | 7A | 17 | A7 | | | |
| 2856 | TMC501 | 01 | 6A | 53 | 43 | 03 | 55 | 43 | 01 | 5A | 42 | 02 | 02 | 7A | 6A | 53 | 71 | A9 | | | |
| 2873 | TMC501 | 35 | A5 | 43 | 00 | 5A | 42 | 02 | 02 | 7A | A9 | 70 | 53 | 53 | 43 | 01 | 55 | 02 | | | |
| 2890 | TMC501 | 5A | 3A | 65 | 02 | 5A | 02 | 7A | 1A | 53 | 43 | 01 | A5 | 43 | 02 | 5A | 02 | 7A | | | |
| 2907 | TMC501 | 10 | 71 | A9 | A5 | 43 | 02 | 5A | 02 | 7A | 15 | 53 | 43 | 02 | 33 | A5 | 43 | 01 | | | |
| 2924 | TMC501 | 55 | 02 | 5A | 02 | 7A | 10 | 70 | 53 | 43 | 01 | A5 | 43 | 02 | 33 | 55 | 02 | 75 | | | |
| 2941 | TMC501 | 43 | 02 | 33 | 55 | 02 | A5 | 43 | 01 | 3A | 5A | 02 | 7A | 11 | 22 | A6 | 01 | 20 | | | |
| 2958 | TMC501 | 77 | A7 | 00 | A6 | 01 | 7A | A7 | 53 | 42 | 03 | 33 | 22 | 23 | A5 | 02 | A5 | A0 | | | |
| 2975 | TMC501 | 5A | 3A | 35 | 42 | 01 | 02 | 76 | 12 | 03 | 02 | 03 | 01 | 0A | 00 | 01 | 00 | 40 | | | |
| 2992 | TMC501 | 03 | 01 | 40 | 03 | 43 | 03 | 35 | 53 | 53 | 42 | 02 | 45 | 00 | A5 | 01 | 03 | 03 | | | |
| 3009 | TMC501 | 03 | 00 | 02 | 07 | 00 | 00 | 02 | 00 | 75 | 43 | 02 | 45 | 03 | A5 | 01 | 03 | 0A | | | |
| 3026 | TMC501 | 02 | 01 | 02 | 05 | 05 | 00 | 07 | 0A | A5 | 43 | 02 | 45 | 02 | A5 | 01 | 03 | 07 | | | |
| 3043 | TMC501 | 0A | 01 | 00 | 07 | 07 | 00 | 03 | 07 | 75 | 43 | 02 | A5 | 03 | 03 | 05 | 0A | 05 | | | |
| 3060 | TMC501 | 0A | 03 | 07 | 0A | 02 | A5 | 03 | 03 | 01 | 00 | 03 | 6A | 01 | 05 | 03 | 50 | A5 | | | |
| 3077 | TMC501 | 43 | 02 | A5 | 43 | 01 | 5A | A7 | 01 | 60 | 02 | 7A | A0 | 53 | 40 | A5 | 01 | 50 | | | |
| 3094 | TMC501 | 02 | 7A | AA | 53 | 53 | 02 | 00 | 02 | 00 | 0A | A5 | 43 | 00 | A5 | 00 | 00 | 00 | | | |
| 3111 | TMC501 | 00 | 01 | 50 | 55 | 01 | 00 | 00 | 00 | 01 | 07 | 42 | 07 | 50 | 53 | 53 | 53 | 22 | | | |
| 3128 | TMC501 | 50 | A5 | 43 | 07 | 50 | 42 | 00 | 55 | 43 | 07 | A5 | 05 | 22 | 2A | 50 | 40 | 55 | | | |
| 3145 | TMC501 | 05 | 22 | 2A | 50 | 02 | 7A | 13 | 71 | AA | 53 | 2A | A5 | 53 | 43 | 11 | 75 | 43 | | | |
| 3162 | TMC501 | 10 | 50 | 7A | 37 | A5 | 43 | 10 | 50 | 42 | 07 | 7A | 43 | 07 | 02 | 7A | 1A | 70 | | | |
| 3179 | TMC501 | 71 | AA | 42 | 00 | 71 | AA | 53 | 53 | 2A | A5 | 02 | A5 | A0 | 50 | 30 | A5 | 53 | | | |
| 3196 | TMC501 | 43 | 0A | 23 | A5 | 02 | 00 | 50 | 3A | A5 | 43 | 11 | A1 | 37 | 7A | 10 | 3A | 01 | | | |
| 3213 | TMC501 | 71 | 25 | 02 | 7A | 15 | 42 | 00 | 02 | 7A | 11 | 42 | 10 | 02 | 7A | 12 | 42 | 11 | | | |
| 3230 | TMC501 | 02 | 7A | 13 | 20 | A7 | 70 | 7A | A0 | 43 | 01 | 40 | 0A | 07 | 01 | A0 | 7A | 3A | | | |
| 3247 | TMC501 | 43 | 0A | A7 | 01 | 30 | 02 | 7A | 10 | 20 | A7 | 70 | 10 | 07 | 02 | 15 | A1 | 3A | | | |
| 3264 | TMC501 | 7A | 15 | 20 | A7 | 70 | 10 | 43 | 02 | 22 | 00 | 0A | 07 | 02 | 15 | A1 | 3A | 7A | | | |
| 3281 | TMC501 | 70 | 01 | 42 | 0A | A1 | 3A | 7A | 11 | 32 | 22 | A6 | 01 | 01 | 42 | 00 | 42 | 03 | | | |
| 3298 | TMC501 | 32 | 7A | 17 | 20 | 77 | A7 | A6 | 01 | 50 | 7A | A7 | 72 | 03 | 32 | 73 | 03 | 50 | | | |
| 3315 | TMC501 | A7 | AA | A6 | 01 | 7A | AA | 72 | 03 | 02 | 7A | 30 | 00 | 35 | 43 | 00 | 02 | 7A | | | |
| 3332 | TMC501 | 10 | 43 | 01 | 40 | 0A | 01 | 22 | 40 | 01 | 02 | 7A | 12 | 32 | 02 | 42 | 03 | 32 | | | |
| 3349 | TMC501 | 17 | 32 | 43 | 01 | 77 | 30 | 00 | 35 | 02 | 7A | 30 | 43 | 02 | 02 | 7A | A7 | 43 | | | |
| 3366 | TMC501 | 05 | 72 | 01 | 40 | 00 | 01 | 40 | 01 | 53 | 43 | 00 | 55 | 32 | 50 | 02 | 7A | 12 | | | |
| 3383 | TMC501 | 42 | 05 | A7 | 01 | A0 | 01 | 40 | 03 | 43 | 03 | 32 | 43 | 02 | 77 | A7 | 0A | 42 | | | |
| 3400 | TMC501 | 01 | A6 | 01 | 7A | A0 | 73 | 01 | 22 | 40 | 00 | 43 | 05 | 40 | 00 | 72 | 01 | 01 | | | |
| 3417 | TMC501 | 40 | 01 | 43 | 01 | 32 | 53 | 43 | 02 | A5 | 05 | 50 | 77 | 77 | 0A | 42 | 01 | 76 | | | |
| 3434 | TMC501 | 77 | 53 | 43 | 00 | 55 | 43 | 02 | 50 | 02 | 7A | 70 | 00 | 35 | 02 | 7A | 10 | 22 | | | |
| 3451 | TMC501 | A6 | 01 | 0A | 42 | 01 | 00 | 42 | 03 | 42 | 00 | 02 | 7A | 11 | 20 | A7 | 70 | 22 | | | |
| 3468 | TMC501 | 77 | 70 | 42 | 02 | 32 | 43 | 02 | 50 | 22 | A7 | 70 | 02 | 7A | 1A | 53 | 53 | 43 | | | |
| 3485 | TMC501 | 00 | 05 | 43 | 01 | 75 | 42 | 12 | 01 | 50 | 55 | 43 | 0A | 50 | 02 | 7A | 17 | 53 | | | |
| 3502 | TMC501 | 1A | A5 | 43 | 00 | 50 | 02 | 7A | 1A | 53 | 1A | 55 | 43 | 12 | 50 | 02 | 7A | 10 | | | |
| 3519 | TMC501 | 1A | 53 | 20 | A5 | 43 | 00 | 50 | 02 | 7A | 10 | 20 | 50 | 02 | 02 | 7A | 71 | 53 | | | |
| 3536 | TMC501 | 43 | 00 | 55 | 43 | 03 | 50 | 02 | 7A | 25 | 53 | 71 | 71 | 23 | 55 | 13 | 00 | 23 | | | |
| 3553 | TMC501 | 50 | 42 | 01 | 02 | 7A | 11 | A7 | 25 | 42 | 01 | 02 | 7A | 22 | 53 | 01 | 00 | 00 | | | |
| 3570 | TMC501 | 75 | 20 | A5 | 71 | 71 | 22 | 05 | 43 | 01 | 50 | 00 | A7 | 15 | 7A | 12 | A7 | 22 | | | |

TABLE VIII

| BCD ADDRESS | CHIP | PROGRAM CODES+ | | | | | | | | | | | | | | | | |
|---|---|---|---|---|---|---|---|---|---|---|---|---|---|---|---|---|---|---|
| 3587 | TMC501 | 7A | 15 | 02 | 02 | 53 | 24 | 55 | 01 | 00 | 00 | 85 | 02 | 08 | 01 | 50 | 02 | 00 |
| 3600 | TMC501 | 03 | 02 | 02 | 7A | 23 | 53 | 03 | 04 | 55 | 03 | 09 | 05 | 03 | 01 | 50 | 02 | 03 |
| 3621 | TMC501 | 02 | 7A | 13 | A7 | 23 | 02 | 03 | 02 | 7A | 24 | 53 | 03 | 03 | A5 | 03 | 00 | 05 |
| 3638 | TMC501 | 03 | 01 | 50 | 02 | 04 | 02 | 7A | 14 | A7 | 24 | 02 | 04 | 02 | 7A | 11 | A1 | 03 |
| 3655 | TMC501 | 7A | 7A | 12 | A1 | 02 | 02 | 7A | 13 | A1 | 04 | 03 | 7A | 14 | A1 | 05 | 01 | 76 |
| 3672 | TMC501 | 15 | A1 | 05 | 39 | 01 | 02 | 09 | 07 | 94 | 22 | 28 | 32 | 53 | 43 | 00 | 55 | 43 |
| 3689 | TMC501 | 03 | 50 | 02 | 10 | 87 | 03 | 01 | 36 | A7 | 04 | 01 | 36 | 53 | 24 | 55 | 03 | 01 |
| 3706 | TMC501 | 33 | 75 | 43 | 10 | 35 | 54 | 02 | 08 | 04 | 09 | 36 | 18 | 16 | 02 | 10 | A7 | 01 |
| 3723 | TMC501 | 00 | 80 | 53 | 24 | 65 | 03 | 09 | 54 | 53 | 24 | 75 | 03 | 10 | 50 | 02 | 13 | 53 |
| 3740 | TMC501 | 03 | 10 | 55 | 03 | 08 | 75 | 03 | 01 | 65 | 03 | 12 | 55 | 03 | 09 | 55 | 03 | 08 |
| 3757 | TMC501 | 50 | A7 | 01 | 01 | 20 | 53 | 24 | 65 | 03 | 09 | 75 | 03 | 10 | 50 | 22 | 09 | 13 |
| 3774 | TMC501 | 03 | 13 | 04 | 08 | 04 | 09 | 50 | 77 | 00 | 65 | A1 | 02 | 80 | 53 | 03 | 05 | 55 |
| 3791 | TMC501 | 03 | 03 | A5 | 02 | 10 | 03 | 01 | 09 | 10 | 75 | 03 | 10 | 50 | 02 | 08 | 53 | 03 |
| 3808 | TMC501 | 01 | A5 | 33 | 55 | 02 | A5 | 03 | 10 | 55 | 03 | 01 | 50 | A7 | 03 | 01 | 80 | 53 |
| 3825 | TMC501 | 03 | 11 | A5 | 33 | 55 | 02 | 85 | 03 | 10 | 50 | 22 | 09 | 08 | 03 | 08 | 00 | 09 |
| 3842 | TMC501 | 36 | 18 | 18 | 02 | 06 | A7 | 03 | 02 | 06 | 53 | 24 | 65 | 03 | 09 | 50 | 53 | 24 |
| 3859 | TMC501 | A5 | 03 | 10 | 55 | 03 | 01 | 55 | 03 | 12 | 75 | 03 | 10 | 50 | 02 | 13 | 53 | 03 |
| 3876 | TMC501 | 06 | 55 | 03 | 08 | 75 | 03 | 01 | 55 | 03 | 12 | 55 | 03 | 09 | 55 | 03 | 08 | 50 |
| 3893 | TMC501 | A7 | 03 | 02 | 55 | 53 | 24 | 65 | 03 | 09 | A5 | 03 | 06 | 50 | 53 | 24 | A5 | 03 |
| 3910 | TMC501 | 10 | 55 | 03 | 12 | 55 | 03 | 09 | 50 | 22 | 09 | 13 | 03 | 13 | 00 | 08 | 00 | 09 |
| 3927 | TMC501 | 50 | 77 | 01 | 01 | 53 | 03 | 08 | 65 | 01 | 00 | 00 | 50 | 20 | A7 | 02 | 05 | A7 |
| 3944 | TMC501 | 00 | 25 | 58 | 00 | 36 | 18 | 15 | 92 | AA | 03 | 03 | 02 | 11 | 02 | 10 | 03 | 09 |
| 3961 | TMC501 | A7 | 02 | 03 | 10 | 87 | 00 | 03 | 19 | 01 | 09 | 11 | 09 | 10 | 53 | 03 | 00 | 65 |
| 3978 | TMC501 | 03 | 08 | 50 | A7 | 01 | 03 | 50 | A7 | 02 | 03 | 50 | 90 | 00 | 10 | 53 | 03 | 05 |
| 3995 | TMC501 | 65 | 03 | 08 | 50 | 90 | 00 | 11 | A1 | 03 | 56 | 00 | 11 | 03 | 11 | 23 | 02 | 11 |
| 4012 | TMC501 | 03 | 10 | 23 | 90 | 00 | 11 | 03 | 09 | 23 | 35 | 09 | 11 | 03 | 11 | A7 | 01 | A1 |
| 4029 | TMC501 | A7 | 03 | 01 | 02 | 01 | 00 | 02 | 11 | 00 | 58 | 00 | AA | 02 | AA | A7 | 01 | 00 |
| 4046 | TMC501 | 22 | A7 | 02 | 00 | 16 | A7 | 03 | 00 | 10 | 36 | 18 | 19 | 61 | 00 | 25 | 36 | 18 |
| 4063 | TMC501 | 18 | A1 | 00 | 25 | 36 | 18 | 17 | A1 | 00 | 25 | 36 | 18 | 16 | 53 | 24 | 55 | 53 |
| 4080 | TMC501 | 03 | 00 | 75 | 03 | 05 | 55 | 03 | 12 | 50 | 50 | 35 | A7 | 00 | 06 | A7 | 03 | 01 |
| 4097 | TMC501 | 02 | 03 | 50 | 02 | AA | 02 | 08 | A7 | 01 | 00 | 03 | A7 | 02 | 00 | 77 | A7 | 03 |
| 4114 | TMC501 | 00 | 71 | 36 | 18 | 19 | A1 | 00 | 06 | 36 | 18 | 18 | A1 | 00 | 06 | 36 | 18 | 17 |
| 4131 | TMC501 | 61 | 00 | 06 | 36 | 18 | 16 | 53 | 24 | 65 | 03 | 03 | A5 | 03 | 05 | 55 | 03 | 12 |
| 4148 | TMC501 | 50 | A7 | 05 | 00 | A7 | 00 | 52 | 02 | 00 | 58 | 02 | AA | 02 | AA | 36 | 18 | 19 |
| 4165 | TMC501 | A7 | 00 | 05 | 21 | 36 | 18 | 18 | 53 | 53 | 24 | 65 | 03 | 03 | 75 | 03 | 00 | 50 |
| 4182 | TMC501 | 90 | 65 | 03 | 12 | 50 | A7 | 05 | 02 | A7 | 05 | 10 | 02 | 05 | 58 | 02 | AA | 02 |
| 4199 | TMC501 | 7A | 16 | 06 | 01 | 02 | 7A | 17 | 06 | 02 | 02 | 7A | 18 | 06 | 03 | 02 | 7A | 19 |
| 4216 | TMC501 | 06 | 00 | 02 | 7A | 10 | 22 | 06 | 01 | 22 | 06 | 02 | 22 | 06 | 03 | 22 | 06 | 00 |
| 4233 | TMC501 | 00 | 02 | 05 | 58 | 09 | 20 | 02 | 7A | 78 | 53 | 03 | 00 | 65 | 03 | 01 | A5 | 02 |
| 4250 | TMC501 | 03 | 03 | 50 | 59 | 90 | A5 | 01 | 77 | 7A | 79 | 00 | 35 | 02 | 7A | 10 | 53 | 02 |
| 4267 | TMC501 | 01 | 20 | 22 | 77 | 79 | 22 | 59 | 22 | 00 | 01 | 65 | 00 | 22 | 20 | 50 | 02 | 03 |
| 4284 | TMC501 | 32 | 01 | 05 | 08 | 01 | 77 | 79 | 03 | 02 | 32 | 53 | 53 | 03 | 01 | 55 | 01 | 00 |
| 4301 | TMC501 | 00 | 50 | 02 | 01 | 22 | 59 | 22 | 00 | 01 | 65 | 01 | 00 | 00 | 50 | 02 | 02 | 77 |
| 4318 | TMC501 | 79 | 01 | 03 | 32 | 03 | 01 | 77 | 79 | 53 | 03 | 06 | 05 | 65 | 03 | 03 | A5 | 03 |
| 4335 | TMC501 | 02 | A5 | 03 | 01 | 65 | 03 | 01 | 75 | 03 | 01 | A5 | 03 | 32 | 03 | 01 | 77 | 7A |
| 4352 | TMC501 | 01 | 22 | 00 | 03 | 7A | 77 | 53 | 03 | 03 | 55 | 00 | 50 | 59 | 75 | 53 | 03 | 07 |
| 4369 | TMC501 | 05 | A5 | 53 | 03 | 03 | 55 | 01 | 00 | 00 | 50 | 50 | 65 | 03 | 07 | 05 | 50 | 50 |
| 4386 | TMC501 | 50 | 02 | 7A | 11 | 10 | 02 | 00 | 00 | 02 | 7A | 12 | 10 | 02 | 05 | 00 | 02 | 7A |
| 4403 | TMC501 | 13 | 53 | 03 | 05 | 75 | 03 | 00 | 50 | 02 | 7A | 10 | 53 | 53 | 10 | 02 | 01 | 00 |
| 4420 | TMC501 | 55 | 07 | 50 | 59 | A5 | 07 | A5 | 03 | 01 | 50 | 02 | 7A | 13 | 32 | 01 | 00 | 00 |
| 4437 | TMC501 | 53 | 32 | 75 | 03 | 03 | 50 | 02 | 05 | 53 | 35 | 50 | 65 | 03 | 05 | 50 | 02 | 7A |
| 4454 | TMC501 | 18 | 00 | 7A | 17 | 32 | 01 | 22 | 00 | 02 | 53 | 02 | 05 | 03 | 02 | A5 | 32 | 50 |
| 4471 | TMC501 | 50 | 02 | 7A | 12 | 53 | 36 | 15 | 71 | AA | 65 | 01 | 00 | 02 | 03 | A5 | 01 | 50 |
| 4488 | TMC501 | 59 | 02 | 03 | 00 | 02 | 00 | 02 | 7A | 14 | 20 | 03 | 00 | 02 | 7A | 16 | 00 | 02 |
| 4505 | TMC501 | 02 | 05 | 01 | 02 | 08 | 02 | 7A | 19 | 53 | 01 | 00 | 75 | 03 | 02 | 50 | 02 | 7A |
| 4522 | TMC501 | 11 | 02 | 00 | 02 | 7A | 10 | A7 | 00 | 05 | 05 | A1 | 00 | 7A | 05 | 04 | 7A | 00 |
| 4539 | TMC501 | 02 | 10 | 73 | 10 | 02 | 76 | 13 | 00 | 7A | 12 | 53 | 24 | A5 | 10 | 50 | 72 | 10 |
| 4556 | TMC501 | 02 | 7A | 11 | 10 | 02 | 7A | 16 | 22 | 7A | 17 | 06 | 00 | 50 | 02 | 02 | 7A | 18 |
| 4573 | TMC501 | 02 | 07 | 02 | 7A | 19 | 53 | 35 | 65 | 03 | 07 | 50 | 20 | 36 | 18 | 12 | 02 | 7A |
| 4590 | TMC501 | 10 | 20 | 36 | 18 | 11 | 03 | 06 | 02 | 03 | 20 | 36 | 18 | 71 | 20 | 02 | 06 | 02 |
| 4607 | TMC501 | 7A | 15 | A7 | 00 | 34 | 02 | 05 | 02 | 7A | 34 | 02 | 06 | 02 | 7A | 12 | 53 | AA |
| 4624 | TMC501 | A5 | 7A | 15 | 03 | 01 | 50 | 53 | 24 | A5 | 53 | 24 | 55 | 50 | 50 | 24 | A5 | 05 |
| 4641 | TMC501 | 00 | 22 | 28 | 50 | 22 | AA | 58 | 00 | 02 | 7A | 13 | 53 | 24 | A5 | A1 | 15 | 7A |
| 4658 | TMC501 | 10 | 53 | 35 | A5 | 61 | 15 | 7A | 11 | 50 | 09 | AA | 02 | 01 | 02 | 7A | 11 | 53 |
| 4675 | TMC501 | 24 | A5 | 02 | 03 | 05 | 00 | 50 | 02 | 7A | 12 | 53 | 24 | A5 | 03 | 03 | 00 | 00 |
| 4692 | TMC501 | 08 | 50 | 02 | 7A | 13 | 53 | 24 | 65 | 03 | 09 | 01 | 00 | 00 | 50 | 02 | 7A | 14 |
| 4709 | TMC501 | 53 | 24 | 65 | 01 | 03 | 06 | 00 | 09 | 03 | 00 | 00 | 50 | 02 | 7A | 15 | 53 | 24 |
| 4726 | TMC501 | A5 | 03 | 08 | 06 | 08 | 09 | 07 | 06 | 02 | 00 | 50 | 02 | 7A | 16 | 35 | 11 | 35 |
| 4743 | TMC501 | 02 | 76 | 17 | 35 | 12 | 35 | 02 | 7A | 18 | 35 | 13 | 35 | 02 | 76 | 19 | 35 | 14 |
| 4760 | TMC501 | 35 | 02 | 7A | 10 | 35 | 15 | 35 | 02 | 7A | 11 | 53 | 53 | 24 | 75 | 03 | 02 | 50 |
| 4777 | TMC501 | 65 | 05 | 55 | 09 | 50 | 02 | 7A | 12 | 53 | 24 | A5 | 03 | 00 | 02 | 09 | 05 | 07 |
| 4794 | TMC501 | 03 | 05 | 02 | 09 | 06 | 50 | 02 | 76 | 13 | 53 | 24 | A5 | 03 | 03 | 07 | 08 | 05 |
| 4811 | TMC501 | 00 | 01 | 01 | 07 | 08 | 00 | 50 | 02 | 7A | 10 | 53 | 24 | A5 | 02 | 08 | 03 | 03 |
| 4828 | TMC501 | 00 | 09 | 05 | 02 | 03 | 01 | 03 | 50 | 02 | 7A | 15 | 53 | 24 | A5 | 03 | 00 | 05 |
| 4845 | TMC501 | 03 | 05 | 09 | 02 | 03 | 07 | 50 | 02 | 7A | 16 | 53 | 24 | A5 | 01 | 03 | 08 | A5 |
| 4862 | TMC501 | 03 | 02 | 50 | 02 | 7A | 17 | 35 | 12 | 35 | 02 | 7A | 18 | 35 | 13 | 35 | 02 | 76 |
| 4879 | TMC501 | 19 | 35 | 10 | 35 | 02 | 7A | 10 | 35 | 15 | 35 | 02 | A1 | 11 | 02 | 02 | 02 | 02 |
| 4896 | TMC501 | 02 | 02 | 02 | 02 | 02 | 02 | 02 | 02 | 02 | 02 | 02 | 02 | 02 | 02 | 02 | 02 | 02 |
| 4913 | TMC501 | 02 | 02 | 02 | 02 | 02 | 02 | 02 | 02 | 02 | 02 | 02 | 02 | 02 | 02 | 02 | 02 | 02 |
| 4930 | TMC501 | 02 | 02 | 02 | 02 | 02 | 02 | 02 | 02 | 02 | 02 | 02 | 02 | 02 | 02 | 02 | 02 | 02 |
| 4947 | TMC501 | 02 | 02 | 02 | 02 | 02 | 02 | 02 | 02 | 02 | 02 | 02 | 02 | 02 | 02 | 02 | 02 | 02 |
| 4964 | TMC501 | 02 | 02 | 02 | 02 | 02 | 02 | 02 | 02 | 02 | 02 | 02 | 02 | 02 | 02 | 02 | 02 | 02 |
| 4981 | TMC501 | 02 | 02 | 02 | 02 | 02 | 02 | 02 | 02 | 02 | 02 | 02 | 02 | 02 | 02 | 02 | 02 | 02 |
| 4998 | TMC501 | 02 | 02 | | | | | | | | | | | | | | | |

What is claimed is:

1. In an electronic microprocessor system, having a keyboard, output means for outputting data, a data memory for storing data, an arithmetic unit for performing arithmetic operations on the data stored in said data memory, and a first nonvolatile memory for storing groups of instruction words for controlling the arithmetic operations performed by said arithmetic unit, the combination which comprises:

(a) a second non-volatile memory for storing a plurality of sets of program codes, each program code being effective for addressing a preselected group of instruction words stored in first non-volatile memory, said second non-volatile memory being disposed in a module having a plurality of electrical contacts;

(b) a receptacle for temporarily interconnecting the contacts on said module with said microprocessor system;

(c) keyboard logic means for decoding inputs received at said keyboard;

(d) means for addressing said second non-volatile memory to read out preselected sets of program codes, said means for addressing said second memory including a counter responsive to selected instructions outputted from said first memory;

(e) means for addressing said first non-volatile memory in response to the program codes read out of said second non-volatile memory, said means for addressing said first memory including a first program counter selectively responsive to said keyboard logic means and said program codes outputted from said second memory.

2. The electronic microprocessor system according to claim 1, wherein said first and second non-volatile memory are first and second read-only-memories, respectively.

3. The electronic microprocessor system according to claim 1, further including means for loading said counter in said means for addressing said second read-only-memory with a multibit number stored in said data memory.

4. The electronic microprocessor system according to claim 3, wherein said data memory comprises a plurality of registers and a multibit register coupled to the output of said arithmetic unit.

5. The electronic microprocessor system according to claim 4, wherein said keyboard logic means includes a keyboard register, the contents of which are loaded into said first program counter in response to a particular instruction word outputted from said first read-only-memory and loaded into said counter addressing second read-only-memory in response to another instruction word outputted from said first read-only-memory.

6. The microprocessor system according to claim 5, further including means for loading said keyboard register means with the contents of said multibit register connected to the output of said arithmetic unit in response to a given instruction word outputted from said first read-only-memory, whereby said arithmetic unit, multibit register connected to the output thereof, keyboard register means, and means for loading said keyboard register means provides said means for loading said counter addressing said second read-only-memory with a multibit number stored in said data memory.

7. The electronic microprocessor system according to claim 6, further including random access memory means for storing a user defined program comprising of a selected sequence of key pushes at said keyboard, said selected sequence of key pushes being stored as a sequence of program codes therein and means for loading said program codes stored in said random access memory means into said first program counter.

8. The electronic microprocessor system according to claim 7, wherein said electronic microprocessor system is provided in a programmable calculator.

9. The electronic microprocessor system according to claim 1, further including random access memory means for storing a user defined program comprising of a selected sequence of key pushes at said keyboard, said selected sequence of key pushes being stored as a sequence of program codes therein and means for loading said program codes stored in said random access memory means into said first program counter.

10. The electronic microprocessor system according to claim 9, further including means for loading said counter in said means for addressing said second read-only-memory with a multibit number stored in said data memory.

11. The electronic microprocessor system according to claim 10, wherein said keyboard logic means includes keyboard register means for loading said first program counter in response to a particular instruction word outputted from said first read-only-memory and for loading said counter addressing second read-only-memory in response to another instruction word outputted from said first read-only-memory.

12. The electronic microprocessor system according to claim 10, wherein said keyboard logic means includes keyboard registers, the contents of which are loaded into said first program counter in response to a particular instruction word outputted from said first read-only-memory and loaded into said counter addressing second read-only-memory in response to another instruction word outputted from said first read-only-memory.

13. The electronic microprocessor system according to claim 1, wherein said keyboard logic means includes keyboard register, the contents of which are loaded into said first program counter in response to a particular instruction word outputted from said first read-only-memory and loaded into said counter addressing second read-only-memory in response to another instruction word outputted from said first read-only-memory.

14. The electronic microprocessor system according to claim 13, further including random access memory means for storing a user defined program comprising of a selected sequence of key pushes at said keyboard, said selected sequence of key pushes being stored as a sequence of program codes therein and means for loading said program codes stored in said random access memory means into said first program counter.

15. The electronic microprocessor system according to claim 1, wherein a plurality of said second non-volatile memories are provided in a plurality of modules, each one of said plurality of second-non-volatile memories storing different sequences of program codes, at least one of said modules including the second non-volatile memory disposed therein, being receivable in said receptacle at any given time.

16. The electronic microprocessor system according to claim 15, wherein said electronic microprocessor system is provided in a programmable calculator.

17. The programmable calculator according to claim 16, wherein said calculator includes a case in which said data memory, arithmetic unit receptacle and first non-volatile memory are disposed, said case having an opening adjacent to said receptacle for temporarily receiving at least a selected one of said modules.

18. The programmable calculator according to claim 17, wherein said first and second non-volatile memory are first and second read-only-memories, respectively.

19. The programmable calculator according to claim 17, further including a magnetic card reader for reading magnetic cards providing storage for programs including a plurality of program codes, a program memory for storing program codes read by said magnetic card reader, means for reading out of said program memory said program codes and means for addressing said first non-volatile memory in response to the program codes read out of said program memory.

20. The programmable calculator according to claim 19, wherein said input means includes a keyboard and wherein said calculator may be selectively placed in a learn mode or run mode at said keyboard and wherein said calculator further includes means for storing the program codes according to the keys depressed at said keyboard in said program memory when said calculator is in said learn mode.

21. An electronic microprocessor system, having input means for receiving data and for receiving input commands, said input means including a keyboard, output means for outputting data, a data memory for storing data received and data to be outputted, an arithmetic unit for performing arithmetic operations on data stored in said data memory, and a first non-volatile memory for storing groups of instruction words for controlling the arithmetic operations performed by said arithmetic unit, the combination which comprises:

(a) a second non-volatile memory for storing a plurality of sets of program codes, each program code being effective for addressing a preselected group of instruction words stored in said first non-volatile memory;

(b) keyboard logic means for decoding inputs received at said keyboard;

(c) means for addressing said second non-volatile memory to read-out preselected sets of program codes in response thereto, said means for addressing said second memory including a counter responsive to selected instructions outputted from said first memory;

(d) means for addressing said first non-volatile memory in response to the program codes read-out of said second non-volatile memory, said means for addressing said first memory including a first program counter selectively responsive to said keyboard logic and to said program codes outputted from said second memory;

(e) magnetic card reader means for receiving program codes stored on magnetic cards;

(f) program memory means for storing program codes received by said magnetic card reader means;

(g) means for addressing said first non-volatile memory in response to the program codes read-out of said program memory means; and (h) wherein said means for addressing said first memory is further responsive to the program codes outputted from said program memory.

22. The system according to claim 21, wherein said first and second non-volatile memories are first and second read-only-memories respectively.

23. In an electronic microprocessor system of the type having a keyboard, an arithmetic unit for performing numerical operations on data, a first memory for storing a plurality of groups of instruction words, a first address register for addressing the first memory, keyboard logic means for inserting addresses into said first address register in response to key depressions at said keyboard and instruction word decoder means for controlling the arithmetic unit in response to instruction words outputted from the first memory, the combination which comprises:

(a) a second memory for storing a plurality of sets of program codes, each program code being effective for addressing a preselected group of instruction words stored in the first memory, the second memory being disposed in a module having a plurality of electrical contacts;

(b) a receptacle for temporarily interconnecting the contents on said module with said microprocessor system;

(c) a second address register for addressing the second memory;

(d) means for inserting a preselected address into said second address register in response to the depression of a "program" key at said keyboard;

(e) means for comparing the program code stored at said preselected address with a numerical value inputted at said keyboard after the depression of said "program" key; and (f) means for displaying an error condition when the results of the comparison indicate that the numerical value inputted after the depression of the "program" key is greater than the numerical value of the program code stored at the preselected address.

24. The system as defined in claim 23, wherein said first and second memories are first and second read-only-memories.

25. An integrated circuit disposed in a module, the module being temporarily receivable in a receptacle of a calculator and the calculator including an instruction word memory for controlling the operations performed by the calculator, the integrated circuit comprising:

(a) a program memory for storing a plurality of program codes, each program code having two four-bit digits and being adapted for use by said calculator to address said instruction word memory;

(b) an address register for addressing the program memory;

(c) an instruction decoder responsive to bit serial instructions generated by said calculator;

(d) first means coupled to said program memory for outputting the four most significant bits of the addressed program code in serial to said calculator in response to said instruction decoder decoding a "FETCH HIGH" instruction from said calculator; and (e) second means coupled to said program memory for outputting the four least significant bits of the addressed program code in serial to said calculator in response to said instruction decoder decoding a "FETCH" instruction from said calculator.

26. The system according to claim 25, further including means for incrementing the address in said address register in response to a decoded "FETCH" instruction.

27. The system according to claim 26, wherein said address register stores a four digit address and further including means for outputting to said calculator in serial the contents of a sequentially different digit position of said address register each time said instruction decoder decodes an "UNLOAD PC" instruction from said calculator.

*28. A plug-in memory module for use in an electronic microprocessor system having a keyboard, logic means responsive to the keyboard for providing a predetermined*

*one of a plurality of program codes in response to the selective actuation of the keyboard, a data memory for storing data, an instruction memory for storing groups of instructions in a non-volatile form, program counter means coupled to the logic means and to the instruction memory for addressing a predetermined one of the groups of instructions in response to each of the program codes, an arithmetic unit for performing arithmetic operations on the data stored in the data memory in response to the addressed instructions, output means for indicating the results of the arithmetic operations, and receptacle means including contacts for temporarily receiving the memory module and for coupling the memory module to the instruction memory and to the program counter means, the memory module comprising:*

*a memory module housing having contacts connectable to the contacts of said receptacle means;*

*a program memory disposed within said memory module housing for storing at least one sequence of stored program codes in a non-volatile form;*

*counter means disposed within said memory module housing and connectable to the instruction memory via said contacts, said counter means being connected to the program memory for addressing a predetermined one of said stored program codes in response to selected ones of the addressed instructions; and*

*means disposed within said memory module housing for providing said addressed stored program codes to the program counter means via said contacts, whereby the instruction memory is also addressable by the program counter means in response to said addressed stored program codes.*

*29. A plug-in memory module for use in conjunction with a data processing system having a first memory means for storing a plurality of instruction codes and a first address generator for generating addresses of said instruction codes in said first memory means, said memory module comprising:*

*(a) A housing member;*

*(b) A plurality of electrical conductor means disposed at least partially within said housing member said conductor means for temporarily electrically coupling said plug-in module to said system;*

*(c) Second memory means disposed within said housing member and coupled to said conductor means, for storing a plurality of program codes and for providing said program codes to said system via said conductor means, each of said program codes being effective to cause said system to execute a plurality of said instruction codes; and*

*(d) Second address generator means disposed within said housing member, coupled to said second memory means and to said conductor means for selectively generating addresses of said program codes in said second memory means, said address generator means including counter means for incrementing the address of said second memory means.*

*30. The plug-in memory module according to claim 29 wherein said address counter is responsive to signals received from said system via said conductor means for setting the address of said second memory means to a selected address.*

*31. The plug-in memory module according to claim 30 wherein said selected address is a branch address.*

*32. The plug-in memory module according to claim 29 wherein said counter means receives incrementing signals from said system via said conductor means and increments the address of said second memory means in response to said incrementing signals.*

*33. The plug-in memory module according to claim 29 wherein said second memory means is a nonvolatile memory means.*

*34. The plug-in memory module according to claim 33 wherein said nonvolatile memory is a read only memory means.*

*35. The plug-in memory module according to claim 29 wherein said first memory means is a nonvolatile memory means.*

*36. The plug-in memory module according to claim 35 wherein said nonvolatile memory is a read only memory.*

* * * * *